(12) United States Patent
Jha et al.

(10) Patent No.: US 12,377,879 B2
(45) Date of Patent: Aug. 5, 2025

(54) MANEUVER COORDINATION SERVICE IN VEHICULAR NETWORKS

(71) Applicant: Intel Corporation, Santa Clara, CA (US)

(72) Inventors: Satish C. Jha, Portland, OR (US); Yaser Fouad, San Diego, CA (US); Kathiravetpillai Sivanesan, Portland, OR (US); Ignacio Alvarez, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 17/641,414

(22) PCT Filed: Nov. 4, 2020

(86) PCT No.: PCT/US2020/058921
§ 371 (c)(1),
(2) Date: Mar. 8, 2022

(87) PCT Pub. No.: WO2021/092039
PCT Pub. Date: May 14, 2021

(65) Prior Publication Data
US 2022/0332350 A1 Oct. 20, 2022

Related U.S. Application Data

(60) Provisional application No. 62/962,760, filed on Jan. 17, 2020, provisional application No. 62/930,354, filed on Nov. 4, 2019.

(51) Int. Cl.
*B60W 60/00* (2020.01)
*B60W 30/095* (2012.01)

(52) U.S. Cl.
CPC .... *B60W 60/0016* (2020.02); *B60W 30/0956* (2013.01); *B60W 60/0017* (2020.02); *B60W 2554/4049* (2020.02)

(58) Field of Classification Search
None
See application file for complete search history.

(56) References Cited

U.S. PATENT DOCUMENTS 9,594,371 B1    3/2017  Palmer et al.
10,490,068 B2*  11/2019 Nascimento ......... G08G 1/0129
(Continued)

FOREIGN PATENT DOCUMENTS

| CN | 114514758  | 5/2022 |
| EP | 4055803    | 9/2022 |
| WO | 2021092039 | 5/2021 |

OTHER PUBLICATIONS

Llatser, I., Michalke, T., Dolgov, M., Wildschütte, F., & Fuchs, H. (Sep. 2019). Cooperative automated driving use cases for 5G V2X communication. In 2019 IEEE 2nd 5G World Forum (5GWF) (pp. 120-125). IEEE. (Year: 2019).*

(Continued)

*Primary Examiner* — James J Lee
*Assistant Examiner* — David Hatch
(74) *Attorney, Agent, or Firm* — Schwegman Lundberg & Woessner, P.A.

(57) ABSTRACT

Maneuver Coordination Services (MCS) may be used in various implementations of vehicular networks. Emergency Group Maneuver Coordination (EGMC) may be used for detected unexpected safety-critical situations (USCS) on the road. EGMC provides cooperative maneuver coordination among a group of vehicles to ensure safer collective actions in the case of USCS. An MCS and EGMC may utilize a Maneuver Coordination Message (MCM) based on proce- (Continued)

dures for the Generation and Transmission of MCM with reduced communication overhead.

26 Claims, 24 Drawing Sheets

(56) References Cited

U.S. PATENT DOCUMENTS

| | | | |
|---|---|---|---|
| 11,212,654 B2* | 12/2021 | Bai | B60W 30/143 |
| 2008/0208408 A1 | 8/2008 | Arbitmann et al. | |
| 2008/0319602 A1 | 12/2008 | McClellan et al. | |
| 2018/0227882 A1* | 8/2018 | Freda | H04W 8/005 |
| 2019/0072965 A1* | 3/2019 | Zhang | G08G 1/167 |

OTHER PUBLICATIONS

Xu, Wenbo, et al. "Autonomous maneuver coordination via vehicular communication." 2019 49th Annual IEEE/IFIP International Conference on Dependable Systems and Networks Workshops (DSN-W). IEEE, 2019. (Year: 2019).*

"European Application Serial No. 20884170.0, Extended European Search Report mailed Oct. 23, 2023", 8 pgs.

"Specification of Manoeuvre Coordination Service", ETSI Draft; ITSWG1(18)042007, European Telecommunications Standards Institute (ETSI), 650, Route Des Lucioles; F-06921 Sophia-Antipolis; France, vol. WG ITS WG1 Application Requirements and Services, [Online]. Retrieved from the Internet: URL: URL :docbox.etsi.org ITS ITSWG1 05-CONTRIBUTIONS 2018 ITSWG1(18) 042007_Specification_of_Manoeuvre_Coordination_Service.docx, (Jan. 18, 2018), 1-11.

"Intelligent Transport System (ITS); Vulnerable Road Users (VRU) awareness; Part 1: Use Cases definition; Release 2", ETSI TR 103 300-1 V2.1.1, [Online]. Retrieved from the Internet:URL: https: www.etsi.org deliver etsi_tr 103300_103399 10330001 02.01.01_60 tr_10330001v020101p.pdf, (Sep. 5, 2019), 74 pgs.

Lehmann, Bernd, "A Generic Approach towards Maneuver Coordination for Automated Vehicles", IEEE, 2018 21st International Conference on Intelligent Ransportation Systems (ITSC), (Nov. 4, 2018), 3333-3339.

International Search Report and Written Opinion mailed Mar. 15, 2021 for Int'l Pat. No. PCT/US2020/058921, 13 pages.

ETSI, "Intelligent Transport System (ITS); Vulnerable Road Users (VRU) awareness; Part 1: Use Cases definition; Release 2", ETSI TR 103 300-1 V2.1.1 (Sep. 5, 2019), 74 pages.

Alejandro Correa et al., "Infrastructure Support for Cooperative Maneuvers in Connected and Automated Driving", 2019 IEEE Intelligent Vehicles Symposium (IV), 7 pages (Jun. 9, 2019).

"International Application Serial No. PCT US2020 058921, International Preliminary Report on Patentability mailed May 19, 2022", 8 pgs.

"European Application Serial No. 20884170.0, Response filed Apr. 30, 2024 to Extended European Search Report mailed Oct. 23, 2023", 267 pgs.

* cited by examiner

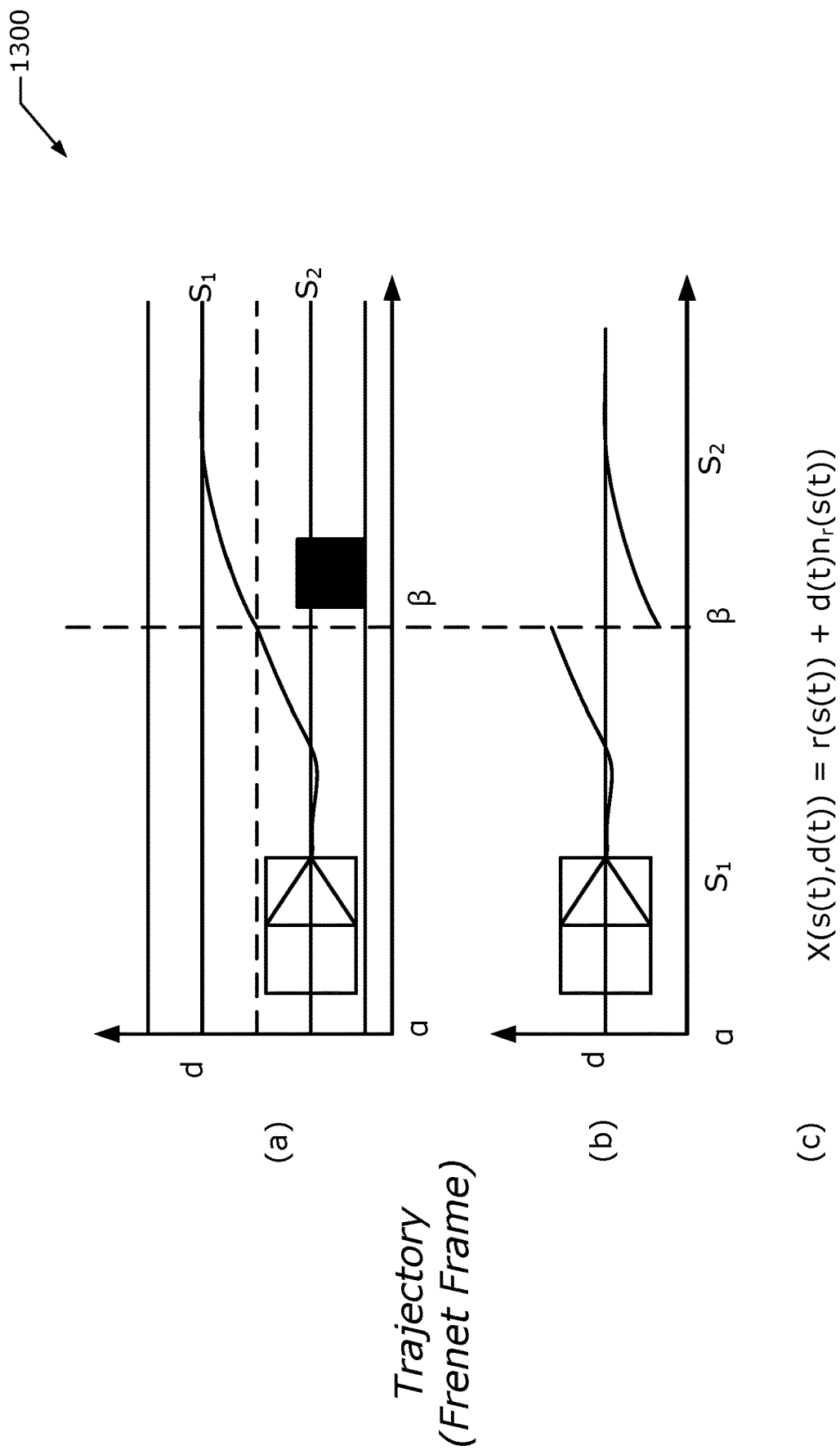

MANEUVER COORDINATION SERVICE IN
VEHICULAR NETWORKS

RELATED APPLICATIONS

The present application is a national phase entry under 35 U.S.C. § 371 of Int'l App. No. PCT/US2020/058921, filed Nov. 4, 2020, which claims priority to U.S. Provisional App. No. 62/930,354 filed Nov. 4, 2019 and U.S. Provisional App. No. 62/962,760 filed Jan. 17, 2020, the contents of each of which are hereby incorporated by reference in their entireties.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS.

Automatic driving is an important future topic for the automotive industry. Current designs of automatic driving systems are only reactive to traffic situations. Therefore, automatic driving vehicles are only able to react to maneuvers of other vehicles, which are currently executed and recognized. Alternatively, it is possible to predict future maneuvers and react to them. Unfortunately, a prediction is based on assumptions which can be wrong and therefore the prediction can also be wrong. A maneuver which was based on a wrong prediction leads to inefficient driving, reduces driving comfort or may provoke safety critical situation.

ITS is currently developing Maneuver Coordination Service (MCS), which defines an interaction protocol and corresponding messages to coordinate maneuvers between two or more vehicles. The MSC is intended to support automatic driving as well as manual driven vehicles. The MCS is intended to reduce prediction errors by exchanging detailed information about intended manoeuvers between vehicles. Furthermore, the MCS provides possibilities to coordinate a joint maneuver if several vehicles intent to use the same space at the same time.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 13 illustrates an example of frenet frames according to various embodiments.

DETAILED DESCRIPTION

Figure 1:
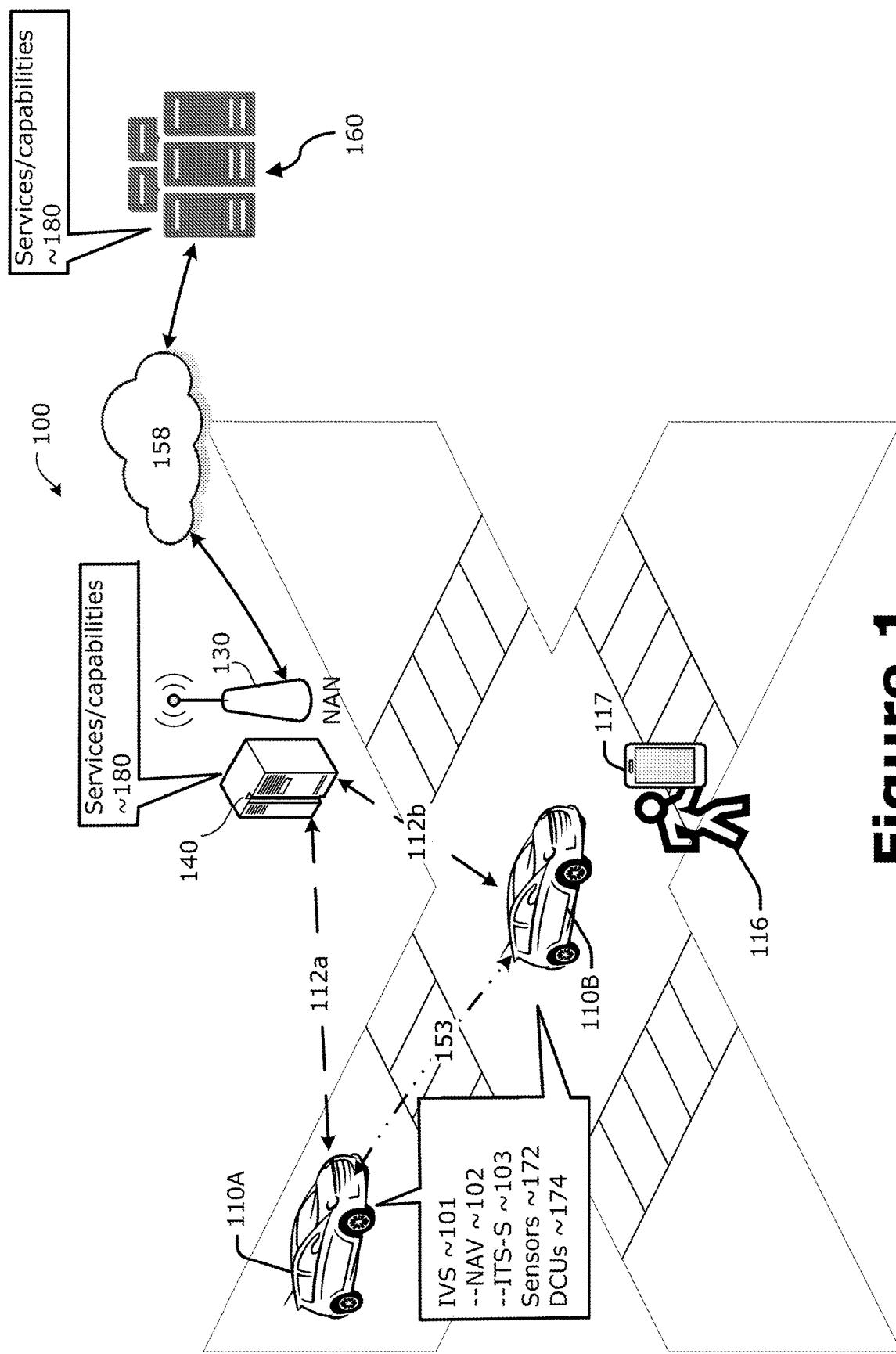
FIG. 1 illustrates an operative arrangement in which various embodiments may be practiced.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels. Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

FIG. 1 illustrates an overview of an environment 100 for incorporating and using the embodiments of the present disclosure. As shown, for the illustrated embodiments, the example environment includes vehicles 110A and 10B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, etc.

For illustrative purposes, the following description is provided for deployment scenarios including vehicles 110 in a 2D freeway/highway/roadway environment wherein the vehicles 110 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to 3D deployment scenarios where some or all of the vehicles 110 are implemented as flying objects, such as aircraft, drones, UAVs, and/or to any other like motorized devices.

For illustrative purposes, the following description is provided for example embodiments where the vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the various embodiments discussed herein. Vehicles 110 including a computing system (e.g., IVS 101) as well as the vehicles referenced throughout the present disclosure, may be referred to as vehicle user equipment (vUE) 110, vehicle stations 110 or vehicle ITS stations (V-ITS-S) 110, and/or the like. The term "V-ITS-S" or "vUE" may also refer to self-driving vehicles (e.g., Autonomous Vehicles (AVs)), computer assisted (CA) and/or autonomous driving (AD) vehicles, Upgradeable Vehicular Compute Systems (UVCS), computer-assisted driving vehicles, UAVs, robots, and/or the like including terrestrial craft, watercraft, and aircraft.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture of FIG. 15. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be CA/AD vehicles, which may include artificial intelligence (AI) and/or robotics to assist vehicle operation.

Figure 15:
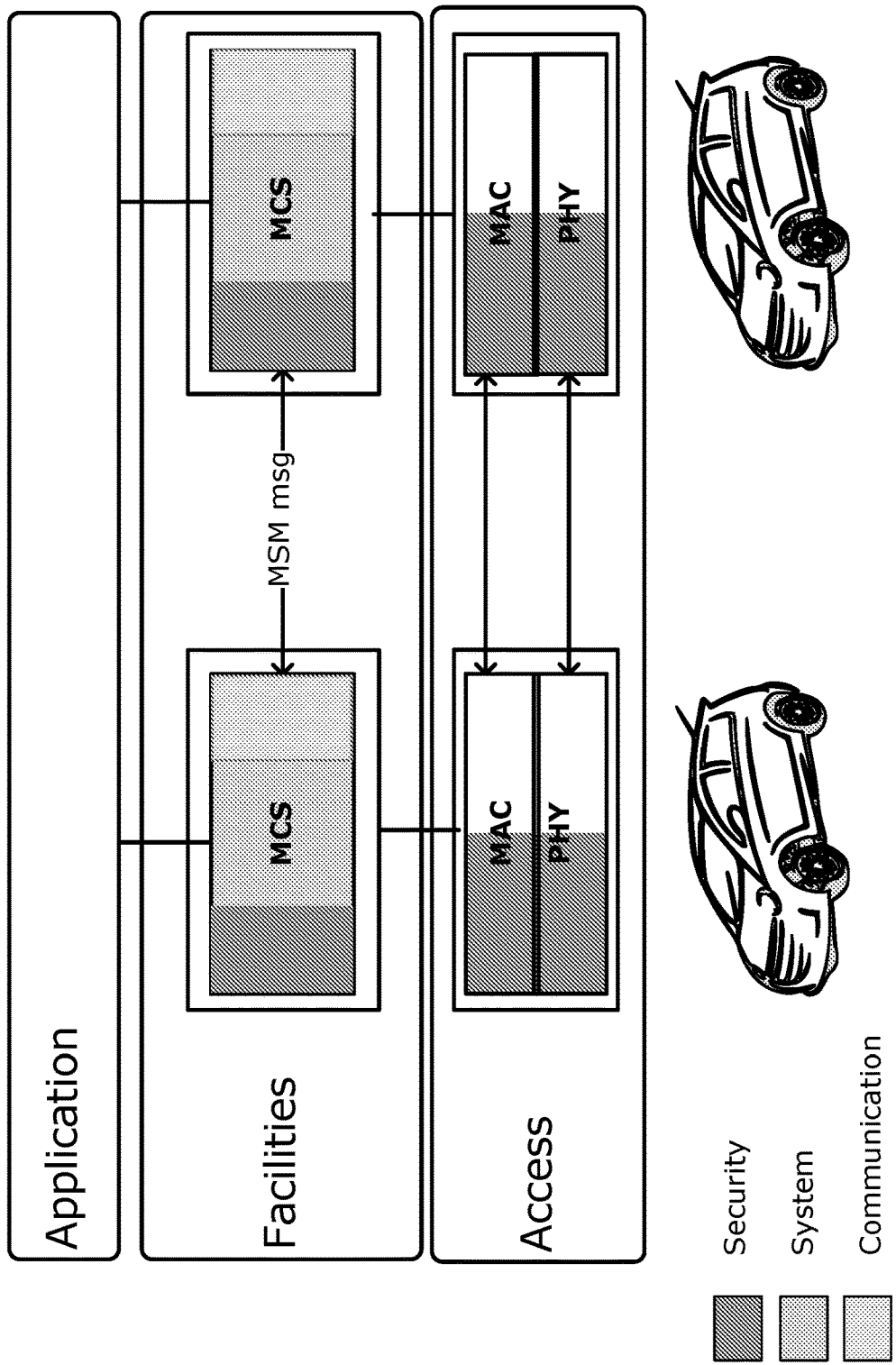
FIG. 15 illustrates an example station reference architecture for MCM-based maneuver coordination, according to various embodiments.
Figure 16:
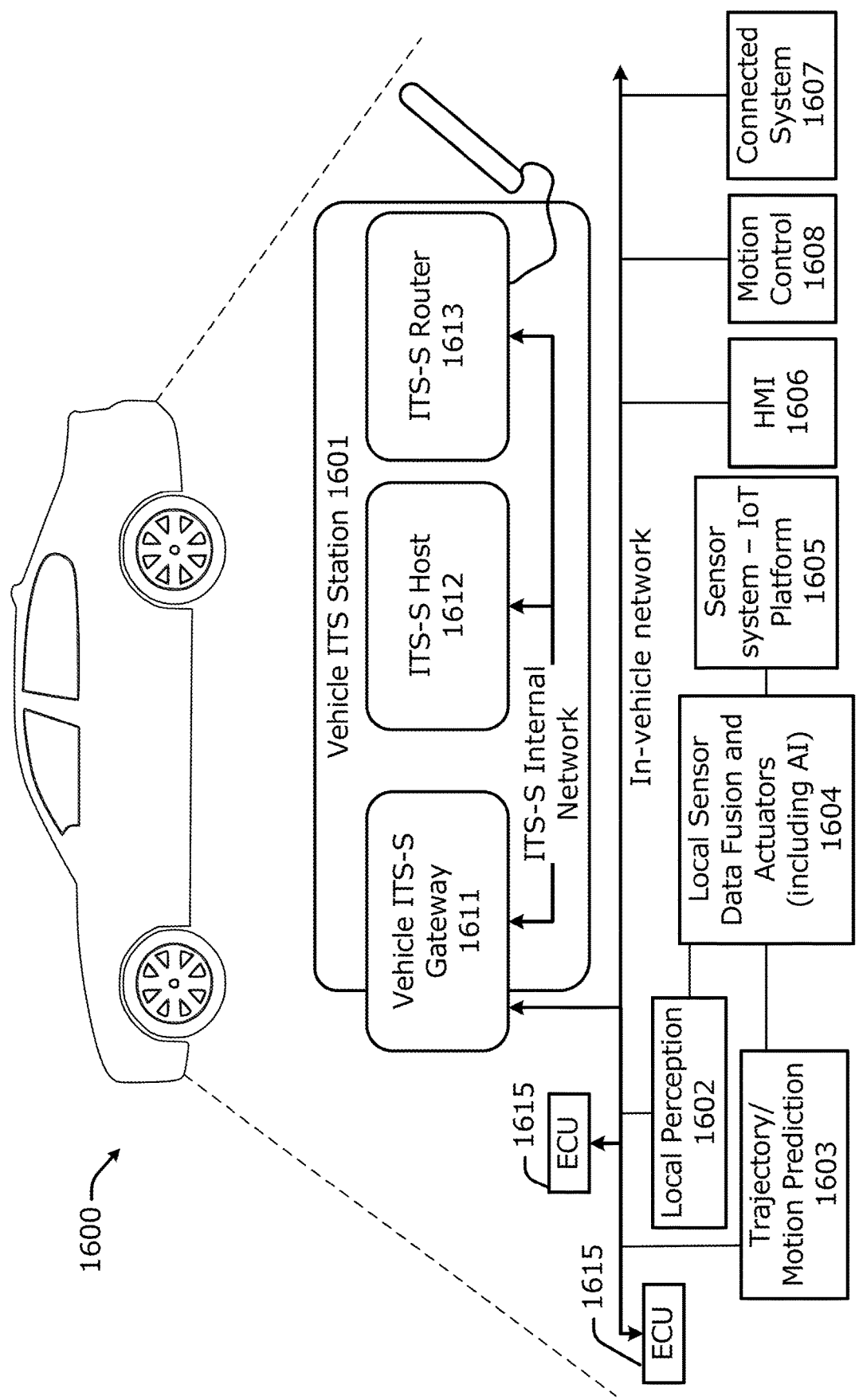
FIG. 16 depicts an example vehicle ITS station (V-ITS-S) in a vehicle system according to various embodiments.

The IVS 101 includes the ITS-S 103, which may be the same or similar to the ITS-S 1500 of FIG. 15 and/or the ITS-S 1601 of FIG. 16. The IVS 101 may be, or may include, Upgradeable Vehicular Compute Systems (UVCS) such as those discussed infra. As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

In addition to the functionality discussed herein, the ITS-S 1601 (or the underlying V2X RAT circuitry on which the ITS-S 1601 operates) is capable of measuring various signals or determining/identifying various signal/channel characteristics. Signal measurement may be performed for cell selection, handover, network attachment, testing, and/or other purposes. The measurements/characteristics collected by the ITS-S 1601 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020 April), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, etc. DCUs 174 are embedded systems or other like computer devices that control a corresponding system of a vehicle 110. The DCUs 174 may each have the same or similar components as devices/systems of FIG. 21 discussed infra, or may be some other suitable microcontroller or other like processor device, memory device(s), communications interfaces, and the like. Individual DCUs 174 are capable of communicating with one or more sensors 172 and actuators (e.g., actuators 2174 of FIG. 21). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 2172 of FIG. 21. Further, each vehicle 110 is provided with the RSS embodiments of the present disclosure. In particular, the IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. In various embodiments, the vehicles 110 may exchange ITS protocol data units (PDUs) or other messages of the example embodiments with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S(R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU/V-ITS-S embodiments discussed herein.

Environment 100 also includes VRU 116, which includes a VRU ITS-S 117. The VRU 116 is a non-motorized road users as well as L class of vehicles (e.g., mopeds, motorcycles, segways, etc.), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[ISO8855]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle).

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present document are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010 September)), related hardware components, other in-station services and sensor subsystems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including unequipment VRUs (VRU 116 does not have a device); VRU-Tx (a VRU 116 equipped with an ITS-S 117 having only a transmission (Tx) but no reception (Rx) capabilities that broadcasts awareness messages or beacons about the VRU 116); VRU-Rx (a VRU 116 equipped with an ITS-S 117 having only an Rx (but no Tx) capabilities that receives broadcasted awareness messages or beacons about the other VRUs 116 or other non-VRU ITS-Ss); and VRU-St (a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 117 and/or R-ITS-S 130 with a VRU application. Examples of the various VRU system configurations are shown by Table 2 of ETSI TR 103 300-1 v2.1.1 (2019 September) (hereinafter "[TR103300-1]").

The number of VRUs 116 operating in a given area can get very high. In some cases, the VRU 116 can be combined with a VRU vehicle (e.g., rider on a bicycle or the like). In order to reduce the amount of communication and associated resource usage (e.g., spectrum requirements), VRUs 116 may be grouped together into one or more VRU clusters. A VRU cluster is a set of two or more VRUs 116 (e.g., pedestrians) such that the VRUs 116 move in a coherent manner, for example, with coherent velocity or direction and within a VRU bounding box. VRUs 116 with VRU Profile 3 (e.g., motorcyclists) are usually not involved in the VRU clustering. The use of a bicycle or motorcycle will significantly change the behaviour and parameters set of the VRU using this non-VRU object (or VRU vehicle such as a "bicycle"/"motorcycle"). A combination of a VRU 116 and a non-VRU object is called a "combined VRU." A coherent cluster velocity refers to the velocity range of VRUs 116 in a cluster such that the differences in speed and heading between any of the VRUs in a cluster are below a predefined threshold. A VRU Bounding box is a rectangular area containing all the VRUs 116 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators). These clusters are considered as a single object/entity. The parameters of the VRU cluster are communicated using VRU Awareness Messages (VAMs), where only the cluster head continuously transmits VAMs. The VAMs contain an optional field that indicates whether the VRU 116 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. The VAM may also indicate whether the VRU cluster is heterogeneous and/or homogeneous, which could provide useful information about trajectory and behaviours prediction when the cluster is disbanded.

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112a and the WLAN V2X RAT may utilize an air interface 112b. The access layer for the ITS-G5 interface is outlined in ETSI EN 302 663 V1.3.1 (2020 January) (hereinafter "[EN302663]") and describes the access layer of the ITS-S reference architecture 1500. The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March). In embodiments, the NAN 130 or an edge compute node 140 may provide one or more services/capabilities 180.

In V2X scenarios, a V-ITS-S 110 or a NAN 130 may be or act as a RSU or R-ITS-S (referred to as an R-ITS-S 130), which refers to any transportation infrastructure entity used for V2X communications. In this example, the RSU 130 may be a stationary RSU, such as an gNB/eNB-type RSU or other like infrastructure, or relatively stationary UE. In other embodiments, the RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110a may be equipped with a first V2X RAT communication system (e.g., C-V2X) whereas V-ITS-S 110b may be equipped with a second V2X RAT communication system (e.g., W-V2X which may be DSRC, ITS-G5, or the like). In other embodiments, the V-ITS-S 110a and/or V-ITS-S 110b may each be employed with one or more V2X RAT communication systems. In these embodiments, the RSU 130 may provide V2X RAT translation services among one or more services/capabilities 180 so that individual V-ITS-Ss 110 may communicate with one another even when the V-ITS-Ss 110 implement different V2X RATs. According to various embodiments, the RSU 130 (or edge compute node 140) may provide VRU services among the one or more services/capabilities 180 wherein the RSU 130 shares CPMs, MCMs, VAMs DENMs, CAMs, etc., with V-ITS-Ss 110 and/or VRUs for VRU safety purposes including RSS purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. In other embodiments, the NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN) node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

1. Maneuver Coordination Service (MCS) Embodiments

Cooperative Intelligent Transport Systems (C-ITS) have been developed to enable an increase in traffic safety and efficiency, and to reduce emissions and fuel consumption. Maneuver Coordination Service (MCS) enables proximate ITS-S' (including between vehicles 110 and infrastructure 130) to exchange information that facilitates and supports driving automation functions of automated and connected vehicles 110. One objective of the MCS is to exchange information between ITS-S in proximity that facilitates and supports the driving automation function of automated and connected vehicles. Therefore, MCS supports ITS applications that in turn support automated driving functions and/or driving assistance functions.

In particular, MCS enables proximate V-ITS-Ss 110 to share their maneuver intentions (e.g., lane change, lane passes, overtakes, cut-ins, drift into ego lane, and the like), planned trajectory, detected traffic situations, ITS-S state, and/or other like information. MCS provides maneuver negotiation and interaction among proximate vehicles for safe, reliable, efficient, and comfortable driving. MCS may utilize a message type referred to as a Maneuver Coordination Message (MCM). MCMs include a set of data elements (DEs) and/or Data Frames (DFs) to transmit vehicle status, trajectory, and maneuver intention. MCS assists in Traffic Congestion Avoidance coordination (e.g., in case a vehicle is in virtual deadlock due to parallel slow vehicles in front of it in all lanes), traffic efficiency enhancement (e.g., merging into a highway, Exiting a Highway, roundabout entering/exiting, confirming vehicle's intension such as false right turn indication of an approaching vehicle, etc.), safety enhancement in maneuver (e.g., safe and efficient lane changes, overtake, etc.), smart intersection management, emergency trajectory coordination (e.g., in case when an obstacle, animal, VRU 116 suddenly comes in a lane and more than one vehicles are required to agree on a collective maneuver plan), and/or other use cases such as those discussed herein. MCS can also help in enhancing user experience by avoiding frequent hard breaks as front and other proximity (proximate) vehicles 110 indicate their intention in advance whenever possible.

Among the above mentioned use cases, unexpected emergency road situations present a unique set of challenges of group maneuver coordination and consensus. In this case, several vehicles (in one or more lanes) need to re-calculate urgent maneuver change (without conflicting with other vehicles' maneuvers)—demanding an agreed collective maneuver plan among these vehicles within very short time. Some challenges to be addressed in these cases include the following:

Any uncoordinated maneuver action taken by an impacted vehicle (e.g., vehicles right behind the detected object/pet/animal/kid) may result in accident with other vehicles. Other problem is that time to decide maneuver and react on it is very limited. Multiple coordinated and sequential urgent maneuver tasks need to be agreed and performed by several vehicles within a short time.

Finding an agreed maneuver plan (e.g., multiple coordinated and sequential urgent maneuver tasks for multiple proximate vehicles) among several vehicles in case of safety critical situation detection with very short time is challenging. Consensus may not be reached within a short duration to avoid potential accident(s).

Identifying minimum set of vehicles to coordinate, negotiation among them to find agreed maneuver plan for each of them, and then taking the agreed maneuver actions—all within a short time. Periodic maneuver coordination message may not be sufficient for such cooperation. Event-triggered bursts of several maneuver coordination message exchanges may be required. Message contents and specific protocol details with proper message exchanges for group negation and consensus for maneuver planning in urgency are required. Message negotiation may go multiple rounds to decide final group maneuver plans (GMPs). Multiple coordinated and sequential urgent maneuver tasks need to be agreed and performed by several vehicles.

The present disclosure provides various embodiments to enable Emergency Group Maneuver Coordination (EGMC) to address the above-mentioned challenges in case of detection of Unexpected Safety Critical Situation (USCS). Such USCS/event can be due to many cases including: an obstacle (e.g., tree branch, dust bin, etc.) suddenly falls on the road; animal or child suddenly enters the road; an object suddenly falls from a front vehicle; a bike rider suddenly ejected from the bike and so on. Various embodiments herein may (i) identify group of proximate vehicles which need to coordinate in order to handle detected USCS, (ii) select a leader (a V-ITS-S 110 or an R-ITS-S 130) for Short-Lived Emergency Maneuver Coordination Group (EMCG), (iii) negotiate and agree among the group a common GMP coordinated by group leader, (iv) select common GMP by leader in case of no consensus among the group members within a time bound, and (v) execute agreed or selected common GMP. The GMPs comprise one or more coordinated and sequential maneuver tasks/actions taken by various group members. The embodiments herein also enable EGMC in a distributed manner for the case when no leader is selected. Embodiments include various content/information for the MCMs, which are exchanged among members of short-lived EMCGs.

Although ETSI has plan to work in this area ETSI TR 103 578 V0.0.3 (2018 October) ("[TR103578]"), there has not been progress to enable MCS among proximate vehicles. Some use cases have been described in the existing technical references, however, Emergency Maneuver Coordination among a group of vehicles to ensure safer collective actions in case of unexpected emergency road conditions, has not been considered.

The embodiments herein enable maneuver coordination among proximate vehicles for efficient, safe, and coordinated autonomous driving environment in case of detection of USCS on the road. The present disclosure includes embodiments for Emergency Maneuver Coordination (EMC) among a group of V-ITS-S 110 to ensure safer collective actions in case of unexpected emergency road conditions. EMC is a way to find an agreed GMP (also referred to as a "maneuver coordination strategy" or the like) among several vehicles in case of safety critical situation detection with very short time to take coordinated maneuver. The GMPs are machine-readable instructions (or data and/or program code used to generate such instructions) that are used by respective ITS-Ss to execute their respective maneuvers. Such safety critical situation may arise in many cases such as when an object or obstacle appears in a roadway suddenly.

Figure 2:
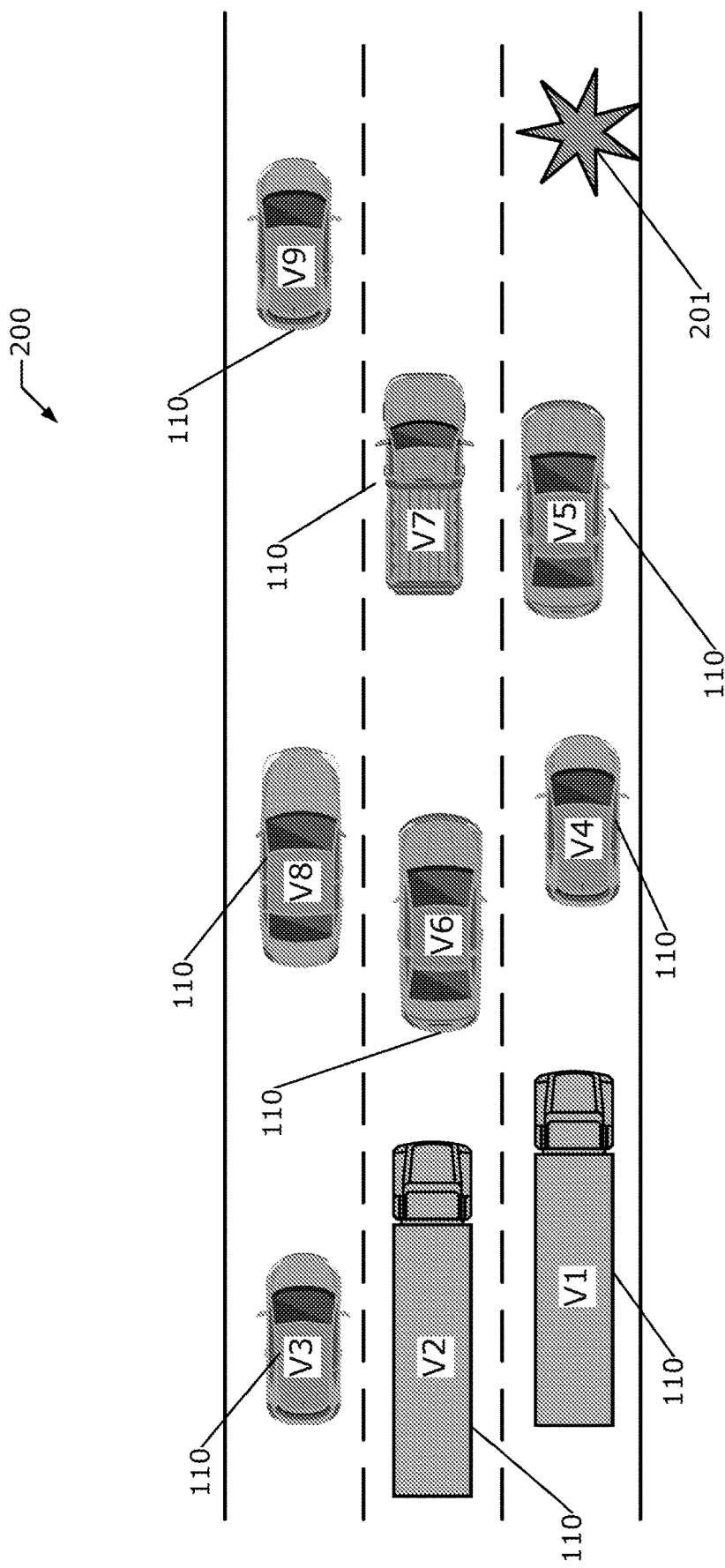
FIG. 2 illustrates an example of detecting an unexpected emergency road conditions according to various embodiments.

FIG. 2 shows an example scenario 200 of detection of a USCS 201 (also referred to as a "Emergency Maneuver Coordination Event"). In such USCS 201 cases, several vehicles 110 in one or more lanes (e.g., vehicles V1 through V9) need to re-calculate urgent maneuver change without conflicting with other vehicles' 110 maneuvers. A collective maneuver plan among these vehicles 110 can be used for this purpose, but such a collective maneuver plan would need to be agreed-to within very short time to avoid the USCS 201. Message contents and specific protocol details with proper message exchanges for group negation and consensus for maneuver planning in urgency can be used to avoid the USCS 201. Message negotiation may go multiple rounds to decide final GMPs. Multiple coordinated and sequential urgent maneuver tasks need to be agreed and performed by several vehicles 110. In embodiments, a leader V-ITS-S 110 (e.g., a member of an EGMC group and/or an R-ITS-S 130 if available in the proximity of the emergency event 201) can be selected to coordinate the GMP. The EGMC embodiments include a first embodiment where a group member acts as a group leader, a second embodiment where an R-ITS-S 130 acts as a group leader, and a third embodiment where no leader is selected and distributed maneuver coordination is performed.

1.1. Emergency Group Maneuver Coordination (EGMC) Embodiments

1.1.1. EGMC Embodiment 1

Figure 9:
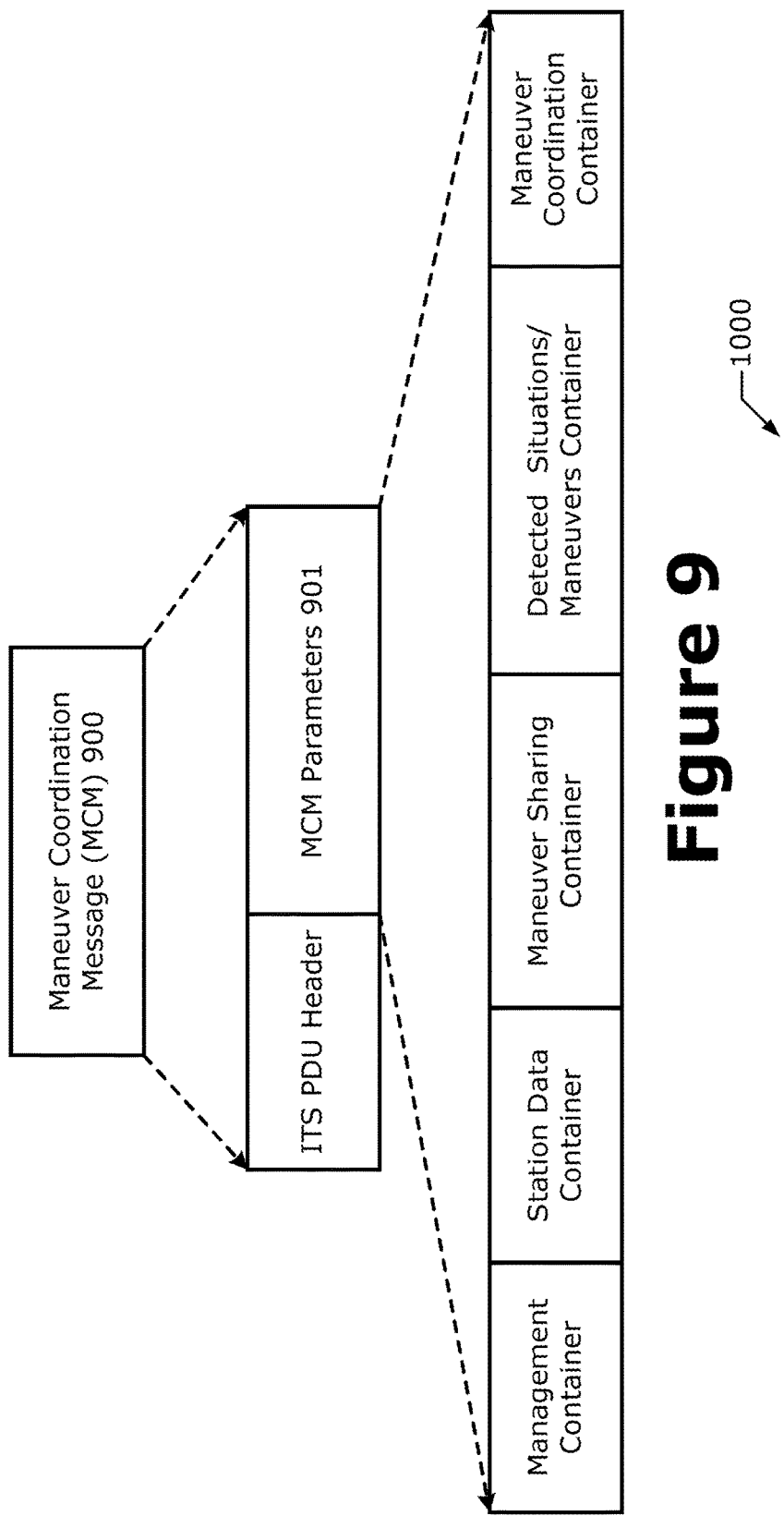
FIGS. 9 and 10 illustrate example MCM formats and structures according to various embodiments.

The first embodiment is related to scenarios where there is no R-ITS-S 130 in the proximity of detected Unexpected Safety Critical Situation (USCS) and a V-ITS-S serves as the leader for a Short-Lived Emergency Maneuver Coordination Group. In the first embodiment, each V-ITS-S 110 exchanges periodic V2X messages such as, for example, Decentralized Environmental Notification Messages (DENMs), Basic Safety Messages (BSMs), Cooperative Awareness Messages (CAMs), Collective Perception Messages (CPMs), and/or other like messages with proximate V-ITS-Ss 110, R-ITS-S 130 (and VRU ITS-Ss 117). Additionally or alternatively, each V-ITS-S 110 may also share planned maneuver (e.g., its maneuver intentions, planned trajectory, detected traffic situations) periodically by broadcasting Maneuver Coordination Messages (MCMs). An MCM can have several containers such as (i) a container to share ego V-ITS-S 110's intention and planned trajectory—Maneuver sharing container, (ii) a container to share—Detected situations/maneuvers container, (iii) a container to enable coordination/negotiation among V-ITS-Ss 110 such as the Maneuver Coordination/Negotiation Container, and other containers as shown by FIG. 9. In FIG. 9, the MCM-Management Container provides basic information about the message such as station type generating message, a message ID, Segmentation Info, etc. The Station Data Container provides Information about the originating V-ITS-S 110. The ITS PDU Header defines the standard data frames (DF) for the definition of the message type and the station/node ID. The various containers of FIG. 9 are discussed in more detail infra.

Based on the exchange of MCMs, in various embodiments each V-ITS-S 110 and R-ITS-S 130 maintains an updated list of proximate V-ITS-Ss 110 (e.g., neighbor list)

and Info (location, speed, heading, etc.) about proximate V-ITS-Ss 110, perceived environment from BSM/CAM/CPM; and maneuver info of proximate V-ITS-Ss 110 from their MCMs.

When a USCS 201 arises, one or more V-ITS-Ss 110 detect such event based on its perception capabilities, such as by using its on-board sensors. As an example, vehicle V5 of FIG. 2 may detect the event first. Vehicle V5 informs Neighboring V-ITS-S(s) 110, R-ITS-S(s) 130, and/or VRU ITS-S(s) 117 about detection of USCS immediately by sending a V2X message (e.g., an MCM with Detected Situations/Maneuvers Container, DENM, BSM, CAM, CPM, etc.). Vehicle V5 also indicates Potential necessity of EGMC urgently in the message.

Figure 3:
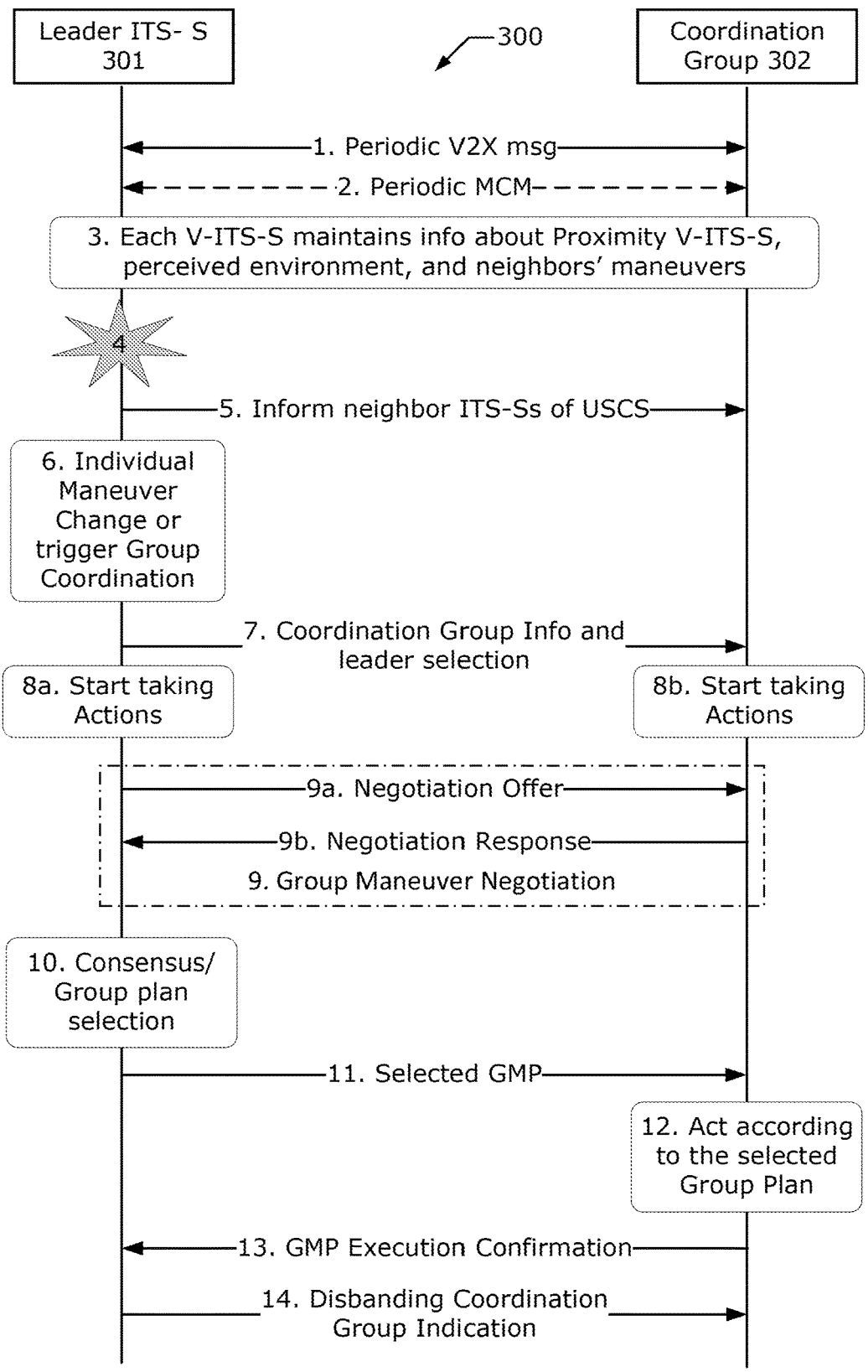
FIG. 3 illustrates an example Emergency Group Maneuver Coordination (EGMC) procedure according to a first embodiment.

FIG. 3 shows an example EGMC procedure 300, according to the first embodiment. The EGMC procedure 3 is used in case of detection of an USCS. In this example, there is no R-ITS-S 130 in the proximity (or vicinity) of the detected USCS 201, and the V-ITS-S 110 that first detects the USCS 201 serves as the Leader ITS-S 301 for Short-Lived EMCG (SL-EMCG). In the example of FIG. 2, the Vehicle V5 would serve as the Leader ITS-S 301 since it is the first V-ITS-S 110 to detect the USCS 201 and as the Leader for the SL-EMCG.

The EGMC procedure 300 begins at step 1 where periodic V2X messages (e.g., BSM, CAM, CPM, MCM, etc.) is communicated between the ITS-Ss 301, 302. At step 2, periodic MCMs are communicated between the ITS-Ss 301, 302. At step 3, each ITS-S 301, 302 maintains Info (e.g., location, speed, heading, etc.) about proximity ITS-S(s) 301, 302, information about a perceived environment from obtained V2X messages; and neighbor ITS-Ss' 301, 302 maneuvers from the periodic MCMs At step 4, the V-ITS-S 301 is the first to detect the USCS 201 in front of it, and will act as a group leader 301. At step 5, the leader 301 informs any neighboring ITS-Ss 110, 130, 117 (if any) about detection of the USCS 201, and indicates potential of EGMC. The leader 301 may use any suitable V2X message such as a DENM, BSM, CAM, CPM, MCM, and/or the like. Some or all of the neighboring ITS-Ss 110, 130, 117 may constitute the Coordination Group 302.

At step 6, the leader 301 evaluates whether an individual maneuver change is sufficient without coordination, and if yes, the leader 301 executes (or triggers) the individual maneuver change accordingly. Otherwise, the leader 301 initiates Group Coordination, where the leader 301 calculates a maximum time available for negotiation/execution for one or more GMPs (also referred to as "maneuver coordination strategies" or the like), identifies ITS-Ss 302 to be included in group, elects itself as the leader 301 of the Coordination Group, etc. At step 7, the leader 301 informs the Coordination Group 302 (or the neighboring ITS-Ss 302, 110, 130, 117) about initiation of EGMC with Coordination Group Info and self selection of the leader 301. In embodiments, the leader 301 may use a suitable V2X message (msg), for example, an Event-Triggered (ET) MCM or any other V2X msg such as those discussed herein.

At step 8a, the leader 301 starts taking actions such as de-acceleration which may or may not take place before coordination; determining a set of candidate group maneuver plans (GMPs) (e.g., including 1 to $N_{max}$ GMPs, were $N_{max}$ is the maximum number of GMPs); calculating a cost for each plan; sort the candidate GMPs according to the calculated costs and/or other parameters; and send a first preferred candidate GMP via an MCM for negotiation. Each GMP includes one or more coordinated/sequential urgent maneuver tasks for some or all Coordination Group 302 members. At step 8b, the ITS-Ss in the Coordination Group 302 start taking actions such as de-acceleration which may or may not take place before coordination; and/or evaluate possible set of changes in current maneuver that can be offered during negotiation for the Coordination Group 302.

At step 9, a Group Maneuver Negotiation procedure takes place, which includes steps 9a and 9b. At step 9a, the leader 301 sends a negotiation offer wherein the leader 301 puts forward one or more of the candidate GMPs. In embodiments, this may include the most preferred GMPs, in order (e.g., according to the calculated costs and/or other parameters), until group consensus is reached (e.g., up to N-max-Rejection). In embodiments, the leader 301 may use a suitable V2X msg to send the negotiation offer, for example, ET MCM or any other V2X msg such as those discussed herein. At step 9b, one or more members of the Coordination Group 302 send negotiation responses using a suitable V2X msg, for example, ET MCM or any other V2X msg such as those discussed herein. The negotiation responses may include an acceptance/acknowledgement (ACK) of an offered candidate GMP, or a rejection/negative ACK (NACK) of the offered candidate GMP.

A suitable consensus algorithm may be used to select a suitable GMP. A consensus algorithm is a process used to achieve agreement on a single data value among distributed processes or systems. In one example, a majority voting or consensus algorithm may be applied to select one of the GMPs. Majority voting involves each node providing negotiation response ACK (e.g., "votes") and the selected GMP may be used if it receives the most votes (ACKs) and more than half of the negotiation responses are ACK. Alternatively, individual GMPs may be voted on wherein each GMP that receives more than half of the votes and receives the most votes is used. In other embodiments, plurality voting can be used, where the GMP that receives the most votes is used even if that GMP does not receive more than 50% of the votes. In other embodiments, weighted voting may be used. In majority voting, each model has the same voting weight, whereas in weighted voting the importance of one or more of the GMPs can be increased or decreased using one or more weight factors. The weight factors may be selected based on various parameters such as V-ITS-S parameters and/or capabilities, and/or the like. The weight factors can also be chosen based on various design choices and/or using an optimization algorithm. In some embodiments, the leader may assist in handling GMP conflicts by using decision making mechanisms or some other suitable selection algorithm. Other consensus algorithms may be used in other embodiments such as, for example, one or more of a paxos consensus algorithm, raft consensus algorithm, Chandra-Toueg consensus algorithm, Phase King algorithm, lockstep protocol, mean-subsequence-reduced (MSR) algorithm, proof-of-work (PoW), a proof-of-stake (PoS), proof-of-burn, proof-of-activity, proof-of-capacity, byzantine fault tolerance algorithm, practical byzantine fault tolerance (PBFT) algorithm, quantum Byzantine agreement, a Ripple protocol based algorithm, and/or the like.

At step 10, if a consensus is reached, the agreed-to group plan is selected. Otherwise, the leader 301 selects a GMP from among the set of candidate GMPs based on the negotiation responses received at that point. At step 11, the leader 301 sends the selected GMP to the Coordination Groups 302 and acts upon the selected GMP. In embodiments, the leader 301 may use a suitable V2X msg to send the selected GMP, for example, ET MCM or any other V2X msg such as those discussed herein. At step 12, the ITS-Ss in the Coordination Group 302 act according to the selected GMP (e.g., by performing respective maneuvers according to the GMP).

At step 13, the members of the Coordination Group 302 send a GMP Execution Confirmation using a suitable V2X msg such as, for example, ET MCM or any other V2X msg such as those discussed herein. At step 14, the leader 301 sends a Disbanding Coordination Group Indication to the members of the Coordination Group 302 using a suitable V2X msg such as, for example, ET MCM or any other V2X msg such as those discussed herein.

Figure 4:
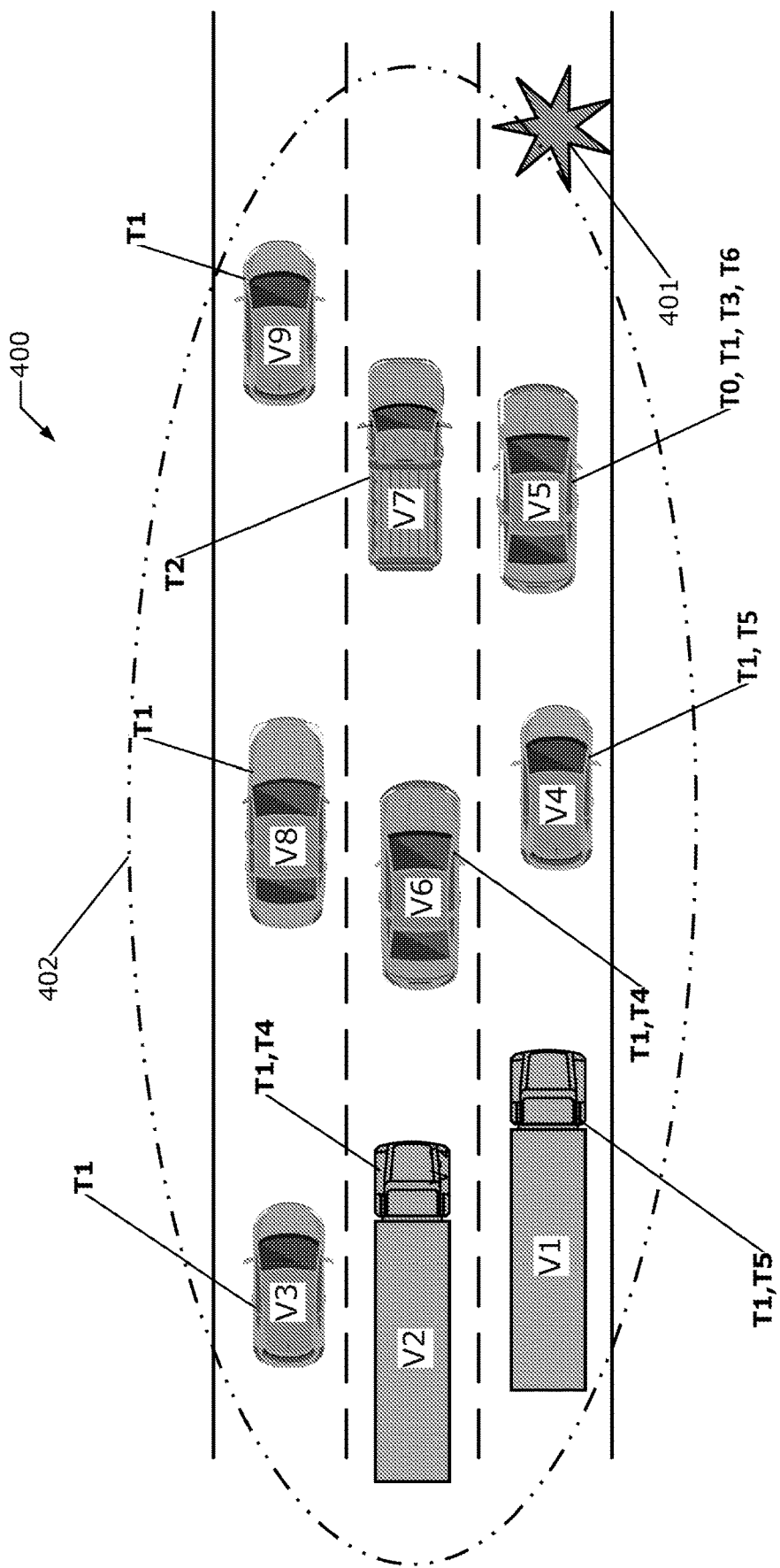
FIGS. 4 and 5 illustrate an example of EGMC according to the first embodiment.

FIG. 4 illustrates another example 400 of EGMC for an unexpected emergency event 401 according to the first embodiment. The unexpected emergency event 401 may correspond to USCS 201 of FIG. 2, where the vehicles 110 operate according to the EGMC procedure 300 of FIG. 3.

In the example of FIG. 4 (and with reference to FIG. 3), the Vehicle V5, detects an event 401 first and informs proximate V-ITS-Ss 110 (and R-ITS-S(s) 130 and/or VRU ITS-Ss 117, if any), and declares itself as leader 301 of the short lived EMCG (SL-EMCG) 402. If an R-ITS-S 130 is available in the coverage of such unexpected emergency event area, R-ITS-S 130 may take the role of leader 301 replacing Vehicle V5 (as described in Embodiment 2 infra). If multiple V-ITS-Ss 110 detect the event and indicate it in their V2X messages, the V-ITS-S 110 generating V2X message with such indication first (e.g., based on earliest generation time of V2X message carrying such indication) is selected as leader 301.

The leader Vehicle V5 evaluates whether an individual maneuver change is sufficient without coordination, and if yes, executes the maneuver change accordingly. Otherwise, the leader Vehicle V5 initiates Group Coordination for V-ITS-S 110 within the SL-EMCG 402 (or within a communication range of Vehicle V5, which may also be represented by ellipsis 402). For group coordination, the leader Vehicle V5 calculates a maximum time available for negotiation and execution for one or more GMP, and identifies V-ITS-Ss 110 to be included in the SL-EMCG 402. The Vehicle V5 identifies V-ITS-Ss 110 to be included in the SL-EMCG 402 by, for example, identifying V-ITS-Ss 110 in proximity (or predetermined/predefined distance of Vehicle V5), which shall be involved in negotiating and agreeing a GMP to avoid or minimize potential accident based on event 401.

The leader Vehicle V5 then sends a V2X msg (e.g., ET MCM) with a Maneuver Coordination/Negotiation Container in order to inform Neighboring V-ITS-Ss 110 (e.g., vehicles V1-V4 and V6-V9) about initiation of EGMC with Coordination Group (SL-EMCG) Information and self-selection of Leader (e.g., identification (ID) of Vehicle V5 and/or other parameters). The Coordination Group (SL-EMCG) Information may include one or more of the following data items: Group ID, event detection time, event location, etc.); members IDs; purpose of the Group; Leader ID; Maximum time available for negotiation/execution for GMP; and/or other like information. In some embodiments, the Group ID can be derived by leader Vehicle V5 based on the leader ID and/or using some other parameters. In one example, a suitable hash function may be applied to the leader ID to produce the group ID. In another example, a timestamp, leader ID, vehicle fingerprint information/data may be input to the hash function to produce the group ID. The hash function in these examples may output a set/predefined number of bits or characters regardless of the size and/or type of the input data.

The leader V-ITS-S 110 may start taking Actions (or perform tasks) such as deceleration which is sometimes fine before initiating group coordination. The leader Vehicle V5 determines possible set of GMPs where each plan indicates a set of multiple coordinated and sequential urgent maneuver tasks for several group members. The leader Vehicle V5 calculates cost for each GMP. The leader Vehicle V5 then sorts these GMPs in descending order of preference (or cost).

In some embodiments, the leader Vehicle V5 may avoid a GMP that may involve one or more connected non-autonomous V-ITS-Ss 110 (e.g., V-ITS-Ss 110 that are connected, however, not autonomous V-ITS-Ss 110) to perform some tasks. Additionally or alternately, such GMPs can be assigned lower priority/preference (or higher cost). Note that such connected non-autonomous V-ITS-S 110 can still take GMP action through some human machine interface (HMI), where HMI displays actions to the human driver.

When the leader Vehicle V5 indicates initiation of EGMC by ET-MCM, some of the V-ITS-Ss 110 may respond back (via ET-MCM) indicating that they are not willing to coordinate. The leader Vehicle V5 may avoid (or give low priority to) a GMP, which may involve one or more such non-coordinating V-ITS-Ss 110 to perform some tasks. If there are non-connected V-ITS-Ss 110, the leader Vehicle V5 may calculate a GMP considering these V-ITS-Ss 110 will not be aware of emergency GMP.

Each GMP includes a coordinated sequence of actions/tasks, where each action/task is performed by one of more V-ITS-Ss 110 in an order specified by the GMP. Each action/task is a maneuver or motion to be performed by an V-ITS-Ss 110. Each GMP for negotiation (e.g., one or more of the determined candidate GMPs) can have one or more of the following data items: Group ID; GMP ID; Leader's Preference (e.g., GMP ID of leader's preferred GMP); and one or more planned tasks; decision (e.g., selection decision for this plan); and/or other like information. Each of the one or more planned tasks may include some or all of the following information: trajectory, acting V-ITS-Ss 110/Group-members' IDs, execution-sequence number, execution-Time, dependency on planned other tasks (or relationship with other task(s)). A GMP can be selected by consensus, rejected, or selected by leader due to lack of consensus on any plan. Initially, the decision will be set as 'Not Decided Yet' or some other value indicating that a GMP has not been selected.

Meanwhile, other group members (non-leader members) may start taking actions such as deceleration which may be acceptable before coordination takes place. These members also evaluate possible set of changes in their current maneuver that can be offered during negotiation for the group coordination.

The leader vehicle V5 now sends Negotiation offer with first preferred GMP via a V2X message such as ET-MCM with a Maneuver Coordination/Negotiation Container to the group 402. V-ITS-Ss 110 indicated to perform some task in the first preferred GMP under negotiation sends a negotiation response to the leader vehicle V5. The negotiation response may include one or more of the following data items: Group ID; GMP ID; rejected or accepted indicator; ID of the responding V-ITS-S 110; rejection and reason (e.g., code or value) if rejected.

If all V-ITS-Ss 110 are indicated to perform some task in this plan (e.g., the first preferred GMP) accept the plan, negotiation is completed and stops. Otherwise, if one or more group member disagrees on the plan (e.g., the first preferred GMP), leader vehicle V5 may put forward 2 to $N_{max}$ number of plans (where $N_{max}$ is the maximum number of plans/GMPs) as negotiation offer until a consensus on a group plan is achieved or N-max-Rejection preferred GMPs are failed/rejected.

If a consensus is reached, the agreed Group plan is selected. Otherwise, the leader vehicle V5 selects a GMP based on negotiation responses that it has received so far (if any). In some embodiments, when no consensus is reached, the leader vehicle V5 may give higher priority to a plan which involves taking actions by V-ITS-Ss 110 only in its own lane during a GMP selection.

The leader vehicle V5 also sends the selected GMP to the group 402 via a V2X message such as ET-MCM with a Maneuver Coordination/Negotiation Container. All V-ITS-Ss 110 indicated to perform some task in the selected GMP take coordinated actions in the sequence specified in the selected GMP. In the example of FIG. 4, the sequence of actions/tasks of the selected GMP may be as follows:

At task/time (T) 0, vehicle V5 prepares Emergency Maneuver Plan Options (e.g., determines set of GMPs, etc.), negotiates with the SL-EMCG 402, selects a GMP for the SL-EMCG 402, and informs the SL-EMCG 402 about selected GMP. T0 may or may not be part of the selected GMP.

At T1, vehicle V1 deaccelerates, be ready to Stop; vehicle V2 deaccelerates; vehicle V3 deaccelerates; vehicle V4 deaccelerates, be ready to Stop; vehicle V5 deaccelerates, be ready to stop; vehicle V6 deaccelerates; vehicle V8 deaccelerates; and vehicle V9 accelerates.

At T2, vehicle V7 accelerates and move to left lane after safe gap, and then accelerate.

At T3, vehicle V5 moves to middle lane after safe gap.

At T4, vehicle V2 accelerates; and vehicle V6 accelerates.

At T5, vehicle V1 moves to middle lane after safe gap; and vehicle V4 moves to middle lane after safe gap At T6, vehicle V5 disbands the Coordination Group 402.

Figure 5:
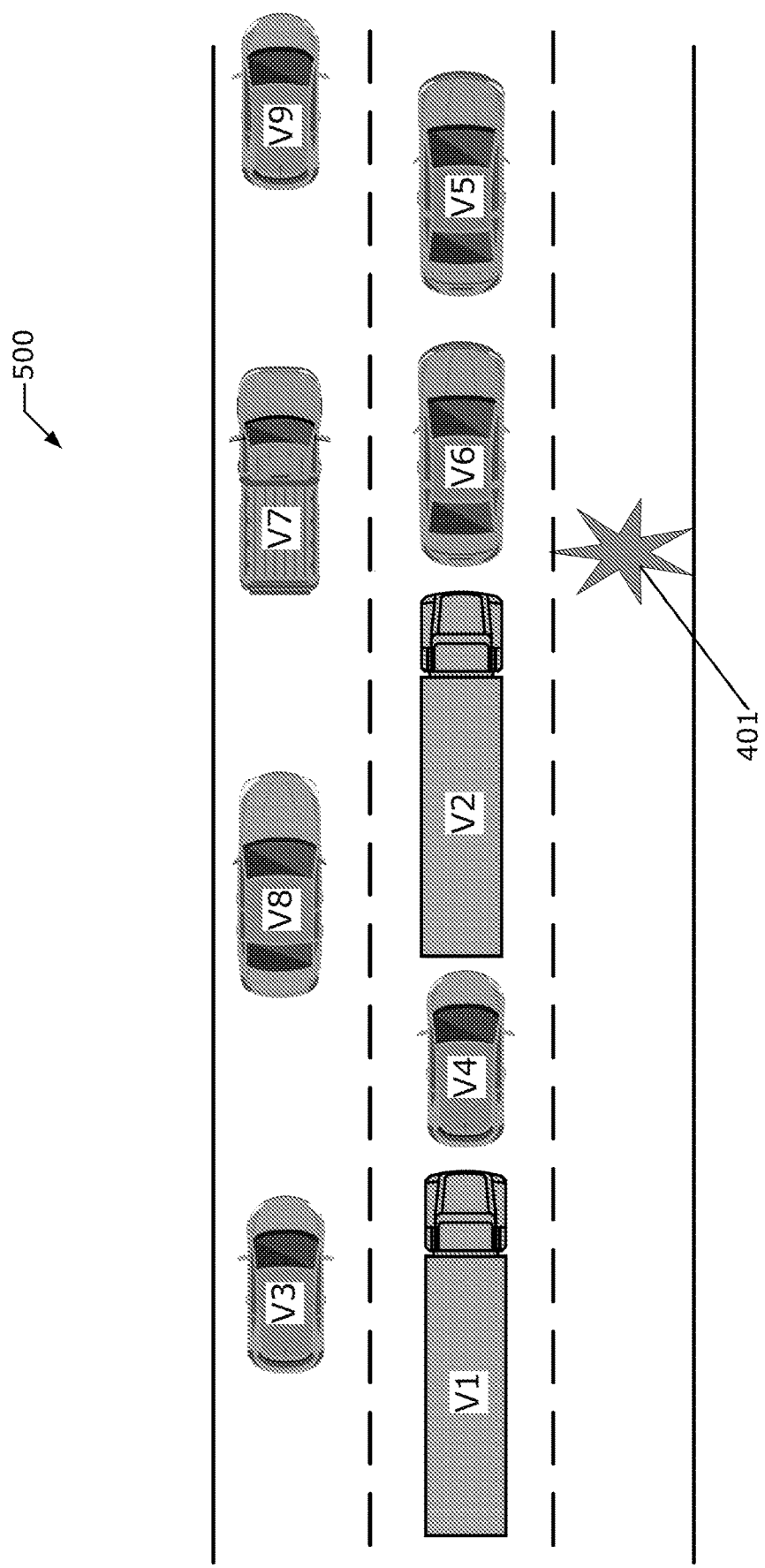

Once Group Maneuver Coordination is completed (e.g., at T6), Vehicle V5 disbands the SL-EMCG 402 by sending a Disbanding Coordination Group Indication in a V2X message such as an ET-MCM with a Maneuver Coordination/Negotiation Container. The SL-EMCG Disbanding Indication may include one or more of the following data items: Group ID; Disband Indication; and Disband Reason (e.g., reason/status code or value). FIG. 5 shows an example 500 of the result of EGMC after successfully handling the Emergency Maneuver Coordination event condition (e.g., the USCS 401 of FIG. 4).

1.1.2. EGMC Embodiment 2

The second embodiment is related to scenarios where there is an R-ITS-S 130 in the proximity of a detected USCS and the R-ITS-S 130 serves as the leader for a Short-Lived Maneuver Coordination Group. In the second embodiment, most of the steps are similar to Embodiment 1. One difference is that after USCS is detected by a V-ITS-S 110 and informed to proximate V-ITS-S(s) 110/R-ITS-S(s) 130, the R-ITS-S 130 takes the role of leadership. The V-ITS-Ss 110 are aware of R-ITS-S 130 presence due to periodic V2X messages exchanges among them. If a V2X message such as Event-Triggered (ET) MCM with a Maneuver Coordination/Negotiation Container indicating initiation of EGMC from R-ITS-S 130 is not received for a pre-defined time, the first V-ITS-S 110 detecting the USCS can serve as leader and initiates EGMC as in Embodiment 1.

Figure 6:
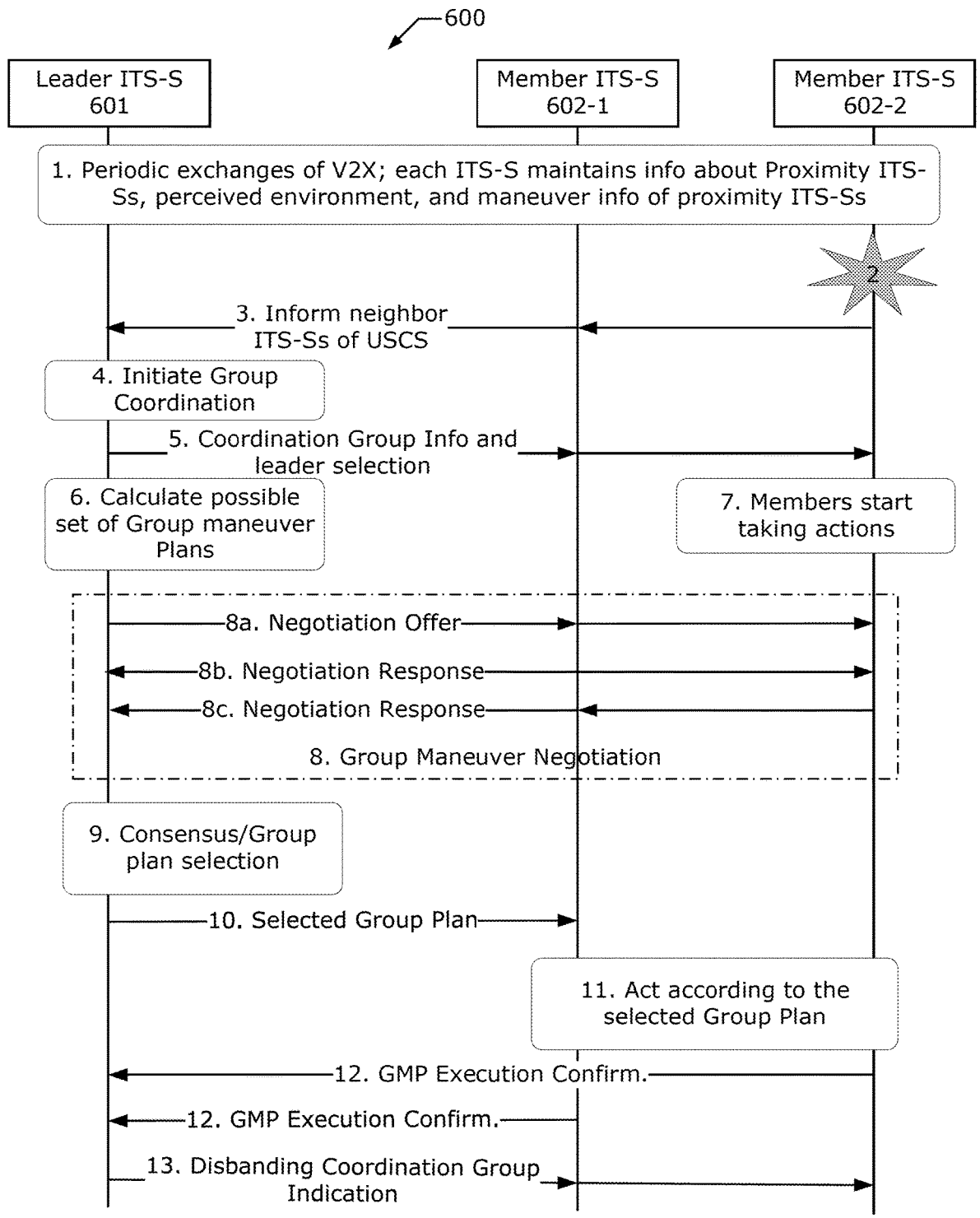
FIG. 6 illustrates an example EGMC according to a second embodiment.

FIG. 6 shows an example EGMC procedure 600 in case of detection of a USCS according to the second embodiment. In this example, there is an R-ITS-S 130 in the proximity of Detected USCS 201. In this embodiment, the R-ITS-S 130 Serves as the leader ITS-S 601 for the SL-EMCG.

The EGMC procedure 600 begins at step 1 where periodic V2X messages (e.g., BSM, CAM, CPM, MCM, etc.) is communicated between the ITS-Ss 601, 602-1, 602-2. Although there are only two ITS-Ss 602-1, 602-2 shown by FIG. 6, it should be noted that there may be many more or fewer ITS-Ss 602 than shown for this example. Each ITS-Ss 601, 602-1, 602-2 maintains information about proximity vehicles (e.g., location, speed, heading, etc.), perceived environment from suitable V2X msgs (e.g., BSM, CAM, CPM, etc.); and maneuver information of proximity vehicles from suitable V2X msgs (e.g., MCMs).

At step 2, the ITS-S 602-2 is the first to detect USCS 201 in front of it. At step 3, the ITS-S 602-2 informs neighboring ITS-Ss 601, 602-1 and/or other neighboring ITS-Ss (e.g., V-ITS-Ss 110, R-ITS-Ss 130, and/or VRU ITS-Ss 117) about detection of the USCS 201, and indicates Potential of ECMC by an RSU soon. The ITS-S 602-2 may inform the neighboring ITS-Ss using a suitable V2X msg (e.g., DENM, BSM, CAM, CPM, MCM, etc.).

At step 4, the leader 601 initiates Group Coordination, which may involve calculating a maximum time available for negotiation/execution for GMP; identifying ITS-Ss 602 to be included in the Coordination Group; electing itself as leader 601 of the Coordination Group; and/or other like actions. At step 5, the leader 601 informs proximity ITS-Ss 602 (e.g., V-ITS-Ss 110 in the coordination group) about initiation of EGMC with Coordination Group Info and self selection as leader. The leader 601 may inform the proximity ITS-Ss 602 using a suitable V2X msg such as an ET MCM and/or some other V2X message such as those discussed herein.

At step 6, the leader 601 determines a possible set of GMPs (e.g., a set of candidate GMPs), where each GMP includes one or more coordinated/sequential urgent maneuver tasks/actions for coordination group member ITS-Ss 602. The leader 601 may also calculate a cost for each GMP, sort the GMPs, and send a first preferred GMP via a suitable V2X msg for negotiation. The leader 601 may provide the GMPs using a suitable V2X msg such as an ET MCM and/or some other V2X message such as those discussed herein. At step 7, the coordination group member ITS-Ss 602 start taking actions such as deacceleration which may or may not be acceptable before coordination takes place, evaluating possible set of changes in current maneuver that can be offered during negotiation for the group, and the like. In embodiments, step 7 is performed by all members in the group (e.g., ITS-Ss 602-1 and 602-2 in this example).

At step 8, Group Maneuver Negotiation takes place which includes steps 8a, 8b, and 8c. 8a. Step 8a includes the negotiation offer being sent by the leader 601 to the coordination group member ITS-Ss 602 using a suitable V2X msg (e.g., ET MCM and/or some other V2X message such as those discussed herein). Step 8b is a negotiation response sent by member ITS-S 602-1 to other member ITS-Ss 602 (e.g., member ITS-S 602-2) and to the leader 601 using a suitable V2X msg, and step 8c is a negotiation response sent by member ITS-S 602-2 to other member ITS-Ss 602 (e.g., member ITS-S 602-1) and to the leader 601 using a suitable V2X msg. The suitable V2X msg for the negotiation responses may be, for example, an ET MCM and/or some other V2X message such as those discussed herein. The member ITS-S 602 and/or leader 601 may use the same or different V2X msgs for the negotiation messages of Step 8.

The leader 601 puts forward one or more of the preferred candidate GMPs (e.g., based on the costs and/or other criteria such as those discussed herein) until group consensus is reached (up to N-max-Rejection) in a same or similar manner as discussed previously with respect to embodiment 1.

At step 9, the leader 601 determines if a consensus is reached or if GMP selection needs to take place. If Consensus is reached, the agreed-to GMP is selected. Otherwise, the leader 601 selects a GMP from among the candidate GMPs based on the negotiation responses so far (if any), and at step 10, the leader 601 sends the selected GMP to the member ITS-Ss 602 and acts upon it. The selected GMP may be sent to the member ITS-Ss 602 using a suitable V2X msg (e.g., ET MCM and/or some other V2X message such as those discussed herein).

At step 11, each of the member ITS-Ss 602 act according to the selected GMP (e.g., execute or initiate their respective maneuvers according to the selected GMP). At step 12, some or all of the member ITS-Ss 602 send a Group Plan Execution Confirmation (or GMP execution confirmation/ACK) message to the leader 601 to indicate successful maneuver changes/coordination using a suitable V2X msg such as, for example, an ET MCM and/or some other V2X message such as those discussed herein. The member ITS-S 602 may use the same or different V2X msgs for the GMP execution confirmation/ACK. At step 13, the leader 601 sends a Disbanding Coordination Group Indication based on the GMP execution confirmation/ACK msgs using a suitable V2X msg such as, for example, an ET MCM and/or some other V2X message such as those discussed herein.

Figure 7:
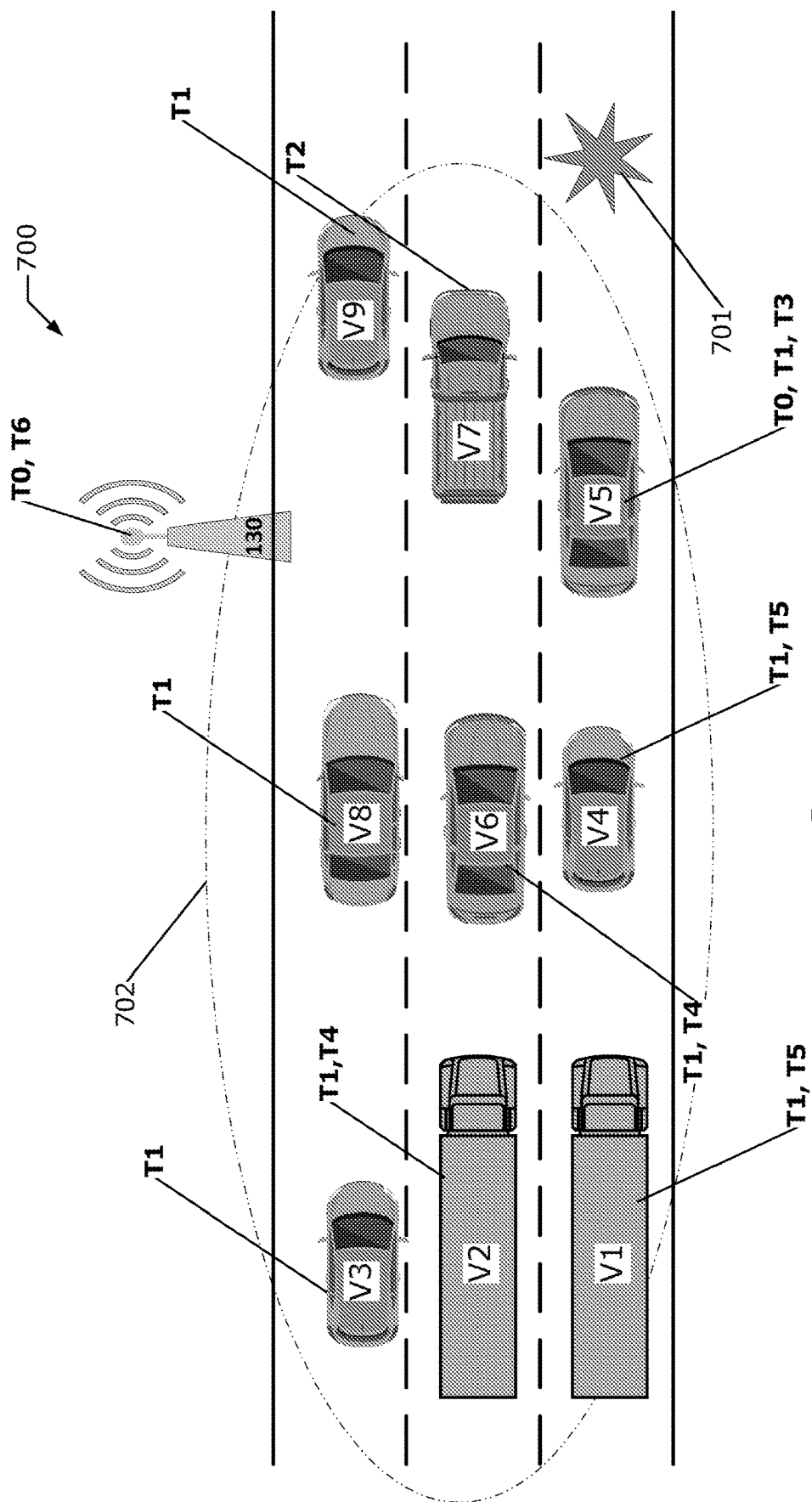
FIG. 7 illustrates another example of EGMC according to the second embodiment.

FIG. 7 shows another example 700 of a EGMC for an unexpected emergency event 701 according to the second embodiment. The unexpected emergency event 701 may correspond to USCS 201 of FIG. 2, where the vehicles 110 operate according to the EGMC procedure 600 of FIG. 6. In this example, there is an R-ITS-S 130 in the proximity of detected USCS 701 and the R-ITS-S 130 serves as the leader for the SL-EGMC.

In the example of FIG. 7 (and with reference to FIG. 6), the Vehicle V5, when a USCS 701 arises or is detected, one or more V-ITS-S(s) 110 and/or R-ITS-S(s) 130 detect the USCS 701 based on sensor data from on-board sensors and/or remote/peripheral sensors. In this example, Vehicle V5 is assumed to detect the event 701 first. Then, Vehicle V5 informs neighboring V-ITS-Ss 110 and the R-ITS-S(s) 130 (and/or VRU ITS-S(s) 117) about detection of USCS 701 immediately by sending a V2X msg (e.g., an MCM with Detected Situations/Maneuvers Container, DENM, BSM, CAM, CPM, etc.). Vehicle V5 also indicates the potential necessity of EGMC by R-ITS-S 130 in the V2X msg. The proximity (or proximate) R-ITS-S 130 then declares itself as leader of the SL-EMCG as shown in FIG. 6 and performs other operations as described for leader in Embodiment 1. If a V2X message such as an ET-MCM with a Maneuver Coordination/Negotiation Container indicating initiation of EGMC from R-ITS-S 130 is not received for a pre-defined time, the first V-ITS-S 110 V5 detecting the USCS can serve as leader and initiates the EGMC as in Embodiment 1. In some embodiments, embodiment 1 may be a fallback procedure of Embodiment 2. In the example of FIG. 7, the sequence of actions/tasks of the selected GMP may be as follows:

At task/time (T) 0, vehicle V5 (the first vehicle detecting Emergency Maneuver Coordination Event) informs RSU-1. The R-ITS-S 130 prepares Emergency Maneuver Plan Options, negotiates with coordination group members (e.g., ITS-Ss within SL-EGMC region 702), selects a GMP for the coordination group, and informs the coordination group members about selected GMP.

At T1, vehicle V1 deaccelerates, be ready to stop; vehicle V2 deaccelerates; vehicle V3 deaccelerates; vehicle V4 deaccelerates, be ready to Stop; vehicle V5 deaccelerates, be ready to stop; vehicle V6 deaccelerates; vehicle V8 deaccelerates; and vehicle V9 deaccelerates.

At T2, vehicle V7 accelerates and moves to left lane after safe gap; then Accelerates.

At T3, vehicle V5 moves to middle lane after safe gap.

At T4, vehicle V2 accelerates; vehicle V6 accelerates.

At T5, vehicle V1 moves to middle lane after safe gap; and vehicle V4 moves to middle lane after safe gap.

At T6, the R-ITS-S 130 disbands the maneuver coordination group.

1.1.3. EGMC Embodiment 3

The third embodiment is related to scenarios where there is no R-ITS-S 130 in the proximity of a detected USCS and Maneuver Coordination takes place in a distributed manner. Embodiment 3 is similar to embodiment 1, however, no explicit leader is selected for maneuver coordination in this embodiment after detection of the USCS. In this embodiment, maneuver coordination and negotiation are performed in a distributed manner.

Figure 8:
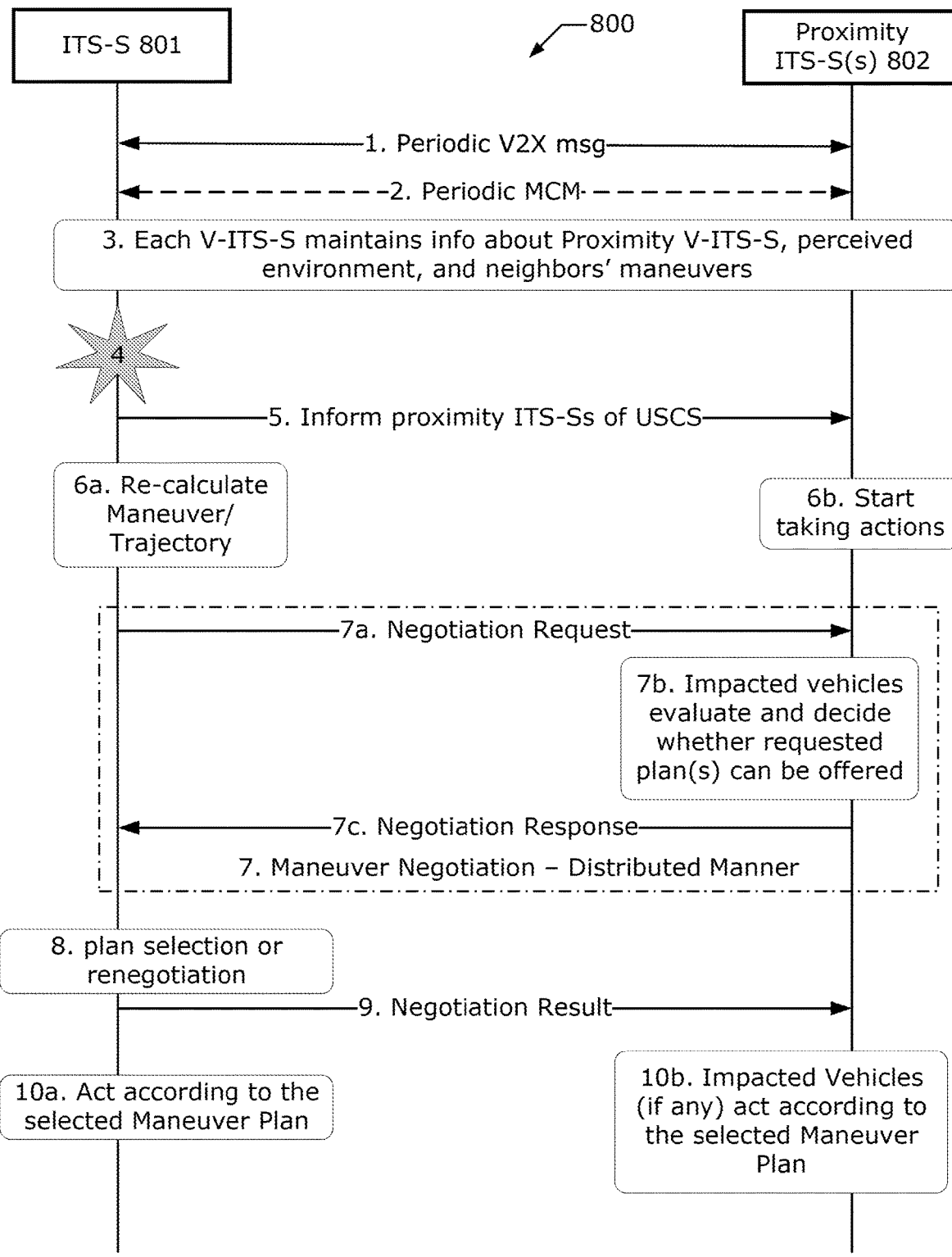
FIG. 8 shows an example EGMC procedure according to a third embodiment.

FIG. 8 shows an example EGMC procedure 800 according to the third embodiment. EGMC procedure 800 is used in case a USCS is detected in a distributed manner without explicit leader selection. EGMC procedure 800 begins at steps 1, 2, and 3, where steps 1, 2, and 3 in EGMC procedure 800 are the same or similar as steps 1, 2, and 3 of EGMC procedure 300, respectively.

At step 4, the ITS-S 801 is the first to detect a USCS (e.g., same or similar to USCS 201 of FIG. 2) in front of it. At step 5, the ITS-S 801 informs any proximity ITS-S 802 (e.g., ITS-Ss 110, 130, 117, if any) about detection of the USCS 201, and indicates potential of EGMC. The ITS-S 801 may use any suitable V2X message such as a DENM, BSM, CAM, CPM, MCM, and/or any other like message such as those discussed herein.

At step 6a, the ITS-S 801 re-calculates its maneuver(s)/trajectory(ies) assuming no Group Coordination (Plan 0), and starts acting on Plan 0. Additionally, the ITS-S 801 calculates requested trajectories/maneuver plans (e.g., Plan 1, Plan 2, . . . , Plan $N_{max}$ (where $N_{max}$ is a maximum number of maneuver plans)) assuming Group Coordination, calculate a maximum time available for negotiation/execution for GMPs, identifies ITS-Ss 802 to be impacted by requested plans. Similar to the other embodiments discussed herein, each maneuver plan/GMP comprises coordinated/sequential urgent maneuver tasks for selected ITS-Ss 801, 802. At step 6b, the proximity ITS-S 802 start taking actions such as deacceleration which may or may not be acceptable before coordination; evaluate possible set of changes to current maneuver(s) that can be offered during negotiation, etc.

At step 7, maneuver negotiation takes place, which includes steps 7a, 7b, and 7c. At step 7a, the ITS-S 801 sends a Negotiation Request to the ITS-Ss 802 using a suitable V2X msg (e.g., ET MCM). The Negotiation Request is a request for Coordination with a current maneuver plan (e.g., Plan 0) and one or more Requested Plans (e.g., Plan 1, Plan 2, . . . , Plan $N_{max}$) with impacted ITS-Ss 802 for each requested plan. At step 7b, the impacted ITS-Ss 802 of the requested plan(s) evaluate and decide whether any of the requested maneuver plan(s) can be offered. New offered maneuver plans can also be suggested. At step 7c, negotiation response(s) are sent by the ITS-Ss 802 to indicate acceptance or rejection of the requested maneuver plan(s) using a suitable V2X msg (e.g., ET MCM).

At step 8, if one or more of the requested maneuver plan(s) are accepted by all impacted ITS-Ss 802, one of the requested maneuver plan(s) is selected by the ITS-S 801 and negotiation stops. Otherwise, new requested maneuver plan(s) may be calculated by the ITS-S 801 based on offered maneuver plans in Negotiation Response for a new round of Negotiation (step 7) (up to max N-Max-Negotiation Rounds). If negotiation fails, the ITS-S 801 keeps Plan 0 and sends Negotiation End message with Negotiation Result.

At step 9, the ITS-S 801 sends a negotiation result msg using a suitable V2X msg (e.g., ET MCM) including or indicating the selected maneuver plan with impacted ITS-Ss 802 if negotiation is successful. Otherwise, the negotiation result msg carries Plan 0 as the selected maneuver plan. At step 10a, the ITS-S 801 acts according to the selected maneuver plan (e.g., executing one or more maneuver tasks, etc.), and at step 10b, the impacted ITS-Ss 802 (if any) act according to the selected maneuver plan (e.g., executing one or more respective maneuver tasks, etc.).

In the example of FIG. 8, maneuver coordination and negotiation are performed in a distributed manner. In the third embodiment, when a USCS arises, one or more V-ITS-Ss 110 detect the Emergency Maneuver Coordination event condition (e.g., the USCS) using on-board and/or remote sensors.

As an example of the operation of the third embodiment, Vehicle V5 of FIG. 2 detects the event 201 first, and Vehicle V5 informs Neighboring V-ITS-S(s) 110/R-ITS-S(s) 130 (and VRU ITS-S(s) 117) about detection of USCS immediately by sending a V2X message such as MCM (e.g., via Detected Situations/Maneuvers Container of MCM), Decentralized Environmental Notification Message (DENM), BSM/CAM, or a CPM. Vehicle V5 also indicates Potential necessity of EGMC urgently in the message. Vehicle V5 re-calculates its Maneuver/Trajectory assuming no Group Coordination (Plan 0); Start acting on Plan 0 without waiting for group coordination. Group maneuver coordination and negotiation will also be going on in parallel. Vehicle V5 also calculates Requested Trajectories/Maneuver plans (Plan 1, Plan 2, . . . Plan Nmax) for maneuver negotiation assuming potential Group Coordination; Calculates Max. time available for negotiation/execution for Maneuver Plans; Identifies V-ITS-Ss 110 to be impacted by requested plans (e.g., each Plan means coordinated/sequential urgent maneuver tasks for one or more proximate V-ITS-Ss 110).

Each requested plan may contain one or more of the following data items: Requested GMP ID; Requesting V-ITS-S's 110 ID (Vehicle V5 ID); Planned Tasks with following Info for each Task: trajectory, acting V-ITS-Ss 110/Group-members IDs, execution-sequence #, execution-Time, dependency on planned other tasks; and/or other like information/data.

Meanwhile, other group members (non-leader members) may start taking actions such as deceleration which is fine before coordination. These members also evaluate possible set of changes in their current maneuver that can be offered during negotiation for the group coordination.

Vehicle V5 now sends Negotiation offer via a V2X message such as ET-MCM (with a Maneuver Coordination/Negotiation Container) to the group requesting for Coordination to change its current maneuver plan (Plan 0). Negotiation offer carries Plan 0 and Requested Plans (Plan 1, Plan 2, . . . Plan Nmax) with impacted V-ITS-Ss 110 for each requested plan. Impacted V-ITS-Ss 110 of requested plan(s) evaluate and decide whether requested plan(s) can be accepted/offered. New Maneuver plans may also be offered/recommended by proximate V-ITS-Ss 110. Impacted V-ITS-Ss 110 of Requested Maneuver Plan(s) send acceptance or rejection via a V2X message such as ET-MCM (with a Maneuver Coordination/Negotiation Container). Negotiation Response may include one or more of the following data items: Rejected or accepted; Responding V-ITS-S 110 ID; Rejection reason if rejected; and/or other like data items.

If one or more requested plans are accepted by all impacted V-ITS-Ss 110 of those plans, one of them is selected and Negotiation stops. Otherwise, new requested maneuver plans may be calculated based on offered maneuver plans in Negotiation Response for a new round of Negotiation (up to max N-Max-Negotiation Rounds). If negotiation fails for N-Max-Negotiation Rounds, V-ITS-S 110 keeps Plan 0 and stops any further negotiation. Vehicle V5 sends Negotiation End message with Negotiation Result via a V2X message such as ET-MCM (with a Maneuver Coordination/Negotiation Container).

Negotiation Result carries selected Maneuver plan with impacted V-ITS-Ss 110 if negotiation is successful. Otherwise it carries Plan 0 as selected Maneuver plan. Selected Maneuver Plan may include one or more of the following data items: Selected Maneuver Plan ID; Planned Tasks with following Info for each Task: trajectory, acting V-ITS-Ss 110/Group-members IDs, execution-sequence #, execution-Time, dependency on planned other tasks; Selection Reason—selection reason for this plan. It can be Accepted by all Impacted V-ITS-Ss 110, All Requested Plans rejected (in case of Plan 0 selection); and/or other like information. Vehicle V5 and Impacted V-ITS-Ss 110 (if any) act according to the selected Maneuver Plan.

1.2. Maneuver Coordination Message (MCM) Embodiments 1.2.1. Example MCM Formats

MCS may utilize a message type referred to as a Maneuver Coordination Message (MCM). MCMs include a set of DEs and/or DFs to transmit vehicle status, trajectory, and maneuver intention. MCS assists in Traffic Congestion Avoidance coordination (e.g., in a case a vehicle may be in deadlock if there are parallel slow vehicles in front of it in all lanes), traffic efficiency enhancement (e.g., merging into a highway, exiting a highway, and the like), smart intersection management, emergency trajectory coordination (e.g., in case when an obstacle, animal, child suddenly comes in a lane and more than one vehicles are required to agree on a collective maneuver plan), etc. Maneuver sharing can also help in enhancing user experience by avoiding frequent hard breaks as the front and other proximity vehicles indicate their intention in advance whenever possible. Currently, there are no known solutions to enable MCS among proximity vehicles (although ETSI has begun a work item in this area, see e.g., ETSI TR 103 578 V0.0.2 (2018 October) ("[i1]")).

The present disclosure provides MCS embodiments for Vehicular Networks. Embodiments include MCM format and structure, details of contents of MCMs, and procedures for generation and transmission of MCMs with reduced communication overhead. Embodiments also include integrated messages to carry CPMs and MCMs together, which further conserves computing and network resources.

According to various embodiments, the MCS and MCMs allow for neighboring stations to coordinate their intended maneuvers.

FIG. 9 shows an example of MCM format 900, according to various embodiments. The MCM format 900 may be defined using ASN.1 (ITU-T Recommendation X.680) or using some other suitable language, such as those discussed herein. Similar to other standardized message formats, UPER may be used for the serialization of the payload.

As shown in FIG. 9, the MCM includes a section or part referred to as an ITS PDU Header and one or more mandatory or optional containers. The ITS PDU Header is a common header that includes information regarding protocol (e.g., V2X RAT) version/type, message type, and ITS-S ID of the originating ITS-S. The ITS PDU Header also defines the standard DFs and/or DEs for the definition of the message type and the station/node ID. Each container is composed of a sequence of optional or mandatory DEs and/or DFs. The developed message format of the MCM may include both mandatory and optional DFs/DEs for realizing maneuver coordination among stations. The employed DEs and DFs of the MCM may be taken from the ETSI CDD (see e.g., ETSI TR 103 562 V0.0.15 (2019 January) ("[TR103562]"), and [TS102894-2]). In addition to the ITS PDU Header, the MCM 900 also includes various MCM parameters 901, which include the following containers and sub-containers.

The MCM-Management Container provides basic information about the message such as station type of the originating station (e.g., an ITS vehicle and/or a CA/AD vehicle, an R-ITS-S 130, a VRU ITS-S 117, and/or the like), a message ID, message type (e.g., MCM, CPM, or combined MCM-CPM), MCM generation and transmission scheme (e.g., periodic full-size MCM, periodic incremental MCM, or event-triggered MCM), segmentation information, the reference position of the station, and/or other like information.

The Station Data Container provides information about the originating station (e.g., the station generating and sending the MCM). The optional Station Data Container provides more specific information about the originating station in addition to the information provided by the MCM-Management Container. The Station Data Container can be an Originating Vehicle Container when the originating station is a vehicle, or Station Data Container can be an Originating RSU Container when the originating station is an R-ITS-S 130 (see e.g., section 6.4 of [TR103562]). For example, the Originating Vehicle Container may contain dynamic information of the originating vehicle (see e.g., section 6.4.1 of [TR103562]), and an Originating RSU Container may be included to provide references to identification numbers provided by MAP Messages and/or the like (see e.g., section 6.4.2 of [TR103562]). Regardless of the station type, stations may share maneuvers and/or help in maneuver coordination. For example, R-ITS-S(s) 130 may help in emergency trajectory alignment at an intersection by participating in maneuver coordination.

The Maneuver Sharing Container may carry two containers, including a Maneuver Intention Container and a Planned Trajectory Container. The Maneuver Intention Container may include information of intended action(s) given the current traffic situation such as lane change, highway merge, etc. The Planned Trajectory Container includes information used to execute the intended maneuver.

The Maneuver Intention Container provides a way to share a station's planned intention(s). If no other maneuver intentions are available, the station can report 'following Traffic' or the like. The station can also report multiple intentions in order of priority (e.g., lane change to the left with higher priority or alternatively lane change to the right if the left lane is obstructed). Lane Changes may include, for example, lane passes, overtakes, cut-ins or merges, drift into ego-lane, etc. Examples of the types of lane change information that may be shared are as follows: timestamp/time of request; current lane, target lane, intended time to enter target Lane; reason for a lane change; and/or perception information. The reasons for the lane change may include, for example, attain faster travel speed (left lane), upcoming highway exit (move from middle or left lane to right lane), merging onto a highway or other like a roadway, exiting a highway; unplanned sudden stop (e.g., based on a detected object/accident in the current lane), and/or the like.

The perception information of the impacted region, such as perceived vehicles likely to be impacted immediately in a new lane for a lane change, may also be provided. The perception information may be helpful, for example, when a station is not able to see some vehicles and is also planning to change lane to the same target lane obstructed by an object. In this way, the neighboring stations can warn of unseen vehicles. In some embodiments, the perception information can be shared in the same or similar manner as described as the 'Cost Map Container' by sharing a Cost Map of the area impacted by a station's maneuver, a neighbor's maneuver(s), and/or maneuvers coordination requested by the neighbor(s). The cost map can be based on a cost perceived by the station at the current time or predicted at a specific future time (e.g., at a future time when the station intends to move to a new lane under lane change maneuver). If a station misses some vehicles in its blind spot during a lane change, the neighbors can assist after looking at the station's cost map.

The Planned Trajectory Container is used to share a planned/predicted trajectory as a cumulative result of one or more intentions over a predefined time in the future. Stations can send multiple trajectories with different priorities (e.g., two different trajectories for left lane change). This can help for maneuver coordination among neighboring vehicles.

The Detected Situations Maneuvers Container provides specific driving/traffic situations, and neighboring stations' maneuvers that are either detected by the originating station or perceived through one or more received MCMs. The driving situations can be detected based on, for example, sensor data from on-board sensors and/or off-board sensors (e.g., RADAR, LIDAR, camera(s), etc.), collaborative messages from other stations, and the like. Example situations can include traffic deadlock where a vehicle/station may be in deadlock if there are parallel slow vehicles in front of it in all lanes, and at least one lane is free ahead of the deadlock; road accidents; roadwork including impacted areas such as lane closed, lane/traffic merged required, and/or other info; Safety-Critical Emergency Situation (e.g., person or animal enters roadway), which may include impacted area or impacted lanes, and the maneuvers or impacts may include hard breaks needed, and/or other info; detected congestion and reason including a congestion level, type of congestion, the reason of congestion, area impacted, and the like; specific road conditions detected on the road by onboard sensors (e.g., slippery road segments due to rain/ice); and/or the like. Some parts of this information may already be covered in other messages such as DENM, etc.

The Detected Situations Maneuvers Container also provides information on maneuvers of neighbors detected by the originating station, which may be based on, for example, sensor data from on-board sensors and/or off-board sensors, received MCMs from one or more neighbors, and/or the like. In some embodiments, only critical maneuvers of neighbors are included to reduce overhead. In some implementations, stations are expected also to share the maneuvers of VRU ITS-S(s) 117 as well as non-connected vehicles once they are perceived by the on(off)-board sensors. Additionally, VRU ITS-S(s) 117 may also be expected to share their maneuver intention(s) to neighboring stations for maneuver coordination. However, in such cases, VRU ITS-S(s) 117 can be given higher priority when coordinating the intended actions.

The Maneuver Coordination Container contains information about coordination initiation/requests and responses. In some cases, proximate stations may need to coordinate and agree upon each other's maneuvers before taking actions on the maneuvers. For example, for individual traffic deadlock handling requests and responses, a given vehicle/station may be in deadlock if there are parallel slow-moving vehicles in front of the given vehicle in all lanes, and there are free/open lanes ahead of the deadlock. Another example includes emergency trajectory coordination requests and responses for safety-critical emergency situations handling such as when a person or animal jumped into the road.

Figure 10:
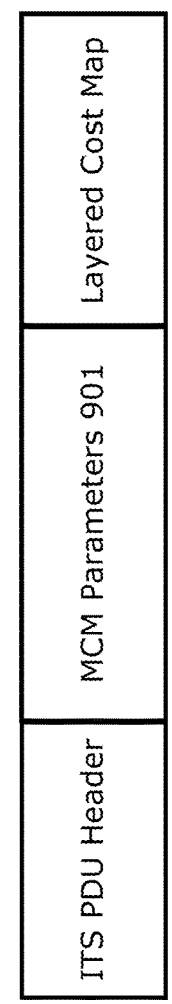

FIG. 10 shows another example MCM format 1000 according to various embodiments. The MCM format 1000 includes the ITS PDU Header, the MCM parameters 901 of MCM 900, and a Layered Cost Map Container.

The Layered Cost Map Container includes a Cost Map of the area impacted by a station's maneuver, neighbors' maneuvers, and maneuver coordination requested by the neighbor(s). As discussed in U.S. Provisional App. No. 62/865,103 filed Jun. 21, 2019 and Int'l App. No. PCT/US2020/038723 filed Jun. 10, 2020 (collectively referred to as "[AC3302]"), a cost map (or "costmap") is a data structure that contains a two-dimensional (2D) grid of costs (or "cost values") that is/are used for path planning. In other words, a costmap represents the planning search space around a vehicle, robot, or other movable object. The grid or cell values in the costmap are cost values associated with entering or traveling through respective grids or cells. Costmaps are used for navigating or otherwise traveling through dynamic environments populated with objects. For many use cases, such as CA/AD vehicles and/or (semi-)autonomous robotics, the travel path not only takes into account the starting and ending destinations, but also depends on having additional information about the larger contexts. Information about the environment that the path planners use is stored in the costmap. Traditional costmaps (also referred to as "monolithic costmaps") store all of the data (costs) in a singular grid. A layered costmap maintains an ordered list of layers, each of which tracks the data related to a specific functionality. The data for each of the layers is then accumulated into a master costmap. In some implementations, a cost map is a grid-based representation of a map where each cell carries a cost (indicating free or occupied) and/or probability that a specific type of obstacle/object/VRU is present. Vehicles may follow a global grid with the same size of cell representation. Vehicles prepare a cost map of rectangular size of specified dimensions (e.g., n cells by m cells where n and m are numbers) in the FoV. In various embodiments, when cost map sharing is enabled, a vehicle may prepare a bigger size cost map or a same size cost map as that for the vehicle's own use. Sharing cost Map may require changes in the dimension of cost map than that prepared for own use as neighbors are at different locations/lanes and heading to a different direction.

The "cost" or cost value in each cell of the costmap represents the cost of navigating through that grid cell. The state of each grid cell is one of free, occupied, or unknown. In other words, the cost value refers to a probability or likelihood that a given cell is free (unoccupied), occupied by an object, or unknown. Additionally, the "cost" of the cost map can be a cost as perceived by the station at a current time and/or a cost predicted at a specific future time (e.g., at a future time when the station intends to move to a new lane under a lane change maneuver).

In case the original costmap contains the cost perceived at the current time, it is either included in either the MCM or a CPM, but not both to reduce overhead. However, a differential cost map can be contained in either an MCM, CPM, or concurrently to enable fast updates to the cost map. For example, if a cost map update is triggered by an event and the station is scheduled for MCM transmission, the updated cost map can be included in the MCM.

If a station is unable to observe vehicles or other objects in a blind spot during a lane change, neighboring stations can help after looking at the station's costmap. Here, help refers to sending an MCM or other like a cooperative message to indicate the existence of the unseen vehicles/objects.

A layered costmap with a separate layer of dynamic objects/neighboring vehicles can be shared based on which vehicle is planning its maneuver. Different layers can be added to the layered costmap for lane changes based on, for example, locations of neighboring vehicles/objects at a current/present time and at the time of lane change completion. The layered costmap may also consider intersection, lane markings (e.g., solid line(s), dotted line(s), double lines, or the like) indicating whether the vehicle is allowed to change lanes or not, conditions allowing lane change which is normally not permitted (e.g., a stopped vehicle with hazard lights in front, work ahead, temporary lane closed, accident ahead, etc.), and the like. Other factors, such as safe spaces (e.g., recommended inter-vehicle distance/time+ guard distance/time) in front of a vehicle during lane change, can also impact costmap generation. These factors may depend on users'/passengers' choice.

The cost maps can be generated based on on-board and/or off-board sensor, collective perception (e.g., from MCMs of neighboring stations), predicted trajectory of other vehicles which may be needed for at least non-autonomous vehicles, and trajectory shared by neighboring vehicles or stations. The layered costmap may be built as discussed in [AC3302], and costmap information may be shared among proximate vehicles, as discussed in [AC3302].

In case the cost map is dedicated for a future specific time, and no convergence on the maneuver is reached, the confidence level layer (see e.g., [AC3302]) can be adjusted to reflect the multiple trajectories shared by neighboring stations and their priorities. For example, the cost map pixels with lower priority trajectories of neighboring stations can be considered as projected free space with a given confidence interval based on the number of stations (the higher the trajectories, the lower the confidence level).

1.2.2. Integrated/Combined Message to Carry CPM and MCM Together

In various embodiments, MCMs can be merged with CPMs so that a common (unified) Management Container and Station Data Container can be used. In such embodiments, a flag or other indicator can be added to indicate the message type if their generation, transmission frequency, and/or periodicities are different. For example, one value of the flag/indicator may indicate that the message only includes MCM(s), another value of the flag/indicator may indicate that the message only includes CPM(s) only, and yet another value of the flag/indicator may indicate that the message includes a combined MCM-CPM.

In various embodiments, an integrated message is used to enable both CPMs and MCMs to be jointly transmitted. In particular, by changing the msgType field in the management container, the transmitter station can indicate to the receiving station that this message will be carrying the combined parameters of both the CPM and the MCM. The format of this message is described next.

Figure 11:
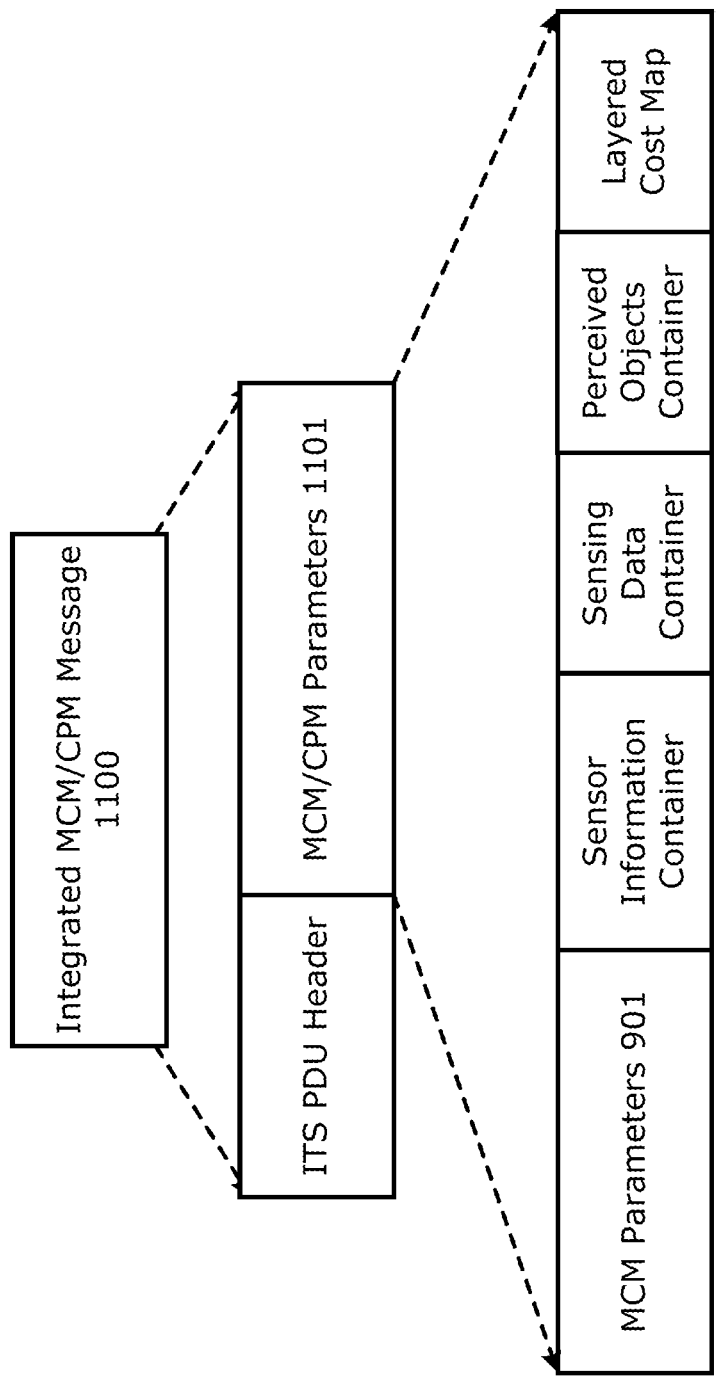
FIG. 11 illustrates an example message format and structure for an integrated CPM/MCM according to various embodiments.

FIG. 11 shows an example message format and structure for an integrated CPM/MCM 1100 according to various embodiments. The integrated CPM/MCM 1100 includes an ITS PDU Header, the MCM parameters 901 of MCM 900, and a Layered Cost Map Container, which may be the same or similar as the Layered Cost Map Container of MCM 1000. As shown in FIG. 11, in addition to the MCM fields/containers of FIGS. 9 and 10, three additional containers are added to carry CPM parameters, including a Sensor Information Container, a Sensing Data Container, and a Perceived Objects Container.

The Sensor Information Container carries the related sensor information parameter such as the sensor type, sensor ID and/or station ID, and detection area. The information in the Sensor Information Container is used by the receiving station in cases where raw sensor data needs to be processed.

The Sensing Data Container carries raw sensor data perceived by one or more onboard (or off-board) sensors. The raw sensor data contains the largest amount of information about the FoV of a particular sensor. For example, the "See-Through" and "FOV expansion" applications require raw sensor data or raw sensor data with minimal processing. Carrying raw sensor data is expensive in terms of radio resources. Thus, if the resources are available, the raw sensor data could be carried to enable those applications.

The Perceived Objects Container carries information about one or more objects that are perceived by the Station's on-board sensors. Examples of such information include speed, direction, acceleration, and boundaries of the perceived objects. In addition, the Perceived Objects Container provides a confidence level (or cost value) in the perceived object.

Additionally or alternatively, the Sensor Information Container, the Sensing Data Container, and the Perceived Objects Container may carry information that is the same or similar to the information for such containers as discussed in [AC3302].

The MCM and/or CPM parameters 901/1101 of FIGS. 9, 10, and 11 comprise multiple containers. Current ETSI standards may define various containers as comprising a sequence of optional or mandatory data elements (DEs) and/or data frames (DFs). However, it should be understood that the requirements of any particular standard should not limit the embodiments discussed herein, and as such, any combination of containers, DFs, DEs, values, actions, and/or features are possible in various embodiments, including any combination of containers, DFs, DEs, values, actions, and/or features that are strictly required to be followed in order to conform to such standards or any combination of containers, DFs, DEs, values, actions, and/or features strongly recommended and/or used with or in the presence/absence of optional elements. The DEs and DFs included in the MCM and/or integrated MCM/CPM formats are based on the ETSI Common Data Dictionary (CDD) [TS102894-2] and/or makes use of certain elements defined in CEN ISO/TS 19091.

1.3. Trajectory Sharing Techniques

To reduce overhead, embodiments provide that stations can use various techniques for representing their trajectories to improve signaling efficiency. Examples of such techniques include using waypoints and/or parametric representations.

Waypoints are unique addresses for any point in the world using coordinate units such as latitude and longitude, GNSS/GPS coordinates, USNG coordinates, UTM grid coordinates, and/or the like. A series of waypoints can be used to determine a particular trajectory for a vehicle where the trajectory planner defines the control input to reach the next waypoint smoothly.

Figure 12:
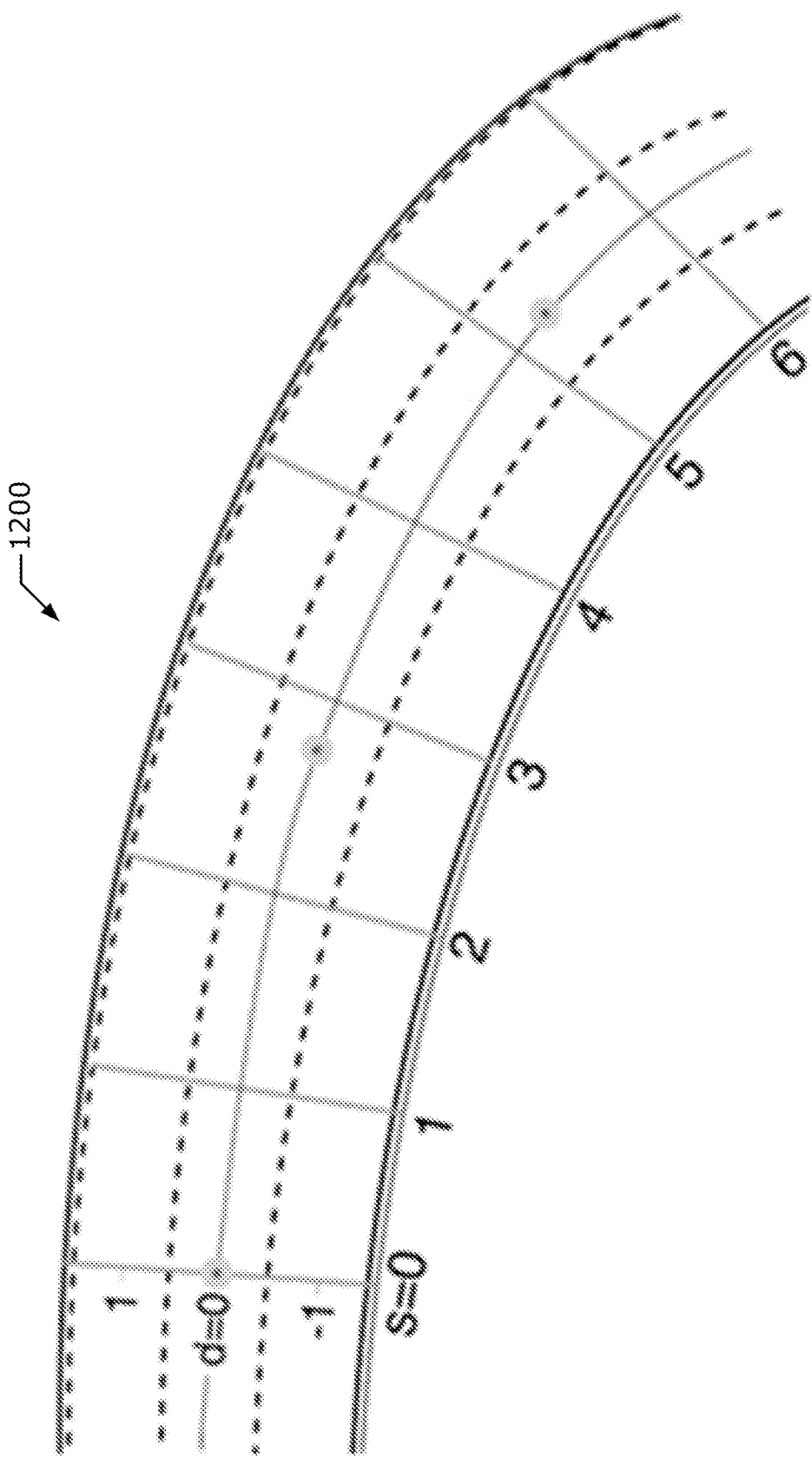
FIG. 12 illustrates an example trajectory planner using waypoints according to various embodiments.

FIG. 12 shows an example where various waypoints are used to describe the trajectory of a vehicle in a curved road segment. In the example of FIG. 12, a spline is used to link waypoints represents the trajectory planner. The term "spline" refers to data interpolation and/or smoothing function(s). A spline may represent segments of linear projections by piece-wise polynomial functions that can be modified to fit the constraints of a projected path or terrain map/model. One spline implementations involve fitting a spline directly on the modeled terrain to traverse the path. Another spline implementations involve generating a piece-wise continuous path (linear projections) and fitting a curve to that path. Other implementations may be used in other embodiments.

Parametric representation involves using parametric equations to express the coordinates of the points that make up a curve. In embodiments, the parametric representation may be or include Frenet-Serret frames (or simply "Frenet frames"), which describe the kinematic properties of a particle or object moving along a continuous, differentiable curve in 3D Euclidean space. In these embodiments, the station trajectory is mainly represented through the derivatives of the tangent, normal, and binormal unit (TBN) vectors of the trajectories. FIG. 13 shows an example of Vehicle trajectory represented using the Frenet frame(s).

In addition, the accuracy of the trajectory representation can be selected based on the underlying driving conditions. In these embodiments, a tradeoff between efficiency and accuracy may be made. As examples, the following conditions or criteria can trigger different reported points per trajectory: current speed and/or neighboring station speed (e.g., the higher the speed, the larger the number of points per trajectory to improve the accuracy); situation intensity which may indicate a probability of having a collision (e.g., higher the probability of collision due to the current situation may require an increase in the accuracy of the trajectory for better maneuver coordination); and station type such as CA/AD vehicles 110, VRU ITS-S(s) 117, UAVs, normal (non-V2X) vehicles, R-ITS-S 130, and/or other station types (e.g., VRU(s) 116 can elect to send larger number of points per trajectory to offer better accuracy).

1.3.1. Trajectory Planning and Convergence

Figure 14A:
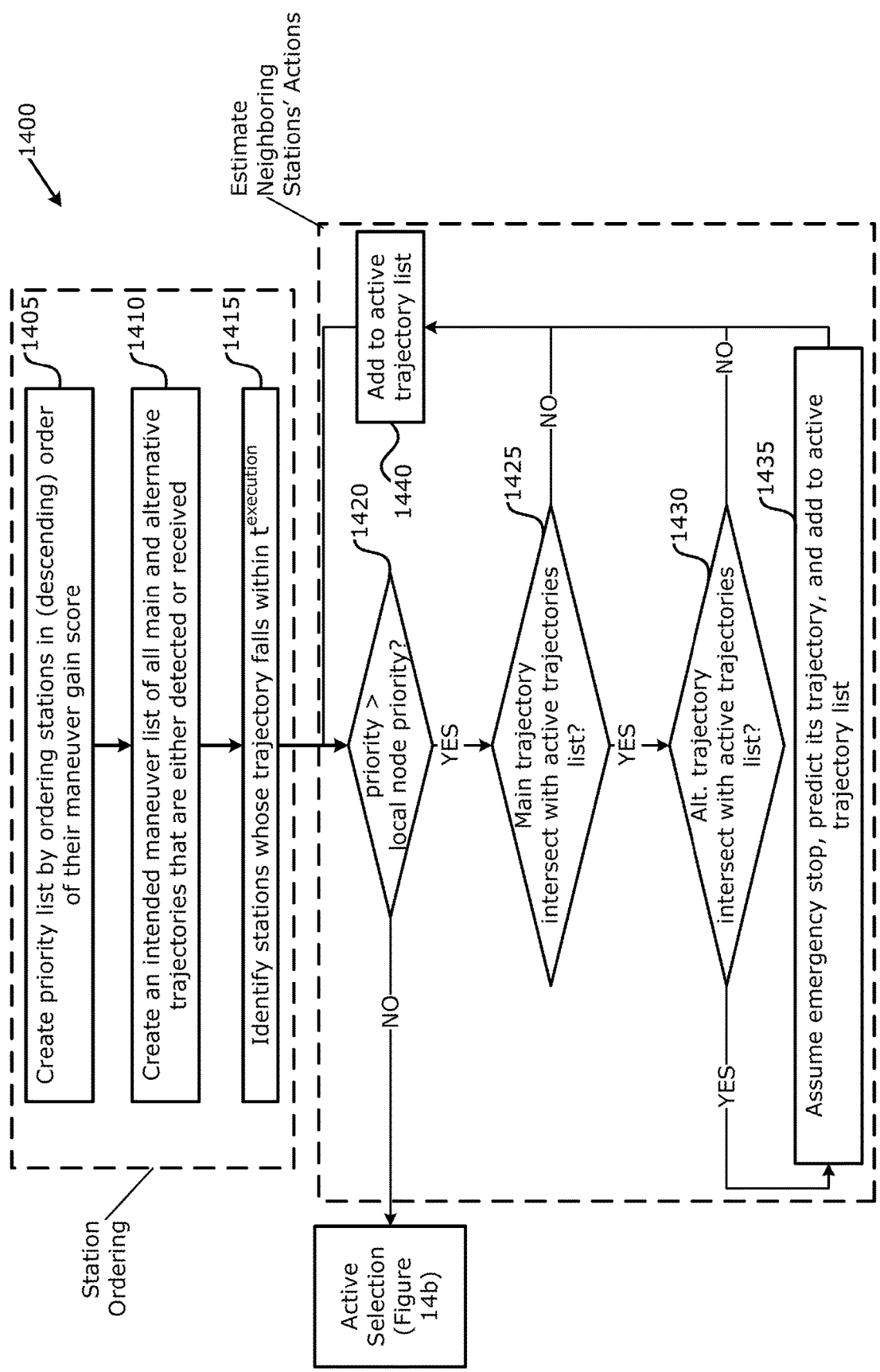
FIGS. 14a and 14b illustrate an example procedure for the trajectory planning and convergence mechanism according to various embodiments.
Figure 14B:
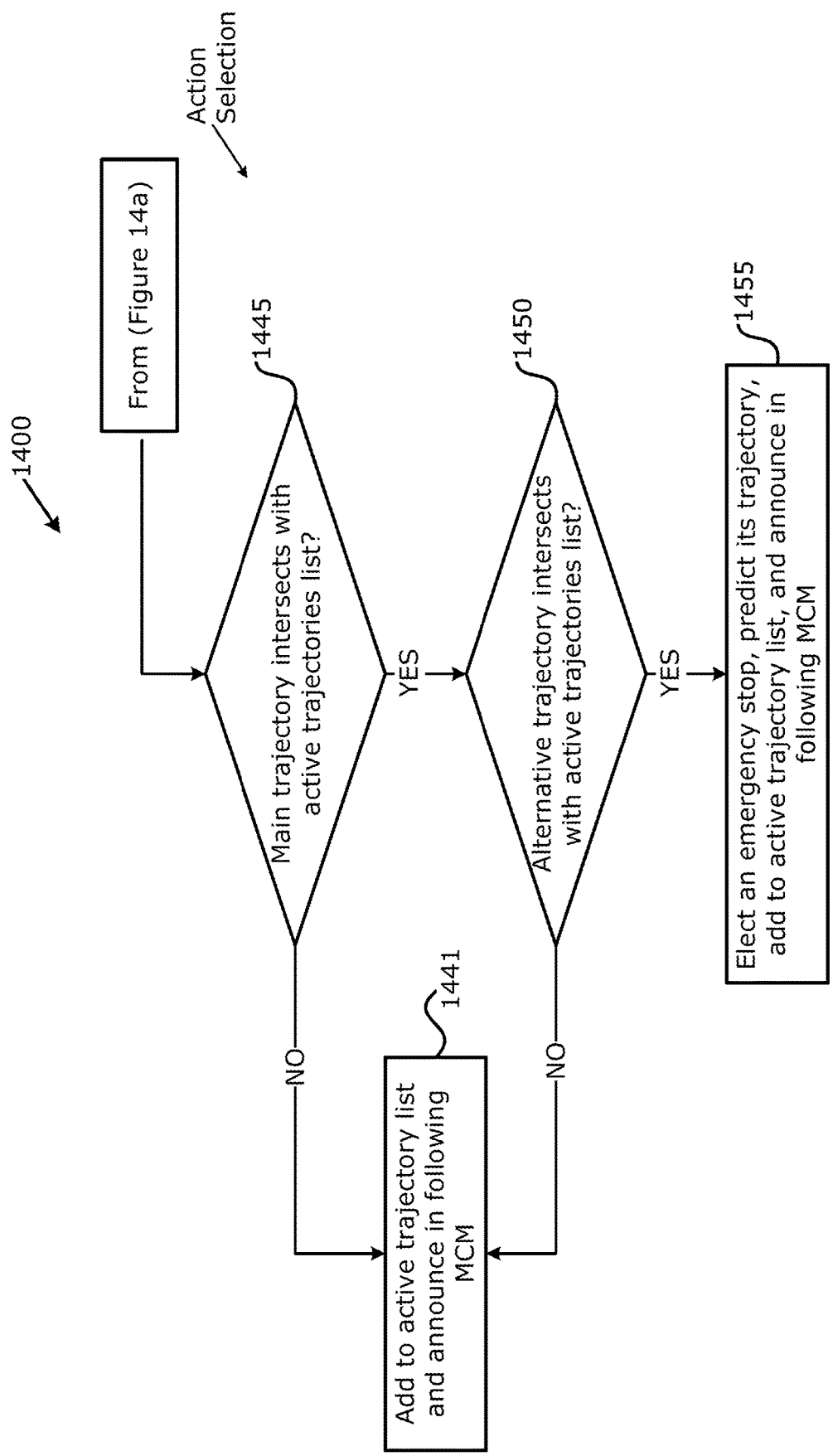

Once the ITS-S(s) receive the intended maneuver lists of their neighbors, any conflicting maneuvers and/or convergence on a given trajectory may be resolved. To achieve this and ensure safety, embodiments include a sequential cost-based technique for distributed collaborative trajectory resolution. FIGS. 14a and 14b show an example process 1400 for the trajectory planning and convergence mechanism according to various embodiments. In various embodiments, the sequential cost-based technique (e.g., process 1400) may include station ordering (see e.g., FIG. 14a), Neighboring/Proximate Station Action(s) Estimation (see e.g., FIG. 14a), and Action Selection (see e.g., FIG. 14b), each of which are described infra.

1.3.1.1. Station Ordering

Referring to FIG. 14a, the station ordering portion of process 1400 includes operations 1405, 1410, and 1415. At operation 1405, the ego ITS-S creates a priority list, table, or database object of all detected ITS-S(s) as well as the local/ego ITS-S (e.g., the ITS-S that is creating the priority list). Creating the priority list may include calculating a maneuver gain score (MGS) for the main maneuver shared by each station. The MGS may be a value or other like a representation of the gain that can be achieved by avoiding an accident with other stations, vehicles, or VRU ITS-S(s) 117, and/or the gain in speed with different scores. After calculating the MCS, the ego ITS-S sorts all stations with detected/shared trajectories in descending order according to each station's MGS.

In case of a prioritization, ranking, or classification tie between two or more stations, the ego ITS-S prioritizes (or ranks/classifies higher in the priority list) the stations based on their station types (e.g., VRU ITS-S 117, UAV, non-ITS vehicle/station, etc.), where each station types may have predefined or configured priorities, and a station in the tie with a higher prioritized station type is ranked or classified higher in the priority list than the other station subject to the tie; the ego ITS-S prioritizes (or ranks/classifies higher in the priority list) the station based on the source location with respect to the current station; and/or the ego ITS-S prioritizes (or ranks/classifies higher in the priority list) the station with the lowest ID.

At operation 1410, the ego ITS-S creates/builds an intended maneuver list, table, or database object of all the main and alternative trajectories that are either detected through on-board (or off-board) sensors and/or received in MCMs/CPMs. In various embodiments, the order of this list follows that of the priority list. At operation 1415, the ego ITS-S identifies/checks the local intended trajectory and define $t^{execution}$ which represents the time needed to execute the local intended trajectory plus a predefined or configured margin. Operation 1415 may also involve removing the stations whose trajectory falls outside $t^{execution}$ from the priority list and removing their corresponding trajectories from the maneuver list.

1.3.1.2. Neighboring/Proximate Station Action(s) Estimation

Still referring to FIG. 14a, after the station ordering portion of process 1400, the ego ITS-S proceeds to the neighboring/proximate station action(s) estimation portion of process 1400, which begins at operation 1420 where the ego ITS-S determines whether a priority is greater than a priority of the ego ITS-S (local node priority), and if not, the ego ITS-S proceeds to the active selection portion of process 1400. Otherwise, the ego ITS-S continues with the neighboring/proximate station action(s) estimation portion of process 1400.

The neighboring/proximate station action(s) estimation involves, for each ITS-S in the priority list until the ego ITS-S is reached: identify whether the main trajectory intersects with any of the trajectories in the active trajectories list, which may be initially empty (operation 1425). If no intersection is identified/detected, then the main trajectory is moved to the selected trajectories list (operation 1440). If an intersection is identified/detected, then the ego ITS-S checks whether any of the alternative trajectories intersect with any of the trajectories in the active trajectories list (operation 1430). If no intersection is identified/detected for the alternative trajectory, then the alternative trajectory is moved to the selected trajectories list (operation 1440). If all alternative trajectories intersect with ones in the selected trajectories list, then the ego ITS-S assumes that the ITS-S will select an emergency stop, predict the corresponding trajectory (operation 1435), and moves it to the selected trajectories list (operation 1440). The ego ITS-S stops once the ego ITS-S is reached in the priority list.

1.3.1.3. Action Selection

Referring to FIG. 14b, the action selection portion of process 1400 includes operations 1441-1455. From the neighboring/proximate station action(s) estimation portion of process 1400 (FIG. 14a), at operation 1445 the ego ITS-S determines if the main local trajectory intersects with any of the trajectories in the active trajectories list. If no intersection is identified/detected, then at operation 1441 the ego ITS-S moves the main trajectory to the selected trajectories list and announces the selected trajectory in the following MCM transmission.

If an intersection is identified/detected at operation 1445, then at operation 1450 the ego ITS-S checks whether the alternative trajectories intersect with any of the trajectories in the active trajectories list. If no intersection is identified/detected for the alternative trajectory, then at operation 1441 the ego ITS-S moves the alternative trajectory to the selected trajectories list and announces the selected trajectory in the following MCM transmission.

If all alternative trajectories intersect with ones in the selected trajectories list at operation 1450, then at operation 1455 the ego ITS-S elects an emergency stop, predicts the corresponding trajectory, moves it to the selected trajectories list, and announces the selected trajectory in the following MCM transmission.

1.4. MCM Dissemination Aspects

Embodiments include MCM generation and transmission techniques for exchanging MCMs among proximate vehicles/stations for maneuver coordination with lower communication overhead than existing/conventional approaches. In some embodiments, shorter message sizes and lower transmission frequencies are utilized to minimize channel utilization and thereby reduce communication/signaling overhead. Additionally or alternatively, in some embodiments, MCM broadcasting is avoided and/or unicast/groupcast MCM transmissions are used to reduce burdens associated with receiving MCMs (e.g., computing and networking/signaling resource consumption) on neighbor/proximate stations. These burden reductions may be significant for neighbor/proximate stations implementing half-duplex radios. Additionally, unicast/groupcast transmission of MCMs may allow neighbor/proximate stations to receive the MCMs and transmit data at the same time, which is beneficial for neighbor/proximate stations with half-duplex radios. These embodiments are similar to those discussed in [AC3302], and may be as follows:

1.4.1. MCM Generation and Transmission Embodiments

1.4.1.1. Periodic Broadcast of MCMS

A first embodiment includes the periodic broadcast of MCMs. In this embodiment, a periodic MCM is generated (or pushed for transmission to a suitable V2X RAT entity and/or communication circuitry) with a periodicity $T_{MCM}$, where $T_{MCM}$ is selected between a minimum periodicity parameter ($T_{MCM\_Min}$) and a maximum periodicity parameter ($T_{MCM\_Max}$) provided by the MCS entity (see e.g., FIG. 15). The minimum time elapsed between the start of consecutive MCM generation events could be equal to or larger than $T_{MCM}$. The periodicity $T_{MCM}$ may be limited to $T_{MCM\_Min} \leq T_{MCM} \leq T_{MCM\_Max}$, where $T_{MCM\_Min}=100$ ms and $T_{MCM\_Max}=1$ second or 1000 ms.

The periodicity $T_{MCM}$, and/or the periodicity parameters can be determined based on various factors/parameters such as network congestion levels (e.g., based on channel busy ratios, signal strength/quality measurements, interference measurements, etc.), quality (confidence) levels of the perceived object(s), safety relevance of perceived objects (e.g., detection of pedestrian, moving things/organism needs more frequent transmission), geolocation, node density (e.g., as indicated by the priority list, intended maneuver list, etc.), currently or predicted available communication resources, communication resource selection scheme(s), and/or other like factors, conditions, or parameters.

For example, if the network/channel(s) is/are highly congested, $T_{MCM}$ can be selected equal to or close to $T_{MCM\_Max}$. Network congestion and/or signal strength/quality can be measured according to the currently used V2X RAT, and the measurements/determinations may be provided to the MCS entity in the facilities layer to select $T_{MCM}$. The MCS entity may additionally or alternatively use historical data when estimating the network/channel congestion estimation. For example, the MCS entity may store historical network/channel congestion data based on measurements from lower layers and use that historical data when estimating current network congestion and/or channel quality. Additionally or alternatively, the MCS entity can also store a history of success rates in the network of a known periodic message (e.g., hello/CAM/BSM message) over a sliding window where the periodicity of such periodic messages may be derived from neighbor/proximate station transmissions. Reception success rates of such messages from neighbors can provide a level (confidence) of current network congestion. In another example, $T_{MCM}$ can be selected or determined based on a geographic area (e.g., a RAU, TAU, or the like) in which the vehicle/station is located, such as near a busy intersection or in a wild-animal prone area, where a shorter $T_{MCM}$ can be selected to detect any potential safety-critical situation faster. Any of the aforementioned examples may be combined and/or the $T_{MCM}$ can be selected based on more than one factor mentioned previously.

When the implemented V2X RAT is ITS-G5, the periodicity $T_{MCM}$ could be managed according to the channel usage requirements of DCC as specified in ETSI TS 102 724 V1.1.1 (2012 October). The parameter $T_{MCM}$ could be provided by the MCS entity in milliseconds. If the MCS entity provides this parameter with a value above $T_{MCM\_Max}$, $T_{MCM}$ could be set to $T_{MCM\_Max}$, and if the value is below $T_{MCM\_Min}$ or if this parameter is not provided, the $T_{MCM}$ could be set to $T_{MCM\_Min}$. The parameter $T_{MCM}$ represents the currently valid upper limit for the time elapsed between consecutive MCM generation events.

When the implemented V2X RAT is 3GPP C-V2X (e.g., over the PC5 interface), the periodicity $T_{MCM}$ could be managed in accordance with the congestion control mechanism defined by the access layer in ETSI TS 103 574 V1.1.1 (2018 November).

1.4.1.2. Periodic Broadcast of MCMs with Reduced Communication Overhead

In case of multiple stations transmit or broadcast MCMs, redundant and unnecessarily frequent updates about station maneuvers may be transmitted/broadcasted, which increases the network channel load with little benefit in terms of maneuver coordination. The high channel load may lead to frequent losses of MCMs, which may, in turn, degrade the performance of the MCS. To reduce communication overhead, periodic MCMs can be broadcasted at a lower frequency and/or periodic MCMs can be generated with a reduced message (payload) size. These reduced sized MCMs may be referred to as incremental or differential MCMs.

In one embodiment, periodic full-size MCMs can be broadcasted or transmitted at a first frequency, with the gaps between transmission/broadcast of the full-size MCMs being filled with incremental (differential) MCMs to maintain a reasonable or threshold level of maneuver coordination. In this embodiment, the incremental (differential) MCMs only include information/data that changed since a previous MCM transmission. In this way, the incremental (differential) MCMs may carry less information/data than the full-sized MCMs discussed previously.

In order to reduce the message size, the MCS may omit a subset of the above-described MCM containers that meet predefined redundancy mitigation rules. For example, incremental (differential) MCMs may include only changed/differential layered cost map, changes in maneuver intention or planned trajectory, and/or updates to a previously sent maneuver coordination request/response compared to those in previous a full-size MCM. In addition, vehicles/stations in proximity may have significant overlapped content in their MCMs (e.g., content in the Detected Driving Situations Container, Detected Neighbors' Maneuvers Container, and Layered Cost Map container) as these vehicles/stations are likely in the same geographic area, and thus, a procedure similar to the one discussed in [AC3302] can be implemented to reduce the potential overlap without affecting the system reliability, and ability to reach neighboring/proximate vehicles/stations.

In some embodiments, transmitting stations could enable redundancy mitigation techniques when observed network channel load (e.g., channel busy ratio, signal strength/quality measurements, etc.) is higher than a threshold L Redundancy. Otherwise, an MCM may include all the MCM containers that are selected by the MCS according to the MCM generation rules.

In one example, the redundancy mitigation techniques may include a frequency-based redundancy mitigation rule, wherein on each MCM generation event, the transmitting station analyzes a history of MCMs that it has received from remote stations during a recent time window of length W Redundancy. Additionally or alternatively, the transmitting station may analyze a history of MCMs that is transmitted to remote stations during the recent time window W Redundancy. The frequency-based redundancy mitigation rule causes the MCS to omit MCM containers from the new MCM to be generated if the number of historical MCMs that include information about the same maneuvers is more than a threshold N Redundancy. A historical MCM may be considered to include information about the same maneuvers only if the transmitting station can associate the MC data in the historical MCM with locally stored MC data with a confidence higher than a threshold C Redundancy.

In another example, the redundancy mitigation techniques may include a confidence-based redundancy mitigation rule, wherein on each MCM generation event, the transmitting station analyzes a history of MCMs that it has received from (and/or transmitted to) remote stations during the recent time window of length W Redundancy. The confidence-based redundancy mitigation rule causes the MCS to omit MCM containers from the new MCM to be generated if (i) any of the historical MCMs includes information about the same maneuvers and (ii) the maximum confidence (e.g., the MGS discussed previously) of the MC data in these historical MCMs is higher than the confidence (MGS) of the transmitting station's local MC data.

1.4.1.3. Event-Triggered MCM Broadcast (EV-MCM)

A third embodiment includes Event-Triggered MCM Broadcast (EV-MCM). In case of detection of a safety-critical driving situation/scenario, a station may need to modify and share its maneuver information immediately. It may need to initiate maneuver coordination/negotiation with neighboring/proximate vehicles immediately in a timely manner. In these embodiments, an EV-MCM is immediately generated and transmitted with at least safety-critical maneuver intention information and/or safety-critical trajectory information. This message can also be used to initiate maneuver coordination if needed through the Maneuver Coordination Container. In some embodiments, EV-MCMs may be transmitted in addition to periodic MCMs. For example, an EV-MCM may be transmitted during the periodicity $T_{MCM}$ (e.g., between periodic MCM transmissions) and/or directly before or after a periodic MCM transmission.

1.4.1.4. Unicast or Groupcast Transmission of MCM

A fourth embodiment includes Unicast or Groupcast Transmission of MCM A broadcast message (e.g., MCM transmission) may create burdens on stations receiving MCMs as discussed previously and because receiver stations may not be able to transmit MCMs at the same time as receiving the broadcast MCM. Therefore, in this embodiment, a station may elect or otherwise determine to transmit MCMs as unicast/groupcast transmissions whenever possible to reduce the communication burden on neighboring/proximate stations. In this embodiment, point-to-multipoint communication, specified in ETSI TS 102 636-3 V1.1.1 (2010 March) may be used for transmitting MCMs and/or CPMs.

1.5. MCM Generation Aspects

MCM generation is managed by the MCS as long as the MCS is active. MCS activation may vary for different station types. For vehicle stations, the MCS may be activated with station activation, and the MCS may be terminated when the station is deactivated.

An MCM generation event results in the generation of one MCM. The MCM generation process may involve one or more sub-processes, including subprocesses for populating respective MCM containers of an MCM and another subprocess for MCM segmentation once the size of the message exceeds a predefined threshold. The MCM generation process is executed no faster than every $T_{MCM}$ which may be adapted by the DCC algorithm to prevent channel overuse, as discussed previously. Additionally or alternatively, the MCM generation process is executed upon detection of a trigger event, as discussed previously. In some embodiments, the MCM may be segmented as a result of exceeding the allowed MCM size. The generated MCM may be segmented in the same or similar manner as discussed in section 4.35 and/or annex D of [TR103562]. Once the MCM (or MCM segments) are generated, it is returned to the main process to generate the MCM, which then updates a timestamp corresponding to this MCM generation event and passes the MCM(s) to lower layers for transmission.

1.6. Example MCM Contents

Contents of various container and field descriptions for MCMs are provided below, including the various containers and/or subcontainers, including DEs and/or DFs to enable MCM. Examples of the DEs and DFs according to various embodiments are shown by table 1.6-1, which shows an example ASN.1 representation of an MCM (ManeuverCoordinationMessage). The example MCM may follow the message formats in SAE International, "Dedicated Short-Range Communications (DSRC) Message Set Dictionary", J2735_201603 (2016 Mar. 30).

TABLE 1.6-1

ManeuverCoordinationMessage

```
-- The root data frame for Maneuver Coordination Message
MCM ::= SEQUENCE {
   header ItsPduHeader,
   mcm ManeuverCoordinationMessage
}
ManeuverCoordinationMessage ::= SEQUENCE {
   generationDeltaTime GenerationDeltaTime,
   mcmParameters McmParameters
}
McmParameters::= SEQUENCE {
/* MCMManagementContainer provides basic info about the message such as station type
generating message, type of message (e.g., MCM/CPM), a message ID, Periodic Full Size
MCM, Periodic Incremental MCM or Event-Triggered MCM, Segmentation Info, etc;
StationDataContainer provides Info about the originating vehicle. The station type
sending MCM will be vehicle most of the time. However, we expect that RSU and other
VRUs may be station type in future - sharing maneuver or helping in maneuver
```

TABLE 1.6-1-continued

ManeuverCoordinationMessage coordination (such as an RSU may help in emergency trajectory alignment at an
intersection by participating in maneuver coordination).
CPM (collective perception message) and MCM (Maneuver coordination message) can be
merged so that a common ManagementContainer and StationDataContainer can be used. A
flag or indicator can be added to the combined/merged CPM/MCM to indicate message
type (e.g., MCM only, CPM only, MCM-CPM combined) if their generation/transmission
frequency/periodicities are different.
ManeuverSharingContainer has two container types - one (Maneuver Intention
Containers) to carry one or more intentions of the Station (lane change, highway
merge, Highway exit, right/left turn, hard break, one or more of them together) and
other (Planned Trajectory Container) to carry planned/predicted trajectory.
detectedSituationsManeuversContainer contains specific driving/traffic situations
detected by the Station and the details of the situation. These situations can be
detected based on on-board sensors and collaborative messages from other Stations.
Example Situations can be (i) Individual Traffic Deadlock - a vehicle/Station may be
in deadlock if there are parallel slow vehicles in front of it in all lanes - lanes
are free ahead, (ii) Accidents, (iii) Roadwork, (iV) Safety Critical Emergency
Situation - an animal jumped into road, (v) detected congestion and reason (including
a congestion level, type of congestion, reason of congestion, area impacted, so on),
etc... In addition, it also contains one or more maneuvers of neighbors detected by the
Station (by onborad sensor or by receiving MCM messages of neighbors). We may include
only critical maneuvers of neighbors to reduce overhead.
ManeuverCoordinationContainer: In some cases, proximity Stations may need to
coordinate and agree upon each others maneuvers before taking actions on the
maneuvers. This container contains information about such coordination
initiation/request and responses. For example, Individual Traffic Deadlock Handling
Request/Response; Emergency Trajectory Coordination Request/Response for Safety
Critical Emergency Situation Handling, etc.
LayeredCostMapContainer includes Cost Map of area impacted by Station's own Maneuver,
neighbor's maneuvers and maneuvers coordination requested by neighbors. Cost map can
be cost perceived by the Station at current time or predicted at a specific future
time (e.g., at a future time when the Station intends to move to a new lane under
Lane-Change maneuver). If a Station misses some blind spot vehicles during lane
change, neighbors can help after looking at the Station's Cost Map.
*/
managementContainer                     McmManagementContainer,
stationDataContainer                    StationDataContainer OPTIONAL,
maneuverSharingContainer                ManeuverSharingContainer OPTIONAL,
detectedSituationsManeuversContainer        SEQUENCE (SIZE(1 . . NMax_Situations)) of
DetectedSituationsManeuvers OPTIONAL,
maneuverCoordinationContainer           ManeuverCoordination OPTIONAL,
layeredCostMapContainer                 LayeredCostMap OPTIONAL,
. . .
}
McmManagementContainer                  ::= SEQUENCE {
msgType                                 MsgType OPTIONAL, /* needed if we combine MCM and
CPM. added to indicate message type (CPM only, MCM only, MCM-CPM combined)message,
etc. */
stationType                             StationType, /* The station type sending MCM will be
vehicle most of the time. However, we expect that RSU and other VRUs may be station
type in future */
referencePosition                       ReferencePosition,
mcmTagID                                McmTagID OPTIONAL, /* A kind of message ID. It can
be used for MCM segmentation if MCM message need to be segmented say due to air-
interface requirement for max. packet size. This tag can also serve as reference
Full-Size MCM on top of which Incremental MCM has been generated*/
mcmSegmentInfo                          McmSegmentInfo OPTIONAL, /*describes the
segmentation information in case the data for MCM transmission needs to be split up
into multiple messages due to message size constraints. In this case a single MCM can
go in two or more MCM segments in parts. At least, it can be useful in case of
unicast/groupcast MCM sharing bigger message*/
periodicEventTriggered                  PeriodicEventTriggered, /* Indicates Periodic or
Event Triggered (one time) MCM generation*/
fullSizeIncremental                     FullSizeIncremental, /* Indicates Full Size or
Incremental/Differential Content in MCM*/
referenceFullSizeMCMforIncremental          ReferenceFullSizeMCMforIncremental /*McmTagID
of the Last Full Size MCM with respect to which this incremental MCM has been
generated.*/
}
McmSegmentInfo                          ::= SEQUENCE {
totalMsgSegments                        SegmentCount,
thisSegmentNum                          SegmentCount
}
Segmentcount ::= INTEGER(1..127)
StationDataContainer                    ::= CHOICE {
   originatingVehicleContainer OriginatingVehicleContainer,
   originatingRSUContainer OriginatingRSUContainer,
   ...

TABLE 1.6-1-continued

ManeuverCoordinationMessage

```
}
OriginatingVehicleContainer ::= SEQUENCE {
    heading Heading,
    speed Speed,
    vehicleOrientationAngle WGS84Angle OPTIONAL,
    driveDirection DriveDirection DEFAULT forward,
    longitudinalAcceleration LongitudinalAcceleration OPTIONAL,
    lateralAcceleration LateralAcceleration OPTIONAL,
    verticalAcceleration VerticalAcceleration OPTIONAL,
    yawRate YawRate OPTIONAL,
    pitchAngle CartesianAngle OPTIONAL,
    rollAngle CartesianAngle OPTIONAL,
    vehicleHeight VehicleHeight OPTIONAL,
    trailerData SEQUENCE SIZE(1..2) OF TrailerData OPTIONAL,
    vehicleLength                       VehicleLength OPTIONAL,
    vehicleWidth                        VehicleWidth OPTIONAL,
    lanePosition                        LanePosition OPTIONAL, /* Right, middle, left Lane, etc
info*/
    ...
}
ManeuverSharingContainer                ::= SEQUENCE {
maneuverIntentionContainer              SEQUENCE (SIZE(1 . . NMax_Intentions)) of
ManeuverIntention OPTIONAL,
plannedTrajectoryContainer              SEQUENCE (SIZE(1 . . NMax_Trajectories)) of
PlannedTrajectory OPTIONAL,
. . .
}
Maneuverintention ::= SEQUENCE {
intentionType                           IntentionType, /* Lane Changes (Lane Passes,
Overtakes, Cut-Ins, Drift into Ego Lane),   Highway Merge, Highway Exit, Hard
Break, Others*/
safetyCritical                          SafetyCritical OPTIONAL, /*indicates whether current
Maneuver is due to safety critical situation*/
timeofrequest                           Timeofrequest OPTIONAL,
currentLane                             CurrentLane OPTIONAL,
targetLane                              TargetLane OPTIONAL, /*for example during lane change*/
intendedTimeToEnterTargetLane IntendedTimeToEnterTargetLane OPTIONAL,
reasonForLaneChange                     ReasonForLaneChange OPTIONAL, /*To go to faster/left
lane; exit coming so need to move to Right Lane from middle or left lane, a stopped
vehicle with hazard light in front, work ahead, temporary lane closed, accident
ahead, etc*/
impactedVehiclesList                    SEQUENCE (SIZE(1 . . NMax_Neighbors)) VehicleID
OPTIONAL, /* perceived vehicles likely to be impacted immediately by the planned
Manauver Intention. It is helpful such as if a Station is not seeing some vehicles
(also planning to change lane to the same target lane) obstructed by say big truck,
neighbors can warn it */
impactedAreabyThisManeuver ImpactedAreabyThisManeuver OPTIONAL, /* Geo-Areas within
which vehicles are likely to be impacted by the planned Manauver. Can be specified as
area (rectangle, circle, polygon, etc and/or lanes and direction (if divisor, other
direction is not impacted))*/
currentPerceivedCostMap LayeredCostMap OPTIONAL, /*needed for example during lane
change, merge. It helps neighbors to know whether the Station missed to see some
vehicles/risks. For example, a vehicle may not see another car obstructed by a truck
which may be coming in the target lane as well*/
predictedCostMapAtTimeEnteringTargetLane LayeredCostMap OPTIONAL, /*needed for
example during lane change, merge. It helps neighbors to know whether the Station
missed to see some vehicles/risks. For example, a vehicle may not see another car
obstructed by a truck which may be coming in the target lane as well*/
}
PlannedTrajectory ::= SEQUENCE {
timeOfGeneration   TimeOfGeneration,
/* Other parameters for planned short term (say next 10s) driving path: we need to
define. Examples, (Geo-points, time-instants) for the path alongwith additional
details(acceleration/decceleration,time-instants) (speed,time-instants), speed
(average, min, max), (left/right turn start/End, time-instant), (Lane-Change, time-
instant), Number of direction changes of the trajectory, Amount of steering input
needed to follow the trajectory, Amount of acceleration needed to follow the
trajectory, etc. */
executionDuration ExecutionDuration Optional, /*Duration needed to execute the
intended trajectory, used to judge the relativity of the information*/
executionScore ExecutionScore Optional, /*Describes the gain that can be realize if
the planned trajectory is executed*/
associatedManeuverIntentionList SEQUENCE (SIZE(1 . . NMax_Intentions)) of
IntentionType OPTIONAL, /* includes list of Maneuver Intentions being considered in
planned trajectory. */
trajectoryDescriptionList (SIZE(1 . . NMax_Intentions)) of TrajectoryDescription
OPTIONAL,
/* includes list of planned trajectory. */
```

TABLE 1.6-1-continued

ManeuverCoordinationMessage

```
associatedManeuverCoordinationRequestList SEQUENCE (SIZE(1 . .
NMax_ActiveCoordinations)) of
maneuverCoordinationRequestId OPTIONAL, /* Planned Trajectory may have been generated
as a response of Maneuver Coordination Requests from one or more neighbors.*/
. . .
}
TrajectoryDescription::= SEQUENCE {
/* It contains description of planned trajectory. */
trajectoryRepresentationType TrajectoryRepresentationType /*Way points or Fernet
frames or actual geo points*/
averageAcceleration AverageAcceleration Optional,
averageSpeed AverageSpeed Optional,
fernetFrameContainer fernetFrameContainer Optional,
geoPointsContainer (SIZE(1 . . NMax_GeoPoints)) of PointsContainer Optional,
wayPointsContainer SEQUENCE (SIZE(1 . . NMax_WayPoints)) of PointsContainer Optional,
...
}
fernetFrameContainer::= SEQUENCE {
/* It contains description of planned trajectory. */
tangentDerivative TangentDerivative,
normalDerivative NormalDerivative,
binormalDerivative BinormalDerivative,
...
}
GeoPointsContainer ::= SEQUENCE {
/* It contains description of planned trajectory. */
xCoordinate XCoordinate,
yCoordinate YCoordinate,
zCoordinate ZCoordinate,
projectedTimeStamp ProjectedTimeStamp,
...
}
DetectedSituationManeuver ::= SEQUENCE {
/* It contains specific driving/traffic situations detected by the Station and the
details of the situation. These situations can be detected based on on-board sensors
and collaborative messages from other Stations. */
DetectedDrivingSituationList              SEQUENCE (SIZE(1 . . NMax_Situations)) of
DrivingSituation OPTIONAL, /* If there is no special situation detected, Station may
report 'Normal Driving Situation' */
DetectedManeuverList                      SEQUENCE (SIZE(1 . . NMax_Maneuvers)) of
DetectedNeighborsManeuvers OPTIONAL, /* If there is no detected maneuvers then the
station reports its intended maneuevers only in the maneuver sharing container*/
}
Drivingsituation ::= CHOICE {
/* Some part of this Information may already be covered in other message like DENM */
normalDrivingSituation                    NormalDrivingSituation,
individualTrafficDeadlock                 IndividualTrafficDeadlock, /*a vehicle/Station may
be in deadlock if there are parallel slow vehicles in front of it in all lanes -
lanes are free ahead*/
safetyCriticalEmergencySituation          SafetyCriticalEmergencySituation,
roadAccident                              RoadAccident,
roadwork                                  Roadwork,
detectedCongestion                        DetectedCongestion,
. . .
}
SafetyCriticalEmergencySituation ::= SEQUENCE {
reasonOfSituation                         ReasonOfSituation OPTIONAL, /* unknown, accident,
pedestrian/Kid/Pet suddenly fell in the lane, animal suddenly jumped into road,
Tree/Tree-branch/Gravel suddenly fell into Road, etc. can be more than one*/
areaImpacted                              AreaImpacted OPTIONAL,
lanesImpacted                             LanesImpacted OPTIONAL,
bothDirectionsImpacted                    BothDirectionsImpacted OPTIONAL,
impacts                                   Impacts OPTIONAL, /* Hard break needed, emergency
tracjectory change needed */
. . .
}
RoadAccident::= SEQUENCE {
areaImpacted                              AreaImpacted OPTIONAL,
lanesImpacted                             LanesImpacted OPTIONAL,
bothDirectionsImpacted                    BothDirectionsImpacted OPTIONAL,
impacts                                   Impacts OPTIONAL, /* Road blocked, delay*/
expectedTimeToLast                        ExpectedTimeToLast OPTIONAL,
. . .
}
Roadwork::= SEQUENCE {
areaImpacted                              AreaImpacted OPTIONAL,
lanesImpacted                             LanesImpacted OPTIONAL,
bothDirectionsImpacted                    BothDirectionsImpacted OPTIONAL,
```

TABLE 1.6-1-continued

ManeuverCoordinationMessage

```
impacts                          Impacts OPTIONAL, /* Road blocked, delay*/
expectedTimeToLast   ExpectedTimeToLast OPTIONAL,
...
}
DetectedCongestion ::= SEQUENCE {
typeofCongestion                 TypeofCongestion OPTIONAL,
congestionLevel                  CongestionLevel OPTIONAL,
reasonOfCongestion ReasonOfCongestion OPTIONAL, /* unknown, accident, merging
traffic, roadwork, peakhour, Lane merge, Lane closer, etc. can be more than one*/
areaImpacted                     AreaImpacted OPTIONAL,
expectedTimeToLast ExpectedTimeToLast OPTIONAL, /* can be Unknown, short, long, very
long, etc*/
...
}
DetectedNeighborsManeuvers ::= SEQUENCE {
detectedmaneuverContainer SEQUENCE (SIZE(1 . . NMax_Intentions)) of
ManeuverIntention OPTIONAL,
detectedTrajectoryContainer              SEQUENCE (SIZE(1 . . NMax_Trajectories)) of
PlannedTrajectory OPTIONAL,
}
ManeuverCoordination ::= SEQUENCE {
individualTrafficDeadlockHandling        IndividualTrafficDeadlockHandling OPTIONAL,
emergencyTrajectoryCoordination EmergencyTrajectoryCoordination OPTIONAL,
...
}
IndividualTrafficDeadlockHandling ::= CHOICE {
individualTrafficDeadlockHandlingRequest IndividualTrafficDeadlockHandlingRequest
OPTIONAL,
individualTrafficDeadlockHandlingResponse IndividualTrafficDeadlockHandlingResponse
OPTIONAL,
}
EmergencyTrajectoryCoordination ::= CHOICE {
emergencyTrajectoryCoordinationRequest EmergencyTrajectoryCoordinationRequest
OPTIONAL,
emergencyTrajectoryCoordinationResponse EmergencyTrajectoryCoordinationResponse
OPTIONAL,
}
IndividualTrafficDeadlockHandlingRequest ::= SEQUENCE {
requestValidityDuration RequestValidityDuration,
suggestedManeuverToExitDeadlock ManeuverIntention,
suggestedTrajectoryToExitDeadlock PlannedTrajectory,
}
IndividualTrafficDeadlockHandlingResponse ::= SEQUENCE {
executionIntendedStartTime ExecutionIntendedStartTime,
executionDuration ExecutionDuration,
actualIntendedManeuver ManeuverIntention,
actualIntendedTrajectory PlannedTrajectory,
}
EmergencyTrajectoryCoordinationRequest ::= SEQUENCE {
requestValidityDuration RequestValidityDuration,
suggestedEmergencyManeuver ManeuverIntention,
suggestedEmergencyTrajectory PlannedTrajectory,
}
EmergencyTrajectoryCoordinationResponse ::= SEQUENCE {
executionIntendedStartTime ExecutionIntendedStartTime,
executionDuration ExecutionDuration,
actualIntendedManeuver ManeuverIntention,
actualIntendedTrajectory PlannedTrajectory,
}
LayeredCostMapData ::= SEQUENCE {
/* costMapRecordId - An id or a sequence number (increasing interger number) can be
assigned after each update of Occupancy Grid. unsigned short 2 bytes allows a value
from 0 to 65,535. 0 means not assigned */
/* timeStampOccupancyGrid - Time when master cost map was last updated or a future
time for which cost map is predicted*/
/* numberOfSupportingLayers - set it as 0 if there is only Master Cost Map. In
addition to the Master Layer Cost Map (e.g., occupancy grid), additional cost maps
can be provided to assist in better path finding by vehicles. Supporting layers of
Cost Maps can be */
costMapRecordId                  costMapRecordId,
currentTimeCostMap               currentTimeCostMap, /* Indicates whether cost map is
for current or future time (e.g., when vehicle is expected to enter Target Lane
during Lane change)*/
timeStamp                        TimeStamp, /*Current or future time*/
numberOfSupportingLayers         numberOfSupportingLayers OPTIONAL,
occupancyGridMasterCostMap       OccupancyGridMasterCostMap,
supportingLayersCostMapsContainer        SEQUENCE (SIZE(1 . . N$_{Max\_CostMapLayers}$)) of
SupportingLayerCostMap OPTIONAL, /* need to add some supporting layers for MCM*/
```

TABLE 1.6-1-continued

ManeuverCoordinationMessage

```
. . .
}
OccupancyGridMasterCostMapContainer         ::= SEQUENCE {
/* layerID - Layer ID for Master Cost Map.It is optional as there may be no layer
concept implemented*/
/* OccupancyGridData - The map data, in row-major order, starting with (0,0).
Occupancy probabilities values (OccupancyProbabilityValue) are in the range [0,100].
Unknown is ~1.maximum number of cells NMax_Cells = (Width in cells * Height in Cells)
*/
/* The origin of the map [m, m, rad]. This is the real-world pose of the origin e.g.,
cell (0,0) in the map. A representation of pose in free space is composed of position
originGeometryPosePosition and orientation originGeometryPoseOrientation. */
/* originGeometryPoseOrientation represents an orientation in free space in
quaternion form. (x, y, z, w) */
layerID                              layerID OPTIONAL,
MapLoadTime                          MapLoadTime, -- The time at which the map was loaded
resolution                           Resolution, -- The map resolution [m/cell]
width                                Width, -- uint32; Map width [cells]
height                               Height -- uint32; Map Height [cells]
originGeometryPosePosition           OriginGeometryPosePosition, /*position (x, y, z)*/
originGeometryPoseOrientation           OriginGeometryPoseOrientation,
OccupancyGridData                    SEQUENCE (SIZE(1 .. $N_{Max\_Cells}$)) of
OccupancyProbabilityValue
}
SupportingLayerCostMap              ::= SEQUENCE {
/* timeStampLastUpdated - the time when this particular layer was updated. Note that
different layer cost map changes with different frequency. For example, static layer
may not need to update frequently*/
layerID                              layerID,
timeStampLastUpdated                    timeStampLastUpdated;
resolution                           Resolution, -- The map resolution [m/cell]
width                                Width, -- uint32; Map width [cells]
height                               Height -- uint32; Map Height [cells]
originGeometryPosePosition           originGeometryPosePosition, /*position (x, y, z)*/
originGeometryPoseOrientation           originGeometryPoseOrientation,
OccupancyGridDataSupportingLayer SEQUENCE (SIZE(1 .. $N_{Max\_Cells}$)) of
OccupancyProbabilityValue,
}
```

1.7. Example MCS Use Cases

1.7.1. Prediction Improvement

A precondition for planning safe maneuvers in road traffic is a precise and correct maneuver prediction of road users. These predictions are based on the observation of the road users. Unfortunately, the maneuvers of road users depend also on unobservable parameters, such as the selected route, physical capabilities or individual comfort parameters. Predictions are uncertain, since this information are missing. To address this uncertainty, road users act more cautious to increase safety. That also means, that they drive slower, wait long until they found larger gaps to merge in and so on. Thereby they reduce the overall road traffic efficiency.

The MCS allows ITS-Ss to share currently planned maneuvers to reduce the aforementioned prediction uncertainties because the unknown parameters are considered during the maneuver planning. This enables the receiving road users to act less defensively and thereby increase the overall road traffic while not sacrificing their safety. Furthermore, if the planned maneuver of a vehicle suddenly changes, the MCS informs all surrounding road users even before a physical reaction can be observed. This allows an earlier and more comfortable reaction to this maneuver change For this use case, information about planned maneuvers, ITS-S state information (e.g., including position), and/or map information is sent (e.g., via information broadcast) from one or more MCM senders to one or more MCM receivers. An MCM sender includes ITS-Ss that are able to plan their maneuvers ahead, and MCM receivers are ITS-Ss that need to predict the maneuvers of other road users for their functionality. R-ITS-Ss 130 may receive and aggregate MCMs for their functionality. V-ITS-Ss 110 that can plan their future maneuver can transmit their plans. V-ITS-Ss 110 that need a prediction of all surrounding V-ITS-Ss 110 compute these messages. In these ways, ITS-Ss improve their prediction about other road users

1.7.2. Maneuver Adjustment

The right-of-way rules define a hierarchy between each pair of road users and thereby define which road user has the right of way and which road user has to give way. Thereby the road user that has to give way is responsible for acting in such a way that the road user how has the right of way can realize its plan in a safe manner. The right of way rules is designed to emphasize safety over fairness. This can lead to situations in which a vehicle is stuck due to right-of-way rules (e.g., a vehicle coming from a side road is not able to enter the main road due to dense traffic on the main road). Furthermore, for vehicles that have the right of way, it is hard to predict the original intention of vehicles that have to give way even if these vehicles share information about their planned maneuvers.

The MCS enables vehicles (V-ITS-Ss 110) that have to give way to express their intended maneuver, which is currently not executable due to the right of way rules. Receiving vehicles, which have the right of way, have to decide whether they want to relinquish their right of way or not. If they relinquish, they adapt their own maneuver to enable the intended maneuver of the other vehicle.

This use case involves ITS-Ss that can plan their future maneuver and transmit their plans. ITS-Ss that need a prediction all surrounding ITS-Ss compute these messages. These ITS-Ss include MCM senders, which are ITS-Ss capable of planning their maneuvers ahead, has no right of way and requires cooperation to execute its intended maneuver; and MCM receivers, which are ITS-Ss capable of predicting the maneuvers of other road users for their functionality, have the right of way and are willing to cooperate with other vehicles.

This use case may operate as follows: (1) Both ITS-Ss constantly, periodically, and/or in response to an event or trigger, broadcast their planned maneuver(s) (e.g., Information about planned and/or requested maneuvers; Vehicles state information (including position); and/or Map information). Alternatively, if the V-ITS-S 110 with the right of way does not want to enable any requested maneuver, it ignores or rejects the requested maneuver(s). (2) The vehicle that has to give way sends out one or several requested maneuvers, which are more advantageous than the currently planned maneuver, but it is blocked by a vehicle with the right of way. Alternatively, the vehicle without the right of way cannot execute any of its requested maneuvers, so it stays with its planned maneuver. (3) A vehicle with the right of way has to decide whether it will enable a requested maneuver. (4) If it enables a requested maneuver, it will adapt its planned maneuver so that it will not block the requested maneuver of the other vehicle. In these ways, the vehicle that initially did not have the right of way now has the right of way, if the vehicle that had the right of way initially accepted a requested maneuver.

1.7.3. Cooperation Offer

As described in the use case "Maneuver adjustment", in a traffic situation with more than one vehicle, the traffic rules provide a framework in which to define the vehicle maneuvers by establishing a right-of-way among the involved vehicles. In case that these rules do not provide an optimal solution in a specific traffic situation, a vehicle may decide to give up its right-of-way in order to allow another vehicle without right-of-way to improve its driving situation (e.g. a vehicle stuck in a traffic jam opens a gap to allow another vehicle to merge in). This cooperative maneuver allows improving the fairness and/or traffic efficiency.

In this case, the vehicle with right-of-way sends via the MCS a cooperation offer, consisting of one or several alternative maneuvers that it would be ready to drive in order to improve another vehicle's situation. The vehicle without right-of-way considers this information when planning its own requested maneuver(s) as described in the "Maneuver adjustment" use case.

This use case involves vehicles (e.g., V-ITS-Ss 110) that can plan their future maneuver and transmit their plans and require/desire cooperation with surrounding vehicles (e.g., V-ITS-Ss 110) in order to improve their driving situation. This use case also involves vehicles (e.g., V-ITS-Ss 110) that are willing to cooperate with surrounding vehicles. These ITS-Ss include MCM senders, which are V-ITS-Ss 110 that have the right-of-way, detect a need for cooperation, and send a cooperation offer to one or more other V-ITS-Ss 110. These ITS-Ss also include MCM receivers, which are V-ITS-Ss 110 that have no right-of-way and has a need for cooperation in order to improve its driving situation.

In this use case, when two or more ITS-Ss are nearby (e.g., within a predetermined distance from one another) and one of them has to give way to the other, then: (1) Both V-ITS-Ss 110 (or at least two when more than two V-ITS-Ss 110 are involved) constantly, periodically, and/or in response to an event or trigger, broadcast their planned maneuver(s) (e.g., including information about planned, requested, and/or alternative maneuvers; vehicles' state information (e.g., including position, etc.); and/or map information). (2) The V-ITS-S 110 with right-of-way detects a situation where another vehicle without right-of-way has a need for cooperation, plans one or several alternative maneuvers and transmits them to the vehicle without right-of-way as cooperation offers. (3) The V-ITS-S 110 without right-of-way receives the alternative maneuver(s) and plans potentially requested maneuvers that are compatible with an alternative maneuver. Then, it selects and broadcasts the requested maneuver(s) that improves the overall driving situation the most. (4) The V-ITS-S 110 with right-of-way receives the requested maneuver(s), it adapts its planned maneuver and notifies the other vehicle of the accepted requested maneuver. Alternatively, if the vehicle with right-of-way does not want to enable any requested maneuver, it ignores or rejects the requested maneuver(s). (5) The V-ITS-S 110 without right-of-way selects its accepted requested maneuver as its new planned maneuver. Alternatively, the V-ITS-S 110 without right-of-way cannot execute any of its requested maneuvers, so it stays with its planned maneuver.

The V-ITS-S 110 that initially did not have the right-of-way now would have the right-of-way if the V-ITS-S 110 that had the right of way initially accepted a requested maneuver. As a result, the new traffic situation has improved fairness and/or traffic efficiency.

1.7.4. Lane Merging Assist

The purpose of the use case is to assist the cooperative vehicle insertion in a lane which is resulting from the merging of two adjacent lanes. Several situations can be considered: Access to a motorway leading to the merging of the access lane with the nearest motorway adjacent lane; Roadwork closed lane leading to the merging of the closed lane with the nearest open adjacent lane; Reduction of the road number of lanes leading to the merging of two adjacent lanes; Access to a roundabout (merging of the traffic from lanes accessing the roundabout with the traffic on the roundabout); etc.

The safe insertion of a subject cooperative vehicle requires the creation and maintenance of an insertion gap respecting the local traffic regulation (e.g., 2 seconds between two vehicles in France). Such gap creation and maintenance need the contribution of other cooperative vehicles moving in the considered insertion area (called target vehicles)

The ITS-Ss involved in this use case include MCM senders, which are R-ITS-S(s) 130 that coordinate the maneuver of subject and target cooperative vehicles 110 to fulfill a selected subject vehicle insertion strategy considering both the road safety and local traffic management efficiency. The target behind vehicle 110 is decelerated for the subject vehicle insertion gap creation. The target parallel vehicle 110 does not attempt to change of lane during the subject vehicle 110 insertion. Vehicle 110 broadcasting standard messages such as CAMs, CPMs, and/or other like messages such as those discussed herein. The ITS-Ss involved in this use case also includes MCM receivers, which are V-ITS-Ss 110, that will act according to the received information.

The various ITS-S 110, 130, and/or 160 are constantly, periodically, and/or in response to an event or trigger broadcasting information related to their motion dynamic (e.g., DENMs, CAMs, CPMs, MCMs, etc.). The R-ITS-S(s) 130 dispatches information resulting from its local augmented perception (fusion of its own sensors data and collected perception from other cooperative vehicles) and traffic management instructions received from Central ITS-S (C-ITS-S) 160 to V-ITS-S 110. In this use case, the R-ITS-S 130 obtains an overall perception of the traffic situation in the covered area. The R-ITS-S 130 can achieve an efficient risk analysis of the local situation based on its augmented perception. The R-ITS-S 130 may have received complimentary information from the C-ITS-S 160 for regulating the local traffic.

After a risk analysis of the local situation, the R-ITS-S 130 selects a maneuver coordination strategy among the following ones: Slow a target cooperative vehicle moving on the priority lane which is merging with another to create a legal insertion gap; ask a target cooperative vehicle moving on the priority lane which is merging with another to change of lane to create a legal insertion gap; in case of vehicles moving in an automated mode, request them to transit to human-driven mode to ease the insertion. The maneuver coordination strategy is built according to the traffic situation. If the traffic is fluid and exhibiting a low density, the R-ITS-S 130 may abstain from coordinating cooperative vehicles since natural insertion gaps may be existing. One or more V-ITS-Ss 110 provide information and receive maneuver coordination data elements to adjust their motion dynamic (e.g., trajectory and velocity) accordingly. Additionally, a C-ITS-S 160 provides traffic management instructions for local optimization of the traffic flows associated to lanes constituting the road. In some cases, the R-ITS-S 130 and cooperative V-ITS-Ss 110 are compliant to ETSI release 2 standard set, including the MCS. The R-ITS-S 130 constantly, periodically, and/or in response to an event or trigger, broadcasts MCMs to relevant cooperative vehicles (e.g., subject vehicles 110, target vehicles 110). The relevant vehicles 110 operate according to received coordinated maneuvers.

1.7.5. Overtaking Stationary Vehicles

The purpose of the use case is to assist the cooperative vehicles lane changes at the level of a tolling barrier to safely access the best relevant tolling lane, which is indicated by the local tolling management system. The best tolling management lane is selected by the tolling management system based on received CAMs of cooperative vehicles. It is expected in the future that the CAMs can be enhanced with the toll payment means data elements being available at the vehicle level. In such case, the tolling management system may indicate to the cooperative vehicles which relevant tolling lane to target, considering all the waiting times associated to available relevant tolling lanes. Payment means also include the use of the ITS G5 protocol (see e.g., ETSI TR 103 579 v1.1.1 (2020 September))

This use case involves MCM senders, including R-ITS-Ss 130, that coordinate the maneuver of the subject and target cooperative vehicles to safely guide the subject vehicle toward the selected tolling gate. The subject vehicle is guided to the selected gate. Target vehicles are slowing down if approaching too quickly to the subject vehicle. V-ITS-Ss 110 broadcasting standard messages such as CAMs and CPMs. This use case also involves MCM receivers, including V-ITS-Ss 110, which will act according to the received maneuver advice.

V-ITS-Ss 110 (e.g., subject and target vehicles 110) provide information (e.g., Global perception of the local traffic situation in the controlled relevant area; identification of release 2 (conforming to MCS) cooperative vehicles which may contribute to the safe traffic management strategy, etc.) and receive maneuver coordination data elements to adjust their motion dynamic accordingly (e.g., trajectory and velocity). The V-ITS-Ss 110 are constantly, periodically, and/or in response to an event or trigger, broadcasting information related to their motion dynamic (CAMs, CPMs, etc.).

The R-ITS-S 130 obtains an overall perception of the traffic situation in the covered area via its own sensors and received standard messages from cooperative vehicles. The R-ITS-S 130 can achieve an efficient risk analysis via its own perception, augmented through V2X cooperation. The R-ITS-S 130 proposes to the cooperative subject vehicle 110 a target tolling gate respecting its payment means and optimizing its waiting time (e.g., using a Tolling Assistance Message (TAM), which is out of the scope of this disclosure).

The C-ITS-S 160 receives information about the local traffic situation from the R-ITS-S 130 and provides instruction to improve this local traffic situation. The C-ITS-S 160 selects the more appropriate tolling gate to use according to payment means being available at the subject vehicle 110 level and respective waiting times at the level of relevant tolling gates. Traffic management instructions were received from a traffic management center (e.g., C-ITS-S 160).

Then, the R-ITS-S 130 guides the cooperative subject vehicle 110 to the targeted tolling gate. The R-ITS-S 130 may also request other cooperative vehicles (target vehicles 110) to adjust their motion dynamic to avoid collision with the guided subject vehicle 110. The R-ITS-S 130 and cooperative V-ITS-Ss' 110 are compliant to ETSI release 2 standard set, including the MCS. The R-ITS-S 130 constantly, periodically, and/or in response to an event or trigger, broadcasts MCMs to relevant cooperative vehicles 110 (e.g., subject vehicles 110, target vehicles 110). The relevant vehicles (subject and target) operate according to received MCMs.

1.7.6. Regulate Vehicle Automation Level

The purpose of the use case is to regulate (allow or prohibit) the SAE automation level within a specific road segment or lane segment (lane clearance), resulting in an increase/decrease of requirements on the automated vehicle and its driver, based on traffic situation. Infrastructure based SAE automation level information provides improvements to the efficiency of the traffic flow as well as the road safety by regulating the allowed SAE automation level. This will be especially useful/necessary in the transitional phase towards automated driving, which will include conventional vehicles, connected vehicles as well as autonomous vehicles, in order to enhance road safety as well as traffic flow efficiency. The information is sent from the infrastructure to the vehicles (I2V).

This use case involves MCM senders such as R-ITS-Ss 130 that regulate the SAE automation Level on a certain road and/or in a certain area; and MCM receivers, including V-ITS-Ss 110 that will act according to the received information.

The C-ITS-S 160 originates the information on allowed/prohibited SAE levels. The R-ITS-Ss 130 dispatch information received from the C-ITS-S 160 to one or more V-ITS-Ss 110. Information about allowed/prohibited SAE levels is sent to V-ITS-Ss 110. Individual V-ITS-Ss 110 receives and applies the information on allowed/prohibited SAE levels. The receiving V-ITS-Ss 110 are built to operate in one or more SAE automation levels. The country has a regulation on vehicle automation in place that either generally allows vehicle automation or does not explicitly allow vehicle automation. The information on allowed/prohibited SAE levels may include, for example, Information about allowed/prohibited SAE automation levels; Associated vehicle classes & categories ("which vehicle?"); Associated Geographic information ("where"?).

1.7.7. Vehicles from Opposite Direction in Narrow Road

The purpose is to negotiate between 2 automated vehicles approaching each other on a road that is too narrow for two vehicles to pass each other. Other potential situations is a ghost driver on a motorway. The situation can be solved either by negotiation between the two automated vehicles (V2V) or by an RSU (I2V) advising the vehicles.

The R-ITS-S 130 and cooperative V-ITS-Ss' 110 are compliant to ETSI release 2 standard set, including MCS. The V-ITS-Ss' 110 and the R-ITS-S 130 have a view of the possibility to drive or park at the side of the road, through digital information on driving possibility and from sensing parked cars and/or cyclists presence.

For V2V scenarios, both V-ITS-Ss 110 periodically (or in response to a trigger/event) transmit and receive MCMs. For I2V scenarios, both V-ITS-S 110 transmit MCMs, containing trajectories. R-ITS-S 130 receives MCMs transmitted by V-ITS-S 110 and transmits MCM, including advice to V-ITS-S 110.

In the I2V case, the R-ITS-S 130 gives advice (e.g., digital information/instructions on possible places where vehicles can yield or drive at the emergency/cycling lane) to a V-ITS-S 110 in order to ensure safe passing of the vehicles. For I2V, both vehicles 110 broadcast trajectory in MCM. The R-ITS-S 130 detects a potential collision and calculates the free passing path, which is transmitted as MCM to the vehicles 110. After a risk analysis of the local situation, the R-ITS-S 130 selects a maneuver coordination strategy among the following ones: In case there is a free emergency lane (or freecycling lane) at the side of the road, one of the vehicle moves to the free lane. One of the vehicles stops at a safe spot at the side of the road—(Return of control to the driver).

In the V2V case, the vehicles make their assessment of a safe passing path and share this information through the MCS service. Vehicles 110 assess whether they can fulfill the demands of the other vehicles. In the I2V case, the vehicles assess the advice provided by the R-ITS-S 130, and fulfill these advices when suitable. For V2V, one of the vehicles 110 detects potential collision, calculates safe path including, for example, stopping at the side of the road (planned trajectory), and builds MCM including safe path and original trajectory (desired trajectory); the other vehicle 110 assesses if the desired trajectory can be achieved, and informs the decision to first vehicle 110, and the first vehicle 110 selects the safe path or the original trajectory based on the decision of the other vehicle 110.

2. ITS-Station Configurations and Arrangements

FIG. 15 shows an example station reference architecture 1500 for MCM-based maneuver coordination, according to various embodiments. In ITS-based implementations, some or all of the components depicted by FIG. 15 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4 (not shown), the facilities layer which corresponds with OSI layers 5, 6, and at least some functionality of OSI layer 7, and an applications layer which corresponds with some or all of OSI layer 7. Each of these layers is interconnected via respective interfaces, SAPs, APIs, and/or other like connectors or interfaces.

The applications layer provides ITS services, and ITS applications are defined within the application layer. An ITS application is an application layer entity that implements the logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009 June) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location-based services, and applications providing networking services (e.g., global Internet services and ITS-S lifecycle management services). A V-ITS-S 110 provides ITS applications to vehicle drivers and/or passengers and may require an interface for accessing in-vehicle data from the in-vehicle network or in-vehicle system. For deployment and performance needs, specific instances of a V-ITS-S 110 may contain groupings of Applications and/or Facilities.

The facilities layer comprises middleware, software connectors, software glue, or the like, comprising multiple facilities. In particular, the facilities layer contains functionality from the OSI application layer, the OSI presentation layer (e.g., ASN.1 encoding and decoding, and encryption), and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VRUBS), Decentralized Environmental Notification (DEN) basic service, maneuver coordination services (MCS), and/or the like. For a V-ITS-S 130, the DDP is connected with the in-vehicle network and provides the vehicle state information. The POTI entity provides the position of the ITS-S and time information. A list of the common facilities is given by ETSI TS 102 894-1 V1.1.1 (2013 August) (hereinafter "[TS102894-1]").

In various embodiments, the MCS is a facility layer function (or simply a "facility") that provides MCS and/or maneuver coordination (MC) data to other layers. In particular, the MCS entity resides in the facilities layer and generates MCMs, which are then passed to the N&T and access layers for transmission to other proximate ITS-Ss. In embodiments, the MCMs are facilities layer PDUs that may be passed to the access layer via the N&T layer or passed to the application layer for consumption by one or more ITS applications. In other words, the MCM format is agnostic to the underlying access layer and is designed to allow for intended maneuver decisions/sharing with neighboring stations to avoid potential collisions and improve the roadway/traffic efficiency.

For a V-ITS-S 130, the facilities layer is connected to an in-vehicle network via an in-vehicle data gateway, as shown and described in [TS102894-1]. The facilities and applications of a vehicle ITS-S receive required in-vehicle data from the data gateway in order to construct messages (e.g. CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S, including activation and termination of CAM/DENM transmission operation, determining CAM/DENM generation frequency, and triggering the generation of CAMs/DENMs. The CAM/DENM reception management entity implements the protocol operation of the receiving ITS-S, including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or DFs included in the ITS data dictionary as defined by ETSI TS 102 894-2 V1.3.1 (2018 August) ("[TS102894-2]").

The ITS station type/capabilities facility provides information to describe a profile of an ITS-S to be used in the applications and facilities layers. This profile indicates the ITS-S type (e.g., vehicle ITS-S, roadside ITS-S, personal ITS-S, or C-ITS-S 160), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The N&T layer provides the functionality of the OSI network layer and the OSI transport layer and includes one or more networking protocols, one or more transport protocols, and network and transport layer management. Additionally, aspects of sensor interfaces and communication interfaces may be part of the N&T and access layers. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol. The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or (RAT) and protocol such as 3GPP LTE, 3GPP 5G/NR, C-V2X (e.g., based on 3GPP LTE and/or 5G/NR), WiFi, W-V2X (e.g., including ITS-G5 and/or DSRC), Ethernet, Bluetooth, and/or any other RAT and/or communication protocol discussed herein. The CIs provide the functionality of one or more logical channels (LCHs), where the mapping of LCHs on to physical channels is specified by the standard of the particular access technology involved.

In various embodiments, once a trigger for maneuver sharing is initiated by the application layer, an MCM is created by the MCS entity in the facilities layer to convey the maneuver intention to neighboring stations. The trigger to create the MCM may be a periodic trigger or an event-based triggered. In the MCM, the station can share its intended maneuver, a (planned) trajectory, and/or coordinate or consent to neighboring stations' intended actions. In these ways, the MCM may allow stations to reach the highest possible gain. The details of this message format and embodiments for distributed maneuver coordination are discussed herein.

The ITS station type/capabilities facility provides information to describe a profile of an ITS-S to be used in the applications and facilities layers. This profile indicates the ITS-S type (e.g., vehicle ITS-S, roadside ITS-S, personal ITS-S, or C-ITS-S 160), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The Position and Time management entity (PoTi) manages the position and time information for ITS applications, facility, network, management, and security layers. For this purpose, the PoTi gets information from sub-system entities such as GNSS, sensors, and other subsystems of the ITS-S. The PoTi ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi may use augmentation services to improve the position and time accuracy. Various augmentation methods may be applied. PoTi may support these augmentation services by providing messages services broadcasting augmentation data. For instance, an R-ITS-S 130 may broadcast correction information for GNSS to oncoming V-ITS-S 110; ITS-Ss may exchange raw GPS data or may exchange terrestrial radio position and time relevant information. PoTi maintains and provides the position and time reference information according to the application and facility and other layer service requirements in the ITS-S. In the context of ITS, the "position" includes attitude and movement parameters, including velocity, heading, horizontal speed and optionally others. The kinematic and attitude state of a rigid body contained in the ITS-S included position, velocity, acceleration, orientation, angular velocity, and possible other motion-related information. The position information at a specific moment in time is referred to as the kinematic and attitude state, including time, of the rigid body. In addition to the kinematic and attitude state, PoTi should also maintain information on the confidence of the kinematic and attitude state variables.

The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other embodiments.

Figure 18:
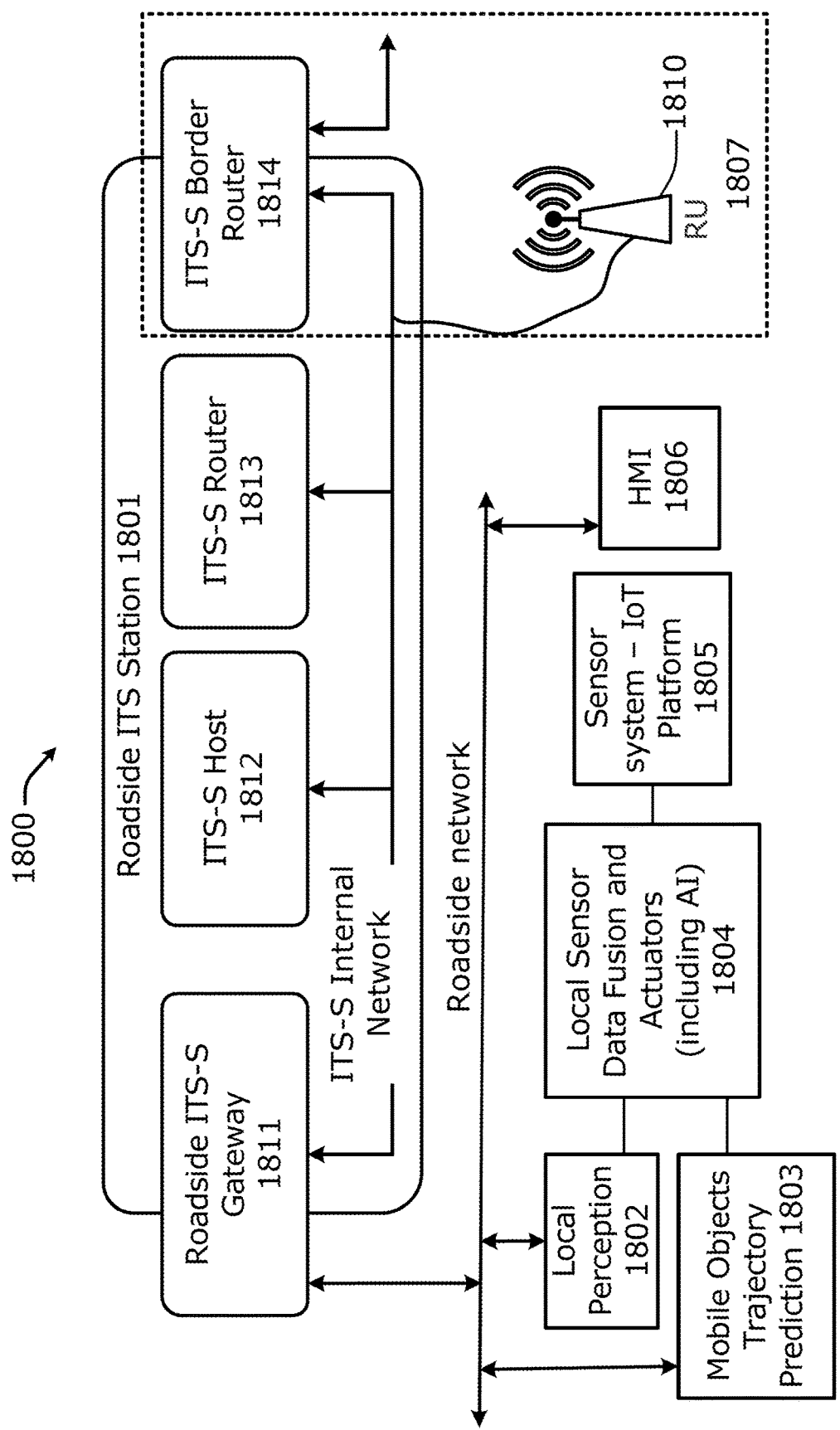
FIG. 18 depicts an example roadside ITS-S in a roadside infrastructure node according to various embodiments.

The ITS-S reference architecture 1500 may be applicable to the elements of FIGS. 16 and 18. The ITS-S gateway 1611, 1811 (see e.g., FIGS. 16 and 18) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1611, 1811 (see e.g., FIGS. 16 and 18) is capable of converting protocols. This allows an ITS-S to communicate with external elements of the system in which it is implemented. The ITS-S router 1611, 1811 provides the functionality the ITS-S reference architecture 1500 excluding the Applications and Facilities layers. The ITS-S router 1611, 1811 interconnects two different ITS protocol stacks at layer 3. The ITS-S router 1611, 1811 may be capable of converting protocols. One of these protocol stacks typically is connected to the ITS station-internal network. The ITS-S border router 1814 (see e.g., FIG. 18) provides the same functionality as the ITS-S router 1611, 1811, but includes a protocol stack related to an external network that may not follow the management and security principles of ITS.

Additionally, other entities that operate at the same level but are not included in the ITS-S include the relevant users at that level, the relevant HMI 1606, 1706, 1806 (e.g., audio devices, display/touchscreen devices, etc.); when the ITS-S is a vehicle, vehicle motion control 1608 for computer-assisted and/or automated vehicles (both HMI 1606, 1706, 1806 and vehicle motion control 1608 entities may be triggered by the ITS-S applications); a local device sensor system and IoT Platform 1605, 1705, 1805 that collects and shares IoT data; local device sensor fusion and actuator application(s) 1604, 1704, 1804, which may contain ML/AI and aggregates the data flow issued by the sensor system; local perception applications 1602, 1702, 1802 and trajectory/motion prediction applications 1603, 1703, 1803 that consume the output of the fusion application and feed the ITS-S applications; and the relevant ITS-S 1601, 1701, 1801. The sensor system can include one or more cameras, radars, LIDARs, etc., in a V-ITS-S 110 or R-ITS-S 130. In the central station, the sensor system includes sensors that may be located on the side of the road but directly report their data to the central station, without the involvement of a V-ITS-S 110 or an R-ITS-S 130. In some cases, the sensor system may additionally include gyroscope(s), accelerometer(s), and the like (see e.g., sensor circuitry 2172 of FIG. 21). Aspects of these elements are discussed infra with respect to FIGS. 16, 17, and 18

FIG. 16 depicts an example vehicle computing system 1600 according to various embodiments. In this example, the vehicle computing system 1600 includes a V-ITS-S 1601 and Electronic Control Units (ECUs) 1615. The V-ITS-S 1601 includes a V-ITS-S gateway 1611, an ITS-S host 1612, and an ITS-S router 1613. The vehicle ITS-S gateway 1611 provides functionality to connect the components at the in-vehicle network (e.g., ECUs 1615, etc.) to the ITS station-internal network. The interface to the in-vehicle components (e.g., ECUs 1615) may be the same or similar as those discussed herein (see e.g., IX 2156 of FIG. 21) and/or may be a proprietary interface/interconnect. Access to components (e.g., ECUs 1615) may be implementation-specific. The ECUs 1615 are embedded computer system including at least one processor (CPU) and corresponding peripherals which are placed in one housing. An ECU 1615 is typified by a connection to one or more in-vehicle networks, sensors e.g., sensors 2172 of FIG. 21), and actuators (e.g., actuators 2174 of FIG. 21). The ECUs 1615 may be the same or similar to the driving control units (DCUs) 174 discussed infra with respect to FIG. 1 and/or the actuators 2174 discussed infra with respect to FIG. 21. The ITS station connects to ITS ad hoc networks via the ITS-S router 1613.

Figure 17:
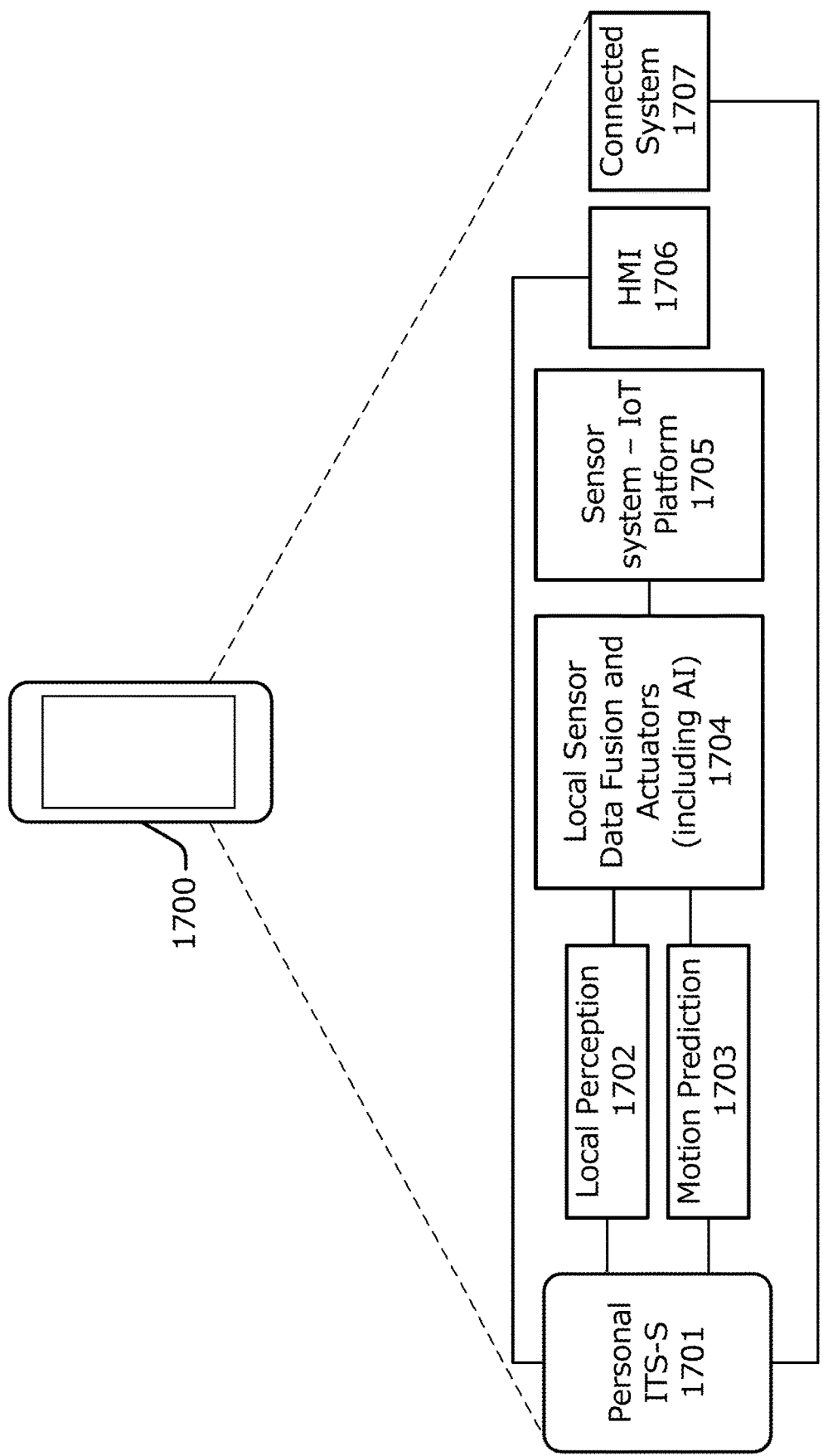
FIG. 17 depicts an example personal ITS station (P-ITS-S), which may be used as a VRU ITS-S according to various embodiments.

FIG. 17 depicts an example of personal computing system 1700 according to various embodiments. The personal ITS sub-system 1700 provides the application and communication functionality of ITSC in mobile devices, such as smartphones, tablet computers, wearable devices, PDAs, portable media players, laptops, and/or other mobile devices. The personal ITS sub-system 1700 contains a personal ITS station (P-ITS-S) 1701 and various other entities not included in the P-ITS-S 1701, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 1700 may be used as a VRU ITS-S 117.

FIG. 18 depicts an example roadside infrastructure system 1800 according to various embodiments. In this example, the roadside infrastructure system 1800 includes an R-ITS-S 1801, output device(s) 1805, sensor(s) 1808, and one or more radio units (RUs) 1810. The R-ITS-S 1801 includes an R-ITS-S gateway 1811, an ITS-S host 1812, an ITS-S router 1813, and an ITS-S border router 1814. The ITS station connects to ITS ad hoc networks and/or ITS access networks via the ITS-S router 1813. The R-ITS-S gateway 1611 provides functionality to connect the components of the roadside system (e.g., output devices 1805 and sensors 1808) at the roadside network to the ITS station-internal network. The interface to the in-vehicle components (e.g., ECUs 1605) may be the same or similar as those discussed herein (see e.g., IX 2006 of FIG. 20, and IX 2156 of FIG. 21) and/or may be a proprietary interface/interconnect. Access to components (e.g., ECUs 1605) may be implementation-specific. The sensor(s) 1808 may be inductive loops and/or sensors that are the same or similar to the sensors 172 discussed infra with respect to FIG. 1 and/or sensor circuitry 2172 discussed infra with respect to FIG. 21.

The actuators 1813 are devices that are responsible for moving and controlling a mechanism or system. In various embodiments, the actuators 1813 are used to change the operational state (e.g., on/off, zoom or focus, etc.), position, and/or orientation of the sensors 1808. In some embodiments, the actuators 1822 are used to change the operational state of some other roadside equipment, such as gates, traffic lights, digital signage or variable message signs (VMS), etc. The actuators 1813 are configured to receive control signals from the R-ITS-S 1801 via the roadside network and convert the signal energy (or some other energy) into an electrical and/or mechanical motion. The control signals may be relatively low energy electric voltage or current. In embodiments, the actuators 1813 comprise electromechanical relays and/or solid-state relays, which are configured to switch electronic devices on/off and/or control motors, and/or may be that same or similar to actuators 2174 discussed infra with respect to FIG. 21.

Each of FIGS. 16, 17, and 18 also show entities which operate at the same level but are not included in the ITS-S, including the relevant HMI 1606, 1706, and 1806; vehicle motion control 1608 (only at the vehicle level); local device sensor system and IoT Platform 1605, 1705, and 1805; local device sensor fusion and actuator application 1604, 1704, and 1804; local perception and trajectory prediction applications 1602, 1702, and 1802; motion prediction 1603 and 1703, or mobile objects trajectory prediction 1803 (at the RSU level); and connected system 1607, 1707, and 1807.

The local device sensor system and IoT Platform 1605, 1705, and 1805 collects and shares IoT data. The VRU sensor system and IoT Platform 1705 is at least composed of the PoTi management function present in each ITS-S of the system. The PoTi entity provides the global time common to all system elements and the real-time position of the mobile elements. Local sensors may also be embedded in other mobile elements as well as in the road infrastructure (e.g., camera in a smart traffic light, electronic signage, etc.). An IoT platform, which can be distributed over the system elements, may contribute to providing additional information related to the environment surrounding the VRU system 1700. The sensor system can include one or more cameras, radars, LiDARs, and/or other sensors (see e.g., 2122 of FIG. 21), in a V-ITS-S 110 or R-ITS-S 130. In the VRU device 117/1700, the sensor system may include gyroscope(s), accelerometer(s), and the like (see e.g., 2122 of FIG. 21). In a central station (not shown), the sensor system includes sensors that may be located on the side of the road but directly report their data to the central station, without the involvement of a V-ITS-S 110 or an R-ITS-S 130.

The (local) sensor data fusion function and/or actuator applications 1604, 1704, and 1804 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Various ML/AI techniques can be used to carry out the sensor data fusion. Sensor data fusion usually relies on the consistency of its inputs and then on their timestamping, which corresponds to a common given time.

For any of the embodiments discussed herein, any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, etc.). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm A local perception function (which may or may not include trajectory prediction application(s)) 1602, 1702, and 1802 is provided by the local processing of information collected by the local sensor(s) associated with the system element. The local perception (and trajectory prediction) function 1602, 1702, and 1802 consumes the output of the sensor data fusion application/function 1604, 1704, and 1804 and feeds ITS-S applications with the perception data (and/or trajectory predictions). The local perception (and trajectory prediction) function 1602, 1702, and 1802 detects and characterize objects (static and mobile), which are likely to cross the trajectory of the considered moving objects. The infrastructure, and particularly the road infrastructure 1800, may offer services relevant to the VRU support service. The infrastructure may have its own sensors detecting VRUs evolutions and then computing risk of collision if also detecting local vehicles' evolutions, either directly via its own sensors or remotely via a cooperative perception supporting services such as the CPS (see e.g., ETSI TR 103 562). Additionally, road marking (e.g., zebra areas or crosswalks) and vertical signs may be considered to increase the confidence level associated with the VRU detection and mobility since VRUs 116 usually have to respect these marking/signs.

The motion dynamic prediction function 1603 and 1703, and the mobile objects trajectory prediction 1803 (at the RSU level), are related to the behavior prediction of the considered moving objects. In some embodiments, the motion dynamic prediction function 1603 and 1703 predict the trajectory of the vehicle 110 and the VRU 116, respectively. Alternatively, the motion dynamic prediction functions 1603 and 1703 may provide motion/movement predictions to the aforementioned modules. Additionally or alternatively, the mobile objects trajectory prediction 1803 predict respective trajectories of corresponding vehicles 110 and VRUs 116, which may be used to assist the VRU ITS-S 117 in performing dead reckoning and/or assist the V-ITS-S 110 with Trajectory and Behavioral Modeling.

Motion dynamic prediction includes a moving object trajectory resulting from the evolution of the successive mobile positions. A change of the moving object trajectory or of the moving object velocity (acceleration/deceleration) impacts the motion dynamic prediction. In most cases, when VRUs 116 are moving, they still have a large amount of possible motion dynamics in terms of possible trajectories and velocities. This means that motion dynamic prediction 1603, 1703, 1803 is used to identify which motion dynamic will be selected by the VRU 116 as quickly as possible and if this selected motion dynamic is subject to a risk of collision with another VRU or a vehicle.

The motion dynamic prediction functions 1603, 1703, 1803 analyze the evolution of mobile objects and the potential trajectories that may meet at a given time to determine a risk of collision between them. The motion dynamic prediction works on the output of cooperative perception considering the current trajectories of the considered device (e.g., VRU device 117) for the computation of the path prediction; the current velocities and their past evolutions for the considered mobiles for the computation of the velocity evolution prediction; and the reliability level which can be associated to these variables. The output of this function is provided to the risk analysis function.

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device navigation system, which provides assistance to the user to select the best trajectory for reaching its planned destination. With the development of Mobility as a Service (MaaS), multimodal itinerary computation may also indicate to the ITS-S user dangerous areas and then assist in the motion dynamic prediction at the level of the multimodal itinerary provided by the system. In another example, the knowledge of the user habits and behaviors may be additionally or alternatively used to improve the consistency and the reliability of the motion predictions. Some users follow the same itineraries, using similar motion dynamics, for example, when going to the main Point of Interest (POI), which is related to their main activities (e.g., going to school, going to work, doing some shopping, going to the nearest public transport station from their home, going to sport center, etc.). The device or a remote service center may learn and memorize these habits. In another example, the indication by the user itself of its selected trajectory in particular when changing it (e.g., using a right turn or left turn signal similar to vehicles when indicating a change of direction).

The vehicle motion control 1608 may be included for computer-assisted and/or automated vehicles 110. Both the HMI entity 1606 and vehicle motion control entity 1608 may be triggered by one or more ITS-S applications. The vehicle motion control entity 1608 may be a function under the responsibility of a human driver or of the vehicle if it is able to drive in automated mode. The motion control 1608 is responsible for controlling moving and/or rotating parts of within the vehicle 110 in a well-defined manner. The motion control 1608 executes planned intentions by providing necessary inputs to the hardware and mechanical elements that will generate the desired motions. The motion control 1608 may include a motion controller that maps interactions in the real world to particular actions/tasks to be performed. Measurements inside the motion control 1608 can be used to determine how well the system is behaving, and therefore the motion controller can react to reject disturbances and alter the dynamics of the system to the desired state. Models of the system can also be used to describe the desired motion in greater detail, which may provide more satisfactory motion execution.

Figure 21:
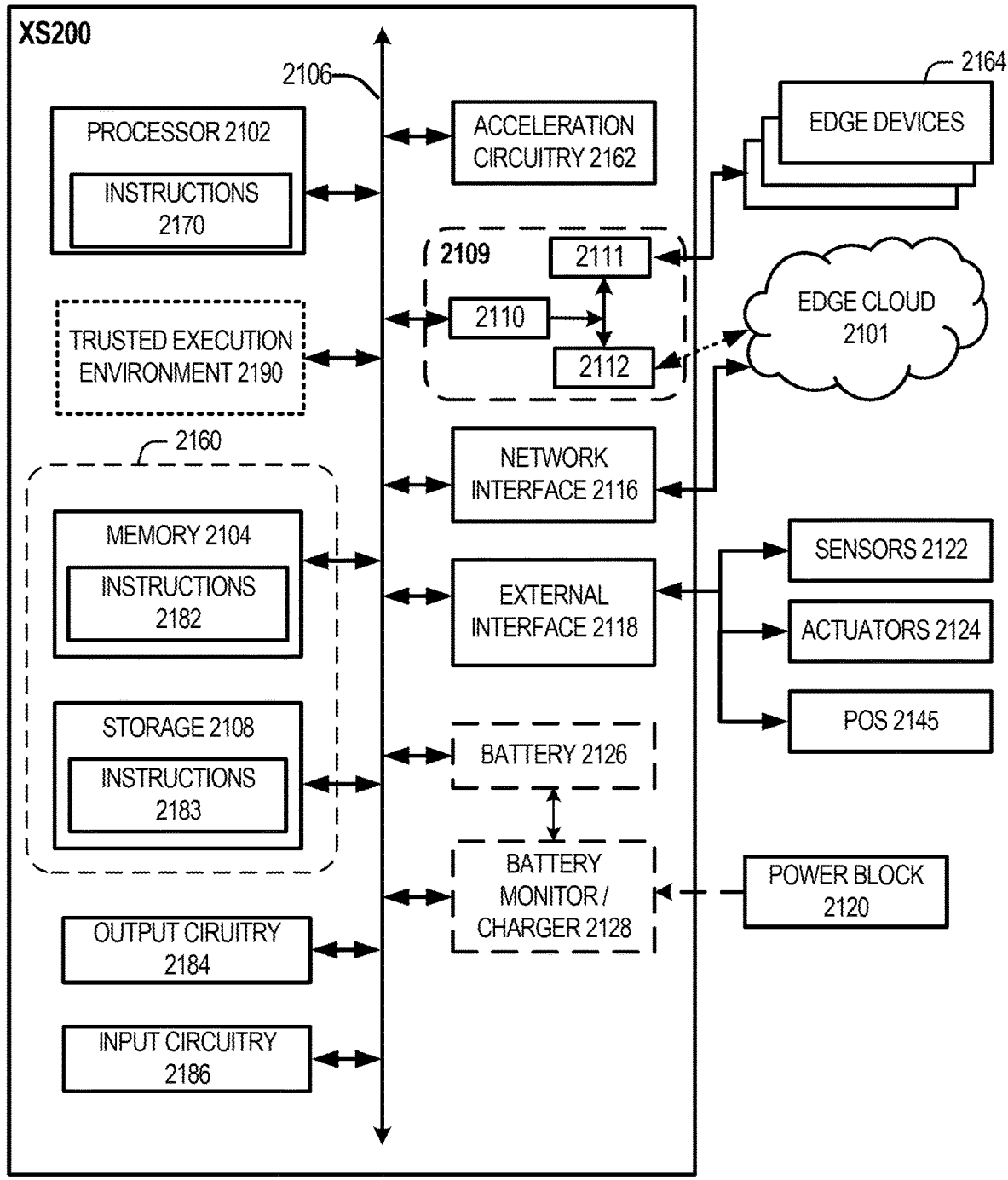

The motion controller may periodically send desired set points to one or several actuators (e.g., sensor data fusion application/function 1604 including one or more actuators 2174 of FIG. 21 such as linear actuator(s) or a drive) which thereupon perform a corresponding action/task on one or several processes (e.g., a movement or rotation of a component such as the vehicle steering components, brakes, etc.; controlling fuel injection; ignition coils, etc.). At the same time, sensors (e.g., the local device sensor system and IoT Platform 1605 including one or more sensors 2172 of FIG. 21) determine the current state of the process(es) (e.g., the current position and/or rotation of one or multiple components, engine load (RPM), throttle position and/or manifold pressure (load reference), etc.), and send the actual values (sensor data) back to the motion controller. This may be done in a cyclic and/or deterministic manner, such that during one application cycle the motion controller sends updated set points to one or more actuators 1604 and/or ECUs 1615, one or more sensors 1605 send their actual values (sensor data) back to the motion controller, and/or one or more ECUs 1615 send their actual values (control system data (CSD)) back to the motion controller.

In various embodiments, the GMPs (or "maneuver coordination strategies") include or indicate a coordinated sequence of actions/tasks, where each action/task is performed by one of more V-ITS-Ss 110 in an order specified by the GMP, and each action/task is a maneuver or motion to be performed by a corresponding V-ITS-Ss 110. The GMPs may be program code, markup language documents, scripts, or other like machine-readable instructions (or data used to generate such instructions) that are used by respective ITS-Ss to execute their respective maneuvers/motions. The motion controller of the motion control 1608 may map the described maneuvers in a GMP to specific movements to be performed by hardware and/or mechanical components of the V-ITS-Ss 110, and send appropriate control signals to the hardware and/or mechanical components to perform the indicated maneuvers at the desired time.

The Human Machine Interface (HMI) 1606, 1706, and 1806, when present, enables the configuration of initial data (parameters) in the management entities (e.g. VRU profile management) and in other functions (e.g. VRU Basic service management). The HMI 1606, 1706, and 1806 enable communication of external events related to the VRU Basic service to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 1700), similar to a vehicle driver, the HMI provides the information to the VRU 116, considering its profile (e.g. for a blind person, the information is presented with a clear sound level using accessibility capabilities of the particular platform of the personal computing system 1700). In various implementations, the HMI 1606, 1706, and 1806 may be part of an alerting system.

The connected systems 1607, 1707, and 1807 refer to components/devices used to connect a system with one or more other systems. As examples, the connected systems 1607, 1707, and 1807 may include communication circuitry and/or radio units. The VRU system 1700 may be a connected system made of up to 4 different levels of equipment. The VRU system 1700 may also be an information system that collects, in real-time, information resulting from events, processes the collected information and stores them together with processed results. At each level of the VRU system 1700, the information collection, processing and storage is related to the functional and data distribution scenario, which is implemented.

3. Computing System and Hardware Configurations

Figure 19:
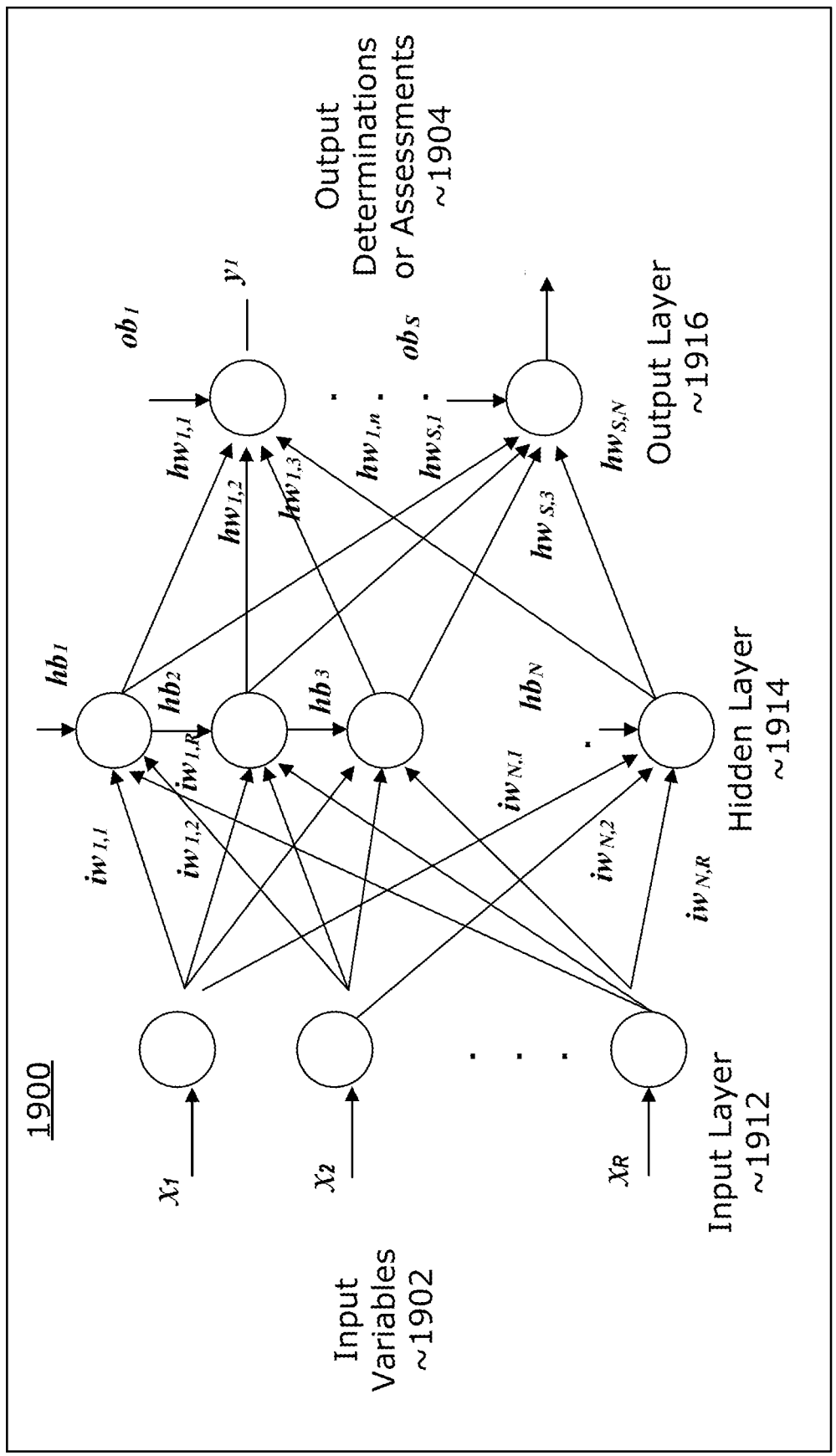
FIG. 19 illustrates an example neural network suitable for practicing the various embodiments discussed herein.

FIG. 19 illustrates an example NN 1900 suitable for use by a UVCS and/or an ITS-S (such as those discussed previously), in accordance with various embodiments. NN 1900 may be suitable for use by one or more of the subsystems and/or the various embodiments discussed herein, implemented in part by a hardware accelerator of a UVCS module. As shown, example NN 1900 may be a multi-layer feedforward NN (FNN) comprising an input layer 1912, one or more hidden layers 1914 and an output layer 1916. Input layer 1912 receives data of input variables ($x_i$) 1902. Hidden layer(s) 1914 processes the inputs, and eventually, output layer 1916 outputs the determinations or assessments ($y_i$) 1904. In one example implementation the input variables ($x_i$) 1902 of the NN are set as a vector containing the relevant variable data, while the output determination or assessment ($y_i$) 1904 of the NN are also as a vector. As an example, the multi-layer FNN may be expressed through the following equations:

$$ho_i = f(\Sigma_{j=1}^{R}(iw_{i,j}x_j) + hb_i), \text{ for } i=1,\ldots,N$$

$$y_i = f(\Sigma_{k=1}^{N}(hw_{i,k}ho_k) + ob_i), \text{ for } i=1,\ldots,S$$

In these equations, $ho_i$ and $y_i$ are the hidden layer variables and the final outputs, respectively. $f(\ )$ is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

In this equation, $y_{kp}$ and $t_{kp}$ are the predicted and the target values of pth output unit for sample k, respectively, and m is the number of samples.

In embodiments, the NN 1900 is used for one or more ITS-S subsystems, such as the subsystems shown by FIGS. 16, 17, and 18. The input variables ($x_i$) 1902 may include various sensor data collected by various embedded or accessible sensors, data obtained via the message exchanges (e.g., the various MCMs discussed previously), as well as data describing relevant factors to a decision. The output variables ($y_i$) 1904 may include determined response (e.g., adjusting speed, braking, changing lane(s), and so forth). The network variables of the hidden layer(s) for the NN 1900, are determined by the training data.

In one example, the NN 1900 is used for the motion detection, which is used to determine the motion/activity of objects such as VRUs 116 and/or V-ITS-Ss 110 based on the y sensor data obtained from the one or more sensors (e.g., image capture devices, LiDAR, Radar, etc.). In another example, the NN 1900 is used for object detection/classification. The object detection or recognition models may include an enrollment phase and an evaluation phase. During the enrollment phase, one or more features are extracted from the sensor data (e.g., image or video data). A feature is an individual measureable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

In another example, the NN 1900 is used for object tracking, for example, tracking/monitoring movements of VRUs 116 and/or V-ITS-Ss 110. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In the example of FIG. 19, for simplicity of illustration, there is only one hidden layer in the NN. In some other embodiments, there can be many hidden layers. Furthermore, the NN can be in some other types of topology, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), and so forth.

Figure 20:
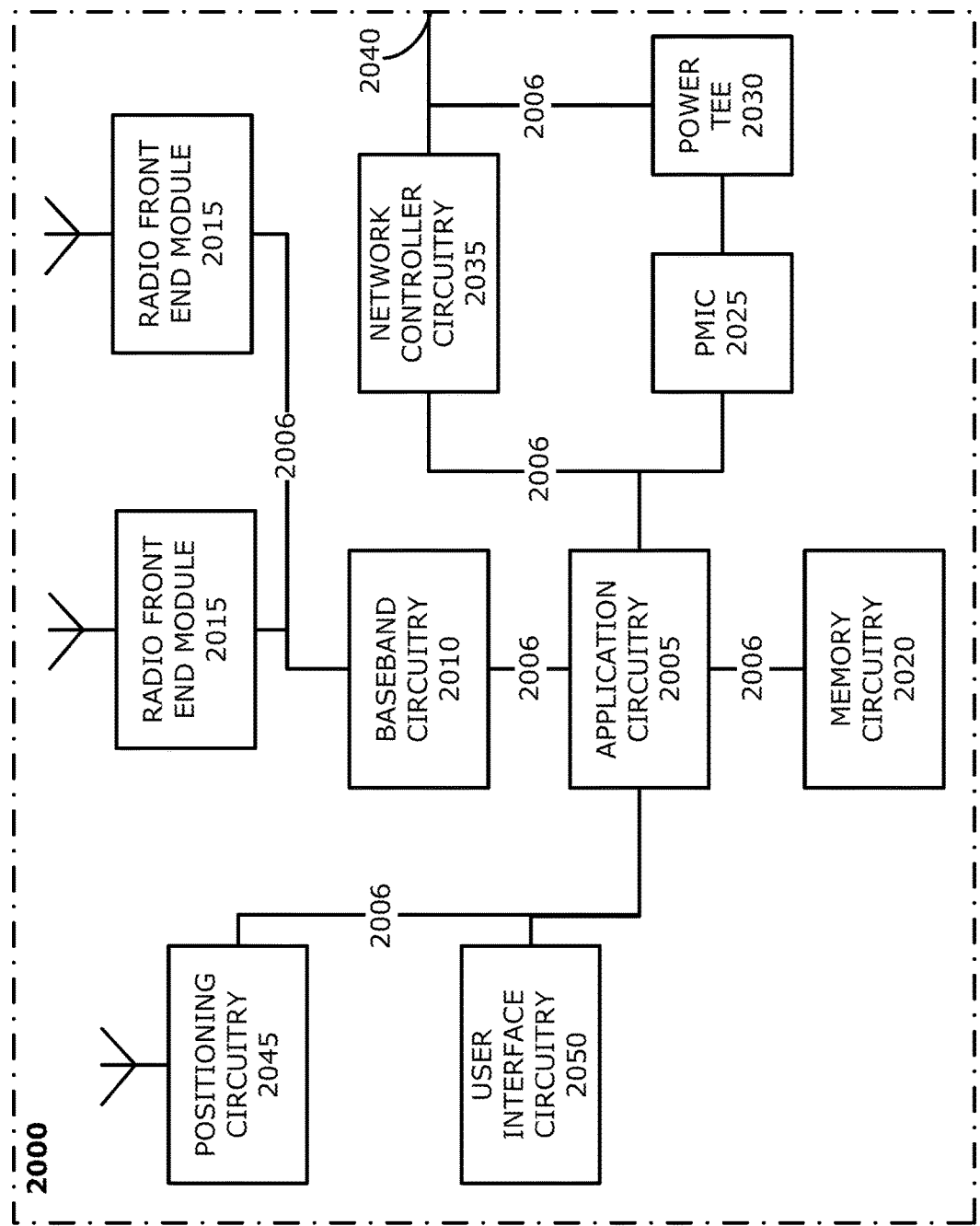
FIGS. 20 and 21 depict example components of various compute nodes in edge computing system(s).

FIGS. 20 and 21 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 20 illustrates an example of infrastructure equipment 2000 in accordance with various embodiments. The infrastructure equipment 2000 (or "system 2000") may be implemented as a base station, RSU, R-ITS-S, radio head, relay station, server, gateway, and/or any other element/device discussed herein.

The system 2000 includes application circuitry 2005, baseband circuitry 2010, one or more radio front end modules (RFEMs) 2015, memory circuitry 2020, power management integrated circuitry (PMIC) 2025, power tee circuitry 2030, network controller circuitry 2035, network interface connector 2040, positioning circuitry 2045, and user interface 2050. In some embodiments, the device 2000 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 2005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose 10, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2005 may be coupled with or may include memory/storage elements and may be configured to execute instructions stored in the memory/storage to enable various applications or operating systems to run on the system 2000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 2005 may comprise, or may be, a special-purpose processor/controller to operate according to the various embodiments herein. As examples, the processor(s) of application circuitry 2005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2000 may not utilize application circuitry 2005, and instead may include a special-purpose processor/controller to process IP data received from an EPC or 5GC, for example.

In some implementations, the application circuitry 2005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 2005 may comprise logic blocks or logic fabric, and other interconnected resources that may be programmed to perform various functions, such as the procedures, methods, functions, etc. of the various embodiments discussed herein. In such embodiments, the circuitry of application circuitry 2005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of Figure XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 2005 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating coprocessor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 2010 may be implemented, for example, as a solder-down substrate including one or more integrated circuits, a single packaged integrated circuit soldered to a main circuit board or a multi-chip module containing two or more integrated circuits. The baseband circuitry 2010 includes one or more processing devices (e.g., baseband processors) to carry out various protocol and radio control functions. Baseband circuitry 2010 may interface with application circuitry of system 2000 for generation and processing of baseband signals and for controlling operations of the RFEMs 2015. The baseband circuitry 2010 may handle various radio control functions that enable communication with one or more radio networks via the RFEMs 2015. The baseband circuitry 2010 may include circuitry such as, but not limited to, one or more single-core or multi-core processors (e.g., one or more baseband processors) or control logic to process baseband signals received from a receive signal path of the RFEMs 2015, and to generate baseband signals to be provided to the RFEMs 2015 via a transmit signal path. In various embodiments, the baseband circuitry 2010 may implement a real-time OS (RTOS) to manage resources of the baseband circuitry 2010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, Offene Systeme und deren Schnittstellen für die Elektronik in Kraftfahrzeugen (OSEK), Portable Operating System Interface (POSIX), or any other suitable RTOS, such as those discussed herein.

Although not shown by FIG. 20, in one embodiment, the baseband circuitry 2010 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 2015 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 2015 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2010 and/or RFEMs 2015. The baseband circuitry 2010 may also support radio communications for more than one wireless protocol.

Continuing with the aforementioned embodiment, the baseband circuitry 2010 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 2050 may include one or more user interfaces designed to enable user interaction with the system 2000 or peripheral component interfaces designed to enable peripheral component interaction with the system 2000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 2015, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 2010 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 2020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2020 may be implemented as one or more of solder down packaged integrated circuits, socketed memory modules and plug-in memory cards.

The memory circuitry 2020 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 2000, an operating system of infrastructure equipment 2000, one or more applications, and/or for carrying out the embodiments discussed herein. The computational logic may be stored or loaded into memory circuitry 2020 as instructions for execution by the processors of the application circuitry 2005 to provide or perform the functions described herein. The various elements may be implemented by assembler instructions supported by processors of the application circuitry 2005 or high-level languages that may be compiled into such instructions. The permanent copy of the programming instructions may be placed into persistent storage devices of memory circuitry 2020 in the factory during manufacture, or in the field through, for example, a distribution medium (not shown), through a communication interface (e.g., from a distribution server), and/or over-the-air (OTA).

As discussed in more detail infra, infrastructure equipment 2000 may be configured to support a particular V2X RAT based on the number of vUEs 121 that support (or are capable to communicate) the particular V2X RAT. In embodiments, the memory circuitry 2020 may store a RAT configuration control module to control the (re)configuration of the infrastructure equipment 2000 to support a particular RAT and/or V2X RAT. The configuration control module provides an interface for triggering (re)configuration actions. In some embodiments, the memory circuitry 2020 may also store a RAT software (SW) management module to implement SW loading or provisioning procedures, and (de)activation SW in the infrastructure equipment 2000. In either of these embodiments, the memory circuitry 2020 may store a plurality of V2X RAT software components, each of which include program code, instructions, modules, assemblies, packages, protocol stacks, software engine(s), etc., for operating the infrastructure equipment 2000 or components thereof (e.g., RFEMs 2015) according to a corresponding V2X RAT. When a V2X RAT component is configured or executed by the application circuitry 2005 and/or the baseband circuitry 2010, the infrastructure equipment 2000 operates according to the V2X RAT component.

In a first example, a first V2X RAT component may be an C-V2X component, which includes LTE and/or C-V2X protocol stacks that allow the infrastructure equipment 2000 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 2000 is acting as a relay. In some embodiments, the user plane protocol stack may be the PC5 user plane (PC5-U) protocol stack discussed in 3GPP TS 23.303 v15.1.0 (2018 June).

In a second example, a second V2X RAT component may be a ITS-G5 component, which includes ITS-G5 (IEEE 802.11p) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 2020 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 2000 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 2000 (e.g., memory map, instruction set, programming model, etc.).

The PMIC 2025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 2000 using a single cable.

The network controller circuitry 2035 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 2000 via network interface connector 2040 using a physical connection, which may be electrical (commonly referred to as a "copper interconnect"), optical, or wireless. The network controller circuitry 2035 may include one or more dedicated processors and/or FPGAs to communicate using one or more of the aforementioned protocols. In some implementations, the network controller circuitry 2035 may include multiple controllers to provide connectivity to other networks using the same or different protocols. In various embodiments, the network controller circuitry 2035 enables communication with associated equipment and/or with a backend system (e.g., server(s), core network, cloud service, etc.), which may take place via a suitable gateway device.

The positioning circuitry 2045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2045 may include a Micro-Technology for Positioning, Navigation, and Timing (Micro-PNT) IC that uses a master timing clock to perform position tracking/estimation without GNSS assistance. The positioning circuitry 2045 may also be part of, or interact with, the baseband circuitry 2010 and/or RFEMs 2015 to communicate with the nodes and components of the positioning network. The positioning circuitry 2045 may also provide position data and/or time data to the application circuitry 2005, which may use the data to synchronize operations with various other infrastructure equipment, or the like.

The components shown by FIG. 3 may communicate with one another using interface circuitry 306 or interconnect (IX) 2006, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 21 illustrates an example of components that may be present in an edge computing node 2150 for implementing the techniques (e.g., operations, processes, methods, and methodologies) described herein. This edge computing node 2150 provides a closer view of the respective components of node 2100 when implemented as or as part of a computing device (e.g., as a mobile device, a base station, server, gateway, etc.). The edge computing node 2150 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2150, or as components otherwise incorporated within a chassis of a larger system.

The edge computing node 2150 includes processing circuitry in the form of one or more processors 2152. The processor circuitry 2152 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2152 may include one or more hardware accelerators (e.g., same or similar to acceleration circuitry 2164), which may be microprocessors, programmable processing devices (e.g., FPGA, ASIC, etc.), or the like. The one or more accelerators may include, for example, computer vision and/or deep learning accelerators. In some implementations, the processor circuitry 2152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2152 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2152 may be coupled with or may include memory/storage and may be configured to execute instructions stored in the memory/storage to enable various applications or operating systems to run on the node 2150. The processors (or cores) 2152 is configured to operate application software to provide a specific service to a user of the node 2150. In some embodiments, the processor(s) 2152 may be a special-purpose processor(s)/controller(s) configured (or configurable) to operate according to the various embodiments herein.

As examples, the processor(s) 2152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2152 may be a part of a system on a chip (SoC), System-in-Package (SiP), a multi-chip package (MCP), and/or the like, in which the processor(s) 2152 and other components are formed into a single integrated circuit, or a single package, such as the Edison™ or Galileo™ SoC boards from Intel® Corporation. Other examples of the processor(s) 2152 are mentioned elsewhere in the present disclosure.

The processor(s) 2152 may communicate with system memory 2154 over an interconnect (IX) 2156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2158 may also couple to the processor 2152 via the IX 2156. In an example, the storage 2158 may be implemented via a solid-state disk drive (SSDD) and/or high-speed electrically erasable memory (commonly referred to as "flash memory"). Other devices that may be used for the storage 2158 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2154 and/or storage circuitry 2158 may also incorporate three-dimensional (3D) cross-point (XPOINT) memories from Intel® and Micron®.

In low power implementations, the storage 2158 may be on-die memory or registers associated with the processor 2152. However, in some examples, the storage 2058 may be implemented using a micro hard disk drive (HDD). Further, any number of new technologies may be used for the storage 2158 in addition to, or instead of, the technologies described, such resistance change memories, phase change memories, holographic memories, or chemical memories, among others.

The storage circuitry 2158 store computational logic 2182 (or "modules 2182") in the form of software, firmware, or hardware commands to implement the techniques described herein. The computational logic 2182 may be employed to store working copies and/or permanent copies of computer programs, or data to create the computer programs, for the operation of various components of node 2150 (e.g., drivers, etc.), an OS of node 2150 and/or one or more applications for carrying out the embodiments discussed herein. The computational logic 2182 may be stored or loaded into memory circuitry 2154 as instructions 2182, or data to create the instructions 2188, for execution by the processor circuitry 2152 to provide the functions described herein. The various elements may be implemented by assembler instructions supported by processor circuitry 2152 or high-level languages that may be compiled into such instructions (e.g., instructions 2188, or data to create the instructions 2188). The permanent copy of the programming instructions may be placed into persistent storage devices of storage circuitry 2158 in the factory or in the field through, for example, a distribution medium (not shown), through a communication interface (e.g., from a distribution server (not shown)), or over-the-air (OTA).

In an example, the instructions 2188 provided via the memory circuitry 2154 and/or the storage circuitry 2158 of FIG. 21 are embodied as one or more non-transitory computer readable storage media (see e.g., NTCRSM 2160) including program code, a computer program product or data to create the computer program, with the computer program or data, to direct the processor circuitry 2158 of node 2150 to perform electronic operations in the node 2150, and/or to perform a specific sequence or flow of actions, for example, as described with respect to the flowchart(s) and block diagram(s) of operations and functionality depicted previously. The processor circuitry 2152 accesses the one or more non-transitory computer readable storage media over the interconnect 2156.

In alternate embodiments, programming instructions (or data to create the instructions) may be disposed on multiple NTCRSM 2160. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2160 may be embodied by devices described for the storage circuitry 2158 and/or memory circuitry 2154. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2182, instructions 2182, instructions 2188 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2150, partly on the system 2150, as a stand-alone software package, partly on the system 2150 and partly on a remote computer or entirely on the remote computer or server. In the latter scenario, the remote computer may be connected to the system 2150 through any type of network, including a LAN or WAN, or the connection may be made to an external computer (e.g., through the Internet using an Internet Service Provider).

In an example, the instructions 2188 on the processor circuitry 2152 (separately, or in combination with the instructions 2182 and/or logic/modules 2182 stored in computer-readable storage media) may configure execution or operation of a trusted execution environment (TEE) 2190. The TEE 2190 operates as a protected area accessible to the processor circuitry 2152 to enable secure access to data and secure execution of instructions. In some embodiments, the TEE 2190 may be a physical hardware device that is separate from other components of the system 2150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 2190 may be implemented as secure enclaves, which are isolated regions of code and/or data within the processor and/or memory/storage circuitry of the system 2150. Only code executed within a secure enclave may access data within the same secure enclave, and the secure enclave may only be accessible using the secure application (which may be implemented by an application processor or a tamper-resistant microcontroller). Various implementations of the TEE 2150, and an accompanying secure area in the processor circuitry 2152 or the memory circuitry 2154 and/or storage circuitry 2158 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 2150 through the TEE 2190 and the processor circuitry 2152.

In some embodiments, the memory circuitry 2154 and/or storage circuitry 2158 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 2154 and/or storage circuitry 2158 may be divided into one or more trusted memory regions for storing applications or software modules of the TEE 2190.

Although the instructions 2182 are shown as code blocks included in the memory circuitry 2154 and the computational logic 2182 is shown as code blocks in the storage circuitry 2158, it should be understood that any of the code blocks may be replaced with hardwired circuits, for example, built into an FPGA, ASIC, or some other suitable circuitry. For example, where processor circuitry 2152 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2154 and/or storage circuitry 2158 may store program code of an operating system (OS), which may be a general purpose OS or an OS specifically written for and tailored to the computing node 2150. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 2150, attached to the node 2150, or otherwise communicatively coupled with the node 2150. The drivers may include individual drivers allowing other components of the node 2150 to interact or control various I/O devices that may be present within, or connected to, the node 2150. For example, the drivers may include a display driver to control and allow access to a display device, a touchscreen driver to control and allow access to a touchscreen interface of the node 2150, sensor drivers to obtain sensor readings of sensor circuitry 2172 and control and allow access to sensor circuitry 2172, actuator drivers to obtain actuator positions of the actuators 2174 and/or control and allow access to the actuators 2174, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 2150 (not shown).

The components of edge computing device 2150 may communicate over the IX 2156. The IX 2156 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 2156 may be a proprietary bus, for example, used in a SoC based system.

The IX 2156 couples the processor 2152 to communication circuitry 2166 for communications with other devices, such as a remote server (not shown) and/or the connected edge devices 2162. The communication circuitry 2166 is a hardware element, or collection of hardware elements, used to communicate over one or more networks (e.g., cloud 2163) and/or with other devices (e.g., edge devices 2162).

The transceiver 2166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2162. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2166 (or multiple transceivers) may communicate using multiple standards or radios for communications at a different range. For example, the edge computing node 2150 may communicate with close devices, e.g., within about 10 meters, using a local transceiver based on BLE, or another low power radio, to save power. More distant connected edge devices 2162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2166 (e.g., a radio transceiver) may be included to communicate with devices or services in the edge cloud 2163 via local or wide area network protocols. The wireless network transceiver 2166 may be an LPWA transceiver that follows the IEEE 802.15.4, or IEEE 802.15.4g standards, among others. The edge computing node 2163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2166, as described herein. For example, the transceiver 2166 may include a cellular transceiver that uses spread spectrum (SPA/SAS) communications for implementing high-speed communications. Further, any number of other protocols may be used, such as WiFi® networks for medium speed communications and provision of network communications. The transceiver 2166 may include radios that are compatible with any number of 3GPP specifications, such as LTE and 5G/NR communication systems, discussed in further detail at the end of the present disclosure. A network interface controller (NIC) 2168 may be included to provide a wired communication to nodes of the edge cloud 2163 or to other devices, such as the connected edge devices 2162 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 2168 may be included to enable connecting to a second network, for example, a first NIC 2168 providing communications to the cloud over Ethernet, and a second NIC 2168 providing communications to other devices over another type of network.

Given the variety of types of applicable communications from the device to another component or network, applicable communications circuitry used by the device may include or be embodied by any one or more of components 2164, 2166, 212068, or 2170. Accordingly, in various examples, applicable means for communicating (e.g., receiving, transmitting, etc.) may be embodied by such communications circuitry.

The edge computing node 2150 may include or be coupled to acceleration circuitry 2164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2164 may comprise logic blocks or logic fabric and other interconnected resources that may be programmed (configured) to perform various functions, such as the procedures, methods, functions, etc. of the various embodiments discussed herein. In such implementations, the acceleration circuitry 2164 may also include memory cells (e.g., EPROM, EEPROM, flash memory, static memory (e.g., SRAM, anti-fuses, etc.) used to store logic blocks, logic fabric, data, etc. in LUTs and the like.

The IX 2156 also couples the processor 2152 to a sensor hub or external interface 2170 that is used to connect additional devices or subsystems. The additional/external devices may include sensors 2172, actuators 2174, and positioning circuitry 2145.

The sensor circuitry 2172 includes devices, modules, or subsystems whose purpose is to detect events or changes in its environment and send the information (sensor data) about the detected events to some other a device, module, subsystem, etc. Examples of such sensors 2172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and the like. Sensor data from sensors 172 of the host vehicle may include engine sensor data collected by various engine sensors (e.g., engine temperature, oil pressure, and so forth).

The actuators 2174, allow node 2150 to change its state, position, and/or orientation, or move or control a mechanism or system. The actuators 2174 comprise electrical and/or mechanical devices for moving or controlling a mechanism or system, and converts energy (e.g., electric current or moving air and/or liquid) into some kind of motion. The actuators 2174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 2150 may be configured to operate one or more actuators 2174 based on one or more captured events and/or instructions or control signals received from a service provider and/or various client systems In embodiments, the actuators 2174 may be driving control units (e.g., DCUs 174 of FIG. 1), Examples of DCUs 2174 include a Drivetrain Control Unit, an Engine Control Unit (ECU), an Engine Control Module (ECM), EEMS, a Powertrain Control Module (PCM), a Transmission Control Module (TCM), a Brake Control Module (BCM or EBCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the control system data (CSD) that may be generated by the actuators/DCUs 2174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular embodiments, the actuators/DCUs 2174 may be provisioned with control system configurations (CSCs), which are collections of software modules, software components, logic blocks, parameters, calibrations, variants, etc. used to control and/or monitor various systems implemented by node 2150 (e.g., when node 2150 is a CA/AD vehicle/V-ITS-S 110). The CSCs define how the DCUs 2174 are to interpret sensor data of sensors 2172 and/or CSD of other DCUs 2174 using multidimensional performance maps or lookup tables, and define how actuators/components are to be adjust/modified based on the sensor data. The CSCs also define how the actuators/DCUs/ECUs 2174 are to operate in response to commands and/or sensor data. Additionally or alternatively, a CSC may be a selection of software modules, software components, parameters, calibrations, variants, etc. as defined by an arrangement of software elements in a system or device. The CSCs may comprise a System Configuration Description that indicates relevant system information to be integrated into one or more ECUs 2174. The System Configuration Description may include one or more ECU extracts including information for a specific ECU 2174. Additionally, the System Configuration Description may include one or more ECU Configuration Descriptions comprising basic software configuration information for an individual ECU 2174 to generate executable software modules, code of the basic software modules, and/or code of one or more software components. In some cases, a first CSC may instruct the ECUs 2174 to distribute other CSCs to one or more other ECUs 2174, and control or instruct the one or more other ECUs 2174 to generate and execute software components/applications in their corresponding runtime environments (RTEs) according to their corresponding CSCs.

The CSCs and/or the software components to be executed by individual DCUs 2174 may be developed using any suitable object-oriented programming language (e.g., C, C++, Java, etc.), schema language (e.g., XML schema, AUTomotive Open System Architecture (AUTOSAR) XML schema, etc.), scripting language (VBScript, JavaScript, etc.), or the like. the CSCs and software components may be defined using a hardware description language (HDL), such as register-transfer logic (RTL), very high speed integrated circuit (VHSIC) HDL (VHDL), Verilog, etc. for DCUs 2174 that are implemented as field-programmable devices (FPDs). The CSCs and software components may be generated using a modeling environment or model-based development tools. According to various embodiments, the CSCs may be generated or updated by one or more autonomous software agents and/or AI agents based on learnt experiences, ODDs, and/or other like parameters.

The IVS 101 and/or the DCUs 2174 is configurable or operable to operate one or more actuators based on one or more captured events (as indicated by sensor data captured by sensors 2172) and/or instructions or control signals received from user inputs, signals received over-the-air from a service provider, or the like. Additionally, one or more DCUs 2174 may be configurable or operable to operate one or more actuators by transmitting/sending instructions or control signals to the actuators based on detected events (as indicated by sensor data captured by sensors 2172). One or more DCUs 2174 may be capable of reading or otherwise obtaining sensor data from one or more sensors 2172, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 2174 may be configurable or operable to provide the control system data to a central hub and/or other devices/components on a periodic or aperiodic basis, and/or when triggered.

The various subsystems, including sensors 2172 and/or DCUs 2174, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

In embodiments, individual AI agents are configurable or operable to control respective control systems of the host vehicle, some of which may involve the use of one or more DCUs 2174 and/or one or more sensors 2172. In these embodiments, the actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 2172 and receive CSD from one or more DCUs 2174 of the host vehicle 110. The act of monitoring may include capturing CSD and/or sensor data from individual sensors 172 and DCUs 2174. Monitoring may include polling (e.g., periodic polling, sequential (roll call) polling, etc.) one or more sensors 2172 for sensor data and/or one or more DCUs 2174 for CSD for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the host vehicle reaches predetermined speeds and/or distances in a predetermined amount of time (with or without intermittent stops). The events/triggers may be AI agent specific, and may vary depending of a particular embodiment. In some embodiments, the monitoring may be triggered or activated by an application or subsystem of the IVS 101 or by a remote device, such as compute node 140 and/or server(s) 160.

In some embodiments, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 2172 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 2174 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 2145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 2145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2145 may include a Micro-Technology for Positioning, Navigation, and Timing (Micro-PNT) IC that uses a master timing clock to perform position tracking/ estimation without GNSS assistance. The positioning circuitry 2145 may also be part of, or interact with, the communication circuitry 2166 to communicate with the nodes and components of the positioning network. The positioning circuitry 2145 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2145 is, or includes an INS, which is a system or device that uses sensor circuitry 2172 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 2150 without the need for external references.

In some optional examples, various input/output (I/O) devices may be present within or connected to, the edge computing node 2150, which are referred to as input circuitry 2186 and output circuitry 2184 in FIG. 21. The input circuitry 212086 and output circuitry 2184 include one or more user interfaces designed to enable user interaction with the node 2150 and/or peripheral component interfaces designed to enable peripheral component interaction with the node 2150. Input circuitry 2186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2184 may be included to show information or otherwise convey information, such as sensor readings, actuator position(s), or other like information. Data and/or graphics may be displayed on one or more user interface components of the output circuitry 2184. Output circuitry 2184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 2150. The output circuitry 2184 may also include speakers or other audio emitting devices, printer(s), and/or the like. In some embodiments, the sensor circuitry 2172 may be used as the input circuitry 2184 (e.g., an image capture device, motion capture device, or the like) and one or more actuators 2174 may be used as the output device circuitry 2184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2176 may power the edge computing node 2150, although, in examples in which the edge computing node 2150 is mounted in a fixed location, it may have a power supply coupled to an electrical grid, or the battery may be used as a backup or for temporary capabilities. The battery 2176 may be a lithium ion battery, or a metal-air battery, such as a zinc-air battery, an aluminum-air battery, a lithium-air battery, and the like.

A battery monitor/charger 2178 may be included in the edge computing node 2150 to track the state of charge (SoCh) of the battery 2176, if included. The battery monitor/charger 2178 may be used to monitor other parameters of the battery 2176 to provide failure predictions, such as the state of health (SoH) and the state of function (SoF) of the battery 2176. The battery monitor/charger 2178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2178 may communicate the information on the battery 2176 to the processor 2152 over the IX 2156. The battery monitor/charger 2178 may also include an analog-to-digital (ADC) converter that enables the processor 2152 to directly monitor the voltage of the battery 2176 or the current flow from the battery 2176. The battery parameters may be used to determine actions that the edge computing node 2150 may perform, such as transmission frequency, mesh network operation, sensing frequency, and the like.

A power block 2180, or other power supply coupled to a grid, may be coupled with the battery monitor/charger 2178 to charge the battery 2176. In some examples, the power block 2180 may be replaced with a wireless power receiver to obtain the power wirelessly, for example, through a loop antenna in the edge computing node 2150. A wireless battery charging circuit, such as an LTC4020 chip from Linear Technologies of Milpitas, California, among others, may be included in the battery monitor/charger 2178. The specific charging circuits may be selected based on the size of the battery 2176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2158 may include instructions 2182 in the form of software, firmware, or hardware commands to implement the techniques described herein. Although such instructions 2182 are shown as code blocks included in the memory 2154 and the storage 2158, it may be understood that any of the code blocks may be replaced with hardwired circuits, for example, built into an application specific integrated circuit (ASIC).

In an example, the instructions 2082 provided via the memory 2154, the storage 2158, or the processor 2152 may be embodied as a non-transitory, machine-readable medium 2160 including code to direct the processor 2152 to perform electronic operations in the edge computing node 2150. The processor 2152 may access the non-transitory, machine-readable medium 2160 over the IX 2156. For instance, the non-transitory, machine-readable medium 2160 may be embodied by devices described for the storage 2158 or may include specific storage units such as optical disks, flash drives, or any number of other hardware devices. The non-transitory, machine-readable medium 2160 may include instructions to direct the processor 2152 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 20 and 21 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 20 and 21 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

4. Example Edge Computing System Configurations and Arrangements

Figure 22:
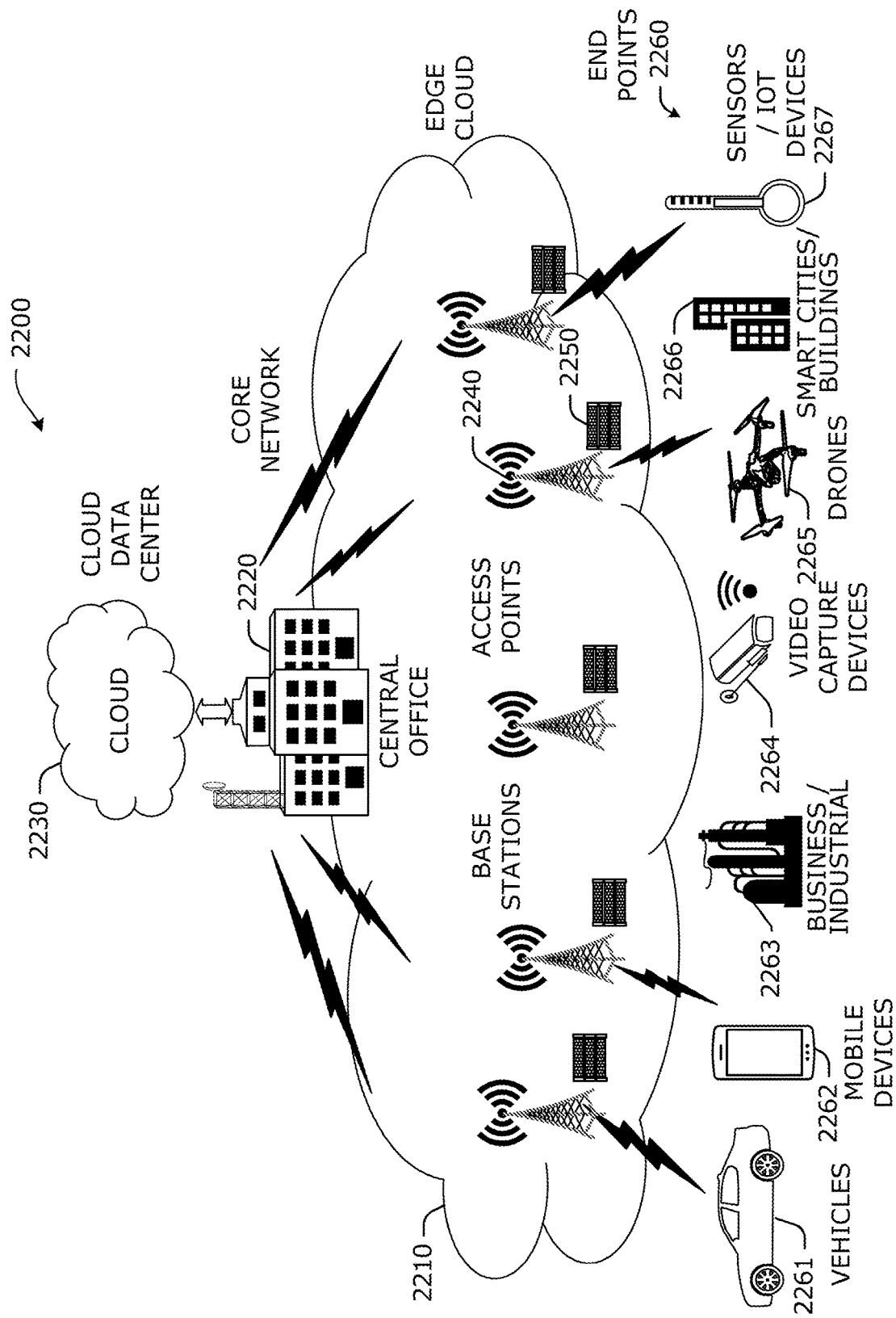
FIG. 22 illustrates an overview of an edge cloud configuration for edge computing.

FIG. 22 is a block diagram 2200 showing an overview of a configuration for edge computing, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the edge cloud 2210, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 2210 is co-located at an edge location, such as an access point or base station 2240, a local processing hub 2250, or a central office 2220, and thus may include multiple entities, devices, and equipment instances. The edge cloud 2210 is located much closer to the endpoint (consumer and producer) data sources 2260 (e.g., autonomous vehicles 2261, user equipment 2262, business and industrial equipment 2263, video capture devices 2264, drones 2265, smart cities and building devices 2266, sensors and IoT devices 2267, etc.) than the cloud data center 2230. Compute, memory, and storage resources which are offered at the edges in the edge cloud 2210 are critical to providing ultra-low latency response times for services and functions used by the endpoint data sources 2260 as well as reduce network backhaul traffic from the edge cloud 2210 toward cloud data center 2230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 23:
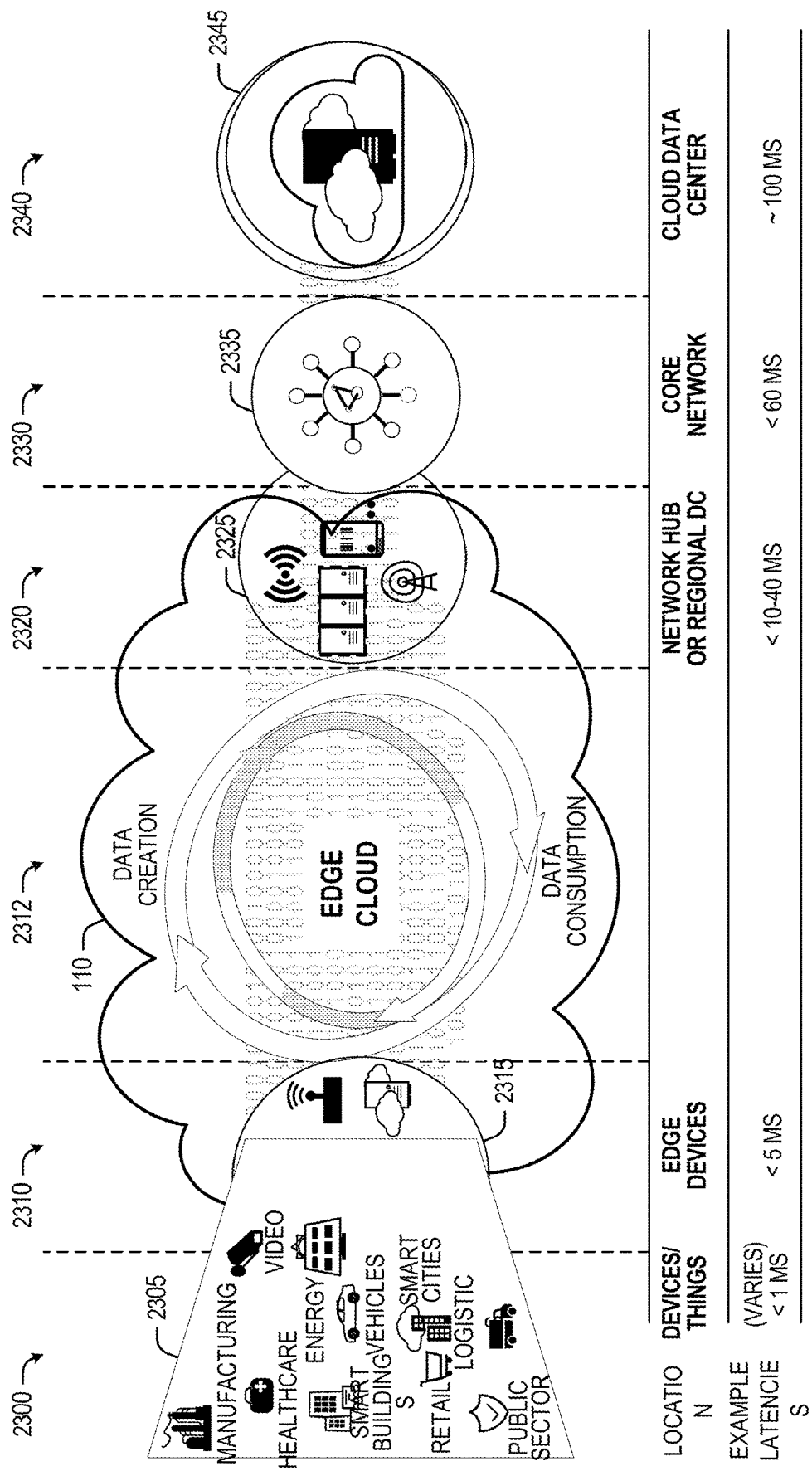
FIG. 23 illustrates operational layers among endpoints, an edge cloud, and cloud computing environments.

FIG. 23 illustrates operational layers among endpoints, an edge cloud, and cloud computing environments. Specifically, FIG. 23 depicts examples of computational use cases 2305, utilizing the edge cloud 2210 among multiple illustrative layers of network computing. The layers begin at an endpoint (devices and things) layer 2300, which accesses the edge cloud 2210 to conduct data creation, analysis, and data consumption activities. The edge cloud 2210 may span multiple network layers, such as an edge devices layer 2310 having gateways, on-premise servers, or network equipment (nodes 2315) located in physically proximate edge systems; a network access layer 2320, encompassing base stations, radio processing units, network hubs, regional data centers (DC), or local network equipment (equipment 2325); and any equipment, devices, or nodes located therebetween (in layer 2312, not illustrated in detail). The network communications within the edge cloud 2210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 2300, under 5 ms at the edge devices layer 2310, to even between 10 to 40 ms when communicating with nodes at the network access layer 2320. Beyond the edge cloud 2210 are core network 2330 and cloud data center 2340 layers, each with increasing latency (e.g., between 50-60 ms at the core network layer 2330, to 100 or more ms at the cloud data center layer). As a result, operations at a core network data center 2335 or a cloud data center 2345, with latencies of at least 50 to 100 ms or more, will not be able to accomplish many time-critical functions of the use cases 2305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2335 or a cloud data center 2345, a central office or content data network may be considered as being located within a "near edge" layer ("near" to the cloud, having high latency values when communicating with the devices and endpoints of the use cases 2305), whereas an access point, base station, on-premise server, or network gateway may be considered as located within a "far edge" layer ("far" from the cloud, having low latency values when communicating with the devices and endpoints of the use cases 2305). It will be understood that other categorizations of a particular network layer as constituting a "close", "local", "near", "middle", or "far" edge may be based on latency, distance, number of network hops, or other measurable characteristics, as measured from a source in any of the network layers 2300-2340.

The various use cases 2305 may access resources under usage pressure from incoming streams, due to multiple services utilizing the edge cloud. To achieve results with low latency, the services executed within the edge cloud 2210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2210 may provide the ability to serve and respond to multiple applications of the use cases 2305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2210 (network layers 2300-2340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2210.

As such, the edge cloud 2210 is formed from network components and functional features operated by and within edge gateway nodes, edge aggregation nodes, or other edge compute nodes among network layers 2310-2330. The edge cloud 2210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2210 may be servers, multi-tenant servers, appliance computing devices, and/or any other type of computing devices. For example, the edge cloud 2210 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 20-21. The edge cloud 2210 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 24:
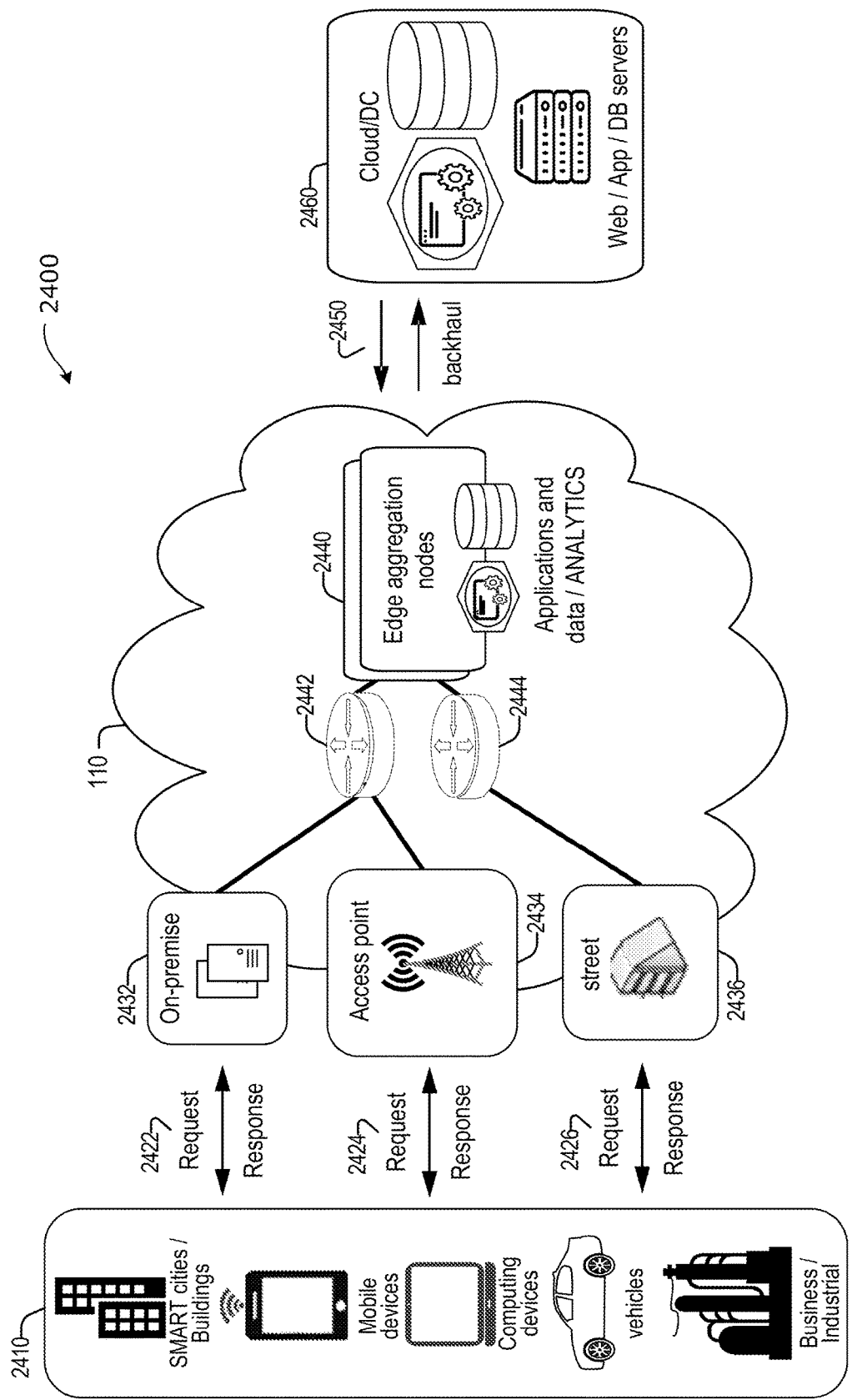
FIG. 24 illustrates an example approach for networking and services in an edge computing system.

In FIG. 24, various client endpoints 2410 (in the form of mobile devices, computers, autonomous vehicles, business computing equipment, industrial processing equipment) exchange requests and responses that are specific to the type of endpoint network aggregation. For instance, client endpoints 2410 may obtain network access via a wired broadband network, by exchanging requests and responses 2422 through an on-premise network system 2432. Some client endpoints 2410, such as mobile computing devices, may obtain network access via a wireless broadband network, by exchanging requests and responses 2424 through an access point (e.g., cellular network tower) 2434. Some client endpoints 2410, such as autonomous vehicles may obtain network access for requests and responses 2426 via a wireless vehicular network through a street-located network system 2436. However, regardless of the type of network access, the TSP may deploy aggregation points 2442, 2444 within the edge cloud 2210 to aggregate traffic and requests. Thus, within the edge cloud 2210, the TSP may deploy various compute and storage resources, such as at edge aggregation nodes 2440, to provide requested content. The edge aggregation nodes 2440 and other systems of the edge cloud 2210 are connected to a cloud or data center 2460, which uses a backhaul network 2450 to fulfill higher-latency requests from a cloud/data center for websites, applications, database servers, etc. Additional or consolidated instances of the edge aggregation nodes 2440 and the aggregation points 2442, 2444, including those deployed on a single server framework, may also be present within the edge cloud 2210 or other areas of the TSP infrastructure.

5. Example Implementations

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 includes a method of providing a Maneuver Coordination Service, "MCS", by an Intelligent Transport System Station, "ITS-S", the method comprising: generating, by an MCS entity, a Maneuver Coordination Message, "MCM", to indicate a detected event for maneuver coordination; and transmitting or broadcasting, by the MCS entity, the MCM to one or more other ITS-Ss proximate to the ITS-S.

Example 2 includes the method of example 1 and/or some other example(s) herein, further comprising: executing one or more actions of an individual maneuver change based on the detected event when the individual maneuver change without coordination is determined to be sufficient for the detected event.

Example 3 includes the method of example 1-2 and/or some other example(s) herein, further comprising: initiate group coordination for the detected event when the individual maneuver change is determined to not be sufficient for the detected event.

Example 4 includes the method of example 3 and/or some other example(s) herein, wherein the MCM is a first MCM, and initiating group coordination comprises: calculating an amount of time for execution of one or more maneuver coordination strategies; determining a set of the one or more other ITS-Ss to be included in a maneuver coordination group, "MCG"; and transmitting or broadcasting a second MCM to the determined ITS-Ss in the MCG, the second MCM including MCG information and indicating the detected event.

Example 5 includes the method of example 4 and/or some other example(s) herein, further comprising: determining a set of candidate maneuver coordination strategies, each maneuver coordination strategy of the set of candidate maneuver coordination strategies including one or more coordinated and sequential maneuver tasks for some or all ITS-Ss in the MCG; calculating a cost for each maneuver coordination strategy; and transmitting or broadcasting a third MCM to the ITS-Ss in the MCG, the third MCM including a first candidate maneuver coordination strategy based on the calculated costs.

Example 6a includes the method of example 5 and/or some other example(s) herein, further comprising: receiving, from one or more ITS-Ss in the MCG, respective fourth MCMs indicating acceptance or rejection of the first candidate maneuver coordination strategy; and determining whether a consensus is reached based on a number of the respective fourth MCMs received within the calculated amount of time.

Example 6b includes the method of example 5 and/or some other example(s) herein, further comprising: receiving, from one or more ITS-Ss in the MCG, respective fourth MCMs indicating acceptance or rejection of the first candidate maneuver coordination strategy; declaring that a consensus is reached based on a number of the respective fourth MCMs received within the calculated amount of time; and transmitting or broadcasting another third MCM to the ITS-Ss in the MCG when a consensus is determined to not be reached, the other third MCM including a second candidate maneuver coordination strategy ranked lower than the first candidate maneuver coordination strategy.

Example 7 includes the method of examples 6a-6b and/or some other example(s) herein, further comprising: selecting a maneuver coordination strategy from the set of candidate maneuver coordination strategies based on whether the consensus is reached; and transmitting or broadcasting a fifth MCM to the ITS-Ss in the MCG indicating the selected maneuver coordination strategy.

Example 8 includes the method of example 7 and/or some other example(s) herein, wherein: the selected maneuver coordination strategy is the first candidate maneuver coordination strategy when the consensus is reached; and the selected maneuver coordination strategy is another candidate maneuver coordination strategy when the consensus is not reached.

Example 9 includes the method of example 8 and/or some other example(s) herein, further comprising: selecting a maneuver coordination strategy from the set of candidate maneuver coordination strategies indicated by one or more of the respective fourth MCMs.

Example 10 includes the method of examples 7-9 and/or some other example(s) herein, further comprising: performing one or more maneuver tasks of the selected maneuver coordination strategy.

Example 11 includes the method of example 10 and/or some other example(s) herein, further comprising: receiving a sixth MCM from at least one of the ITS-Ss in the MCG, the sixth MCM indicating confirmation of execution of the selected maneuver coordination strategy.

Example 12 includes the method of example 11 and/or some other example(s) herein, further comprising: transmitting or broadcasting a seventh MCM to the ITS-Ss in the MCG based on the sixth MCM, the seventh MCM including a disbanding MCG indication.

Example 13 includes the method of examples 1-12 and/or some other example(s) herein, wherein each of the first, second, third, fourth, fifth, sixth, and seventh MCMs include an ITS Protocol Data Unit, "PDU", header and one or more containers, the ITS PDU Header including information regarding protocol version, Radio Access Technology, "RAT", type, message type, and/or anode identifier, "ID", of the MCS or an originating station, the originating station being a station including the MCS.

Example 14 includes the method of example 13 and/or some other example(s) herein, wherein the one or more containers include: an MCM Management Container, the MCM Management Container including information about the MCM, the information about the MCM including one or more of a station type of the originating station, a message ID, a message type indicator, an MCM generation and transmission scheme, and segmentation information; a Station Data Container, the Station Data Container including additional information about the originating station; a Maneuver Sharing Container, the Maneuver Sharing Container including a Maneuver Intention Container and a Planned Trajectory Container, the Maneuver Intention Container including information related to one or more intended maneuvers of the originating station given a current arrangement of other stations neighboring or proximate to the originating station, and the Planned Trajectory Container including trajectory information indicating a planned or predicted trajectory of the ITS-S; a Maneuver Intention Container, the Maneuver Intention Container including information regarding one or more planned intentions of the originating station; a Detected Situations/Maneuvers Container, the Detected Situations/Maneuvers Container including information regarding driving/traffic situations and the neighbors' maneuvers detected by the originating station or determined from one or more received MCMs; and a Maneuver Coordination Container, the Maneuver Coordination Container including information about maneuver coordination requests and/or responses sent and/or received by the originating station.

Example 15 includes the method of example 14 and/or some other example(s) herein, wherein the one or more containers further include a Layered Cost Map Container, the Layered Cost Map Container including information for one or more layers of a layered cost map, the one or more layers including a master layer and one or more supporting layers.

Example 16 includes the method of examples 14-15 and/or some other example(s) herein, wherein one or more of the of the first, second, third, fourth, fifth, sixth, and seventh MCMs are a combined MCM-Cooperative Perception Message (CPM) further including one or more CPM containers, and the one or more CPM containers include: a Sensor Information Container, the Sensor Information Container including sensor capabilities of the originating station, wherein the sensor capabilities include one or more of a sensor ID of each sensor operated by or accessible to the originating sensor, sensor type of each sensor, a position of each sensor, an orientation of each sensor, and/or a field-of-view (FoV) of each sensor; a Sensing Data Container, the Sensing Data Container including shared (raw) sensor data and a description of the shared (raw) sensor data; and a Perceived Object Container for each perceived object, the Perceived Object Container for each perceived object including information about the corresponding detected object with respect to the disseminating station.

Example 17 includes the method of examples 14-16 and/or some other example(s) herein, wherein the trajectory information comprises a plurality of waypoints smoothed by a spline linking each of the plurality of waypoints.

Example 18 includes the method of examples 14-16 and/or some other example(s) herein, wherein the trajectory information comprises a parametric representation including one or more Frenet frames or the trajectory information is in a form of a parametric representation including one or more Frenet frames.

Example 19 includes the method of examples 17-18 and/or some other example(s) herein, further comprising: obtaining, by the MCS entity, the trajectory information from an application in an application layer of the originating station; determining, by the MCS entity, one or more points per trajectory based on one or more driving conditions, wherein determining the one or more points per trajectory comprises determining the one or more points per trajectory such that a larger number of points per trajectory are selected as the current speed and/or the detected speed of the one or more neighboring stations increases, or determining the one or more points per trajectory comprises determining the one or more points per trajectory such that, for higher probabilities of collision, a larger number of points per trajectory are selected; and generating, by the MCS entity, the trajectory information based on the one or more points per trajectory.

Example 20 includes the method of example 19 and/or some other example(s) herein, wherein the one or more driving conditions include one or more of a current speed of the ITS-S, a detected speed of the one or more other ITS-Ss, a situation intensity indicating a probability of a collision, a station type of the ITS-S, and a station type of the one or more other ITS-Ss.

Example 21 includes the method of examples 1-20 and/or some other example(s) herein, wherein the transmitting or broadcasting the MCM comprises transmitting or broadcasting the MCM with a periodicity ($T_{MCM}$), wherein the $T_{MCM}$ is selected between a minimum periodicity parameter ($T_{MCM\_Min}$) and a maximum periodicity parameter ($T_{MCM\_Max}$).

Example 22 includes the method of example 21 and/or some other example(s) herein, further comprising: determining the $T_{MCM}$ based on one or more of network congestion levels, channel congestion levels, signal strength measurements, signal quality measurements, quality (confidence) levels of perceived object(s), safety levels of the perceived object(s), geolocation, a node or traffic density, current or predicted communication resources, and a communication resource selection scheme.

Example 23 includes the method of examples 1-22 and/or some other example(s) herein, wherein the transmitting or broadcasting the MCM comprises: ordering the one or more other ITS-Ss; estimating actions of the one or more other ITS-Ss; and performing action selection.

Example 24 includes the method of examples 1-23 and/or some other example(s) herein, wherein the detected event is a periodic MCM generation event.

Example 25 includes the method of examples 1-24 and/or some other example(s) herein, wherein the ITS-S is one of a vehicle ITS-S or a Roadside ITS-S, and the one or more other ITS-Ss are vehicle ITS-Ss.

Example Z01 may include an apparatus comprising means to perform one or more elements of a method described in or related to any of examples 1-25, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples 1-25, or any other method or process described herein. Example Z03 may include an apparatus comprising logic, modules, or circuitry to perform one or more elements of a method described in or related to any of examples 1-25, or any other method or process described herein. Example Z04 may include a method, technique, or process as described in or related to any of examples 1-25, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples 1-25, or portions thereof. Example Z06 may include a signal as described in or related to any of examples 1-25, or portions or parts thereof. Example Z07 may include a datagram, packet, frame, segment, protocol data unit (PDU), or message as described in or related to any of examples 1-25, or portions or parts thereof, or otherwise described in the present disclosure. Example Z08 may include a signal encoded with data as described in or related to any of examples 1-25, or portions or parts thereof, or otherwise described in the present disclosure. Example Z09 may include a signal encoded with a datagram, packet, frame, segment, protocol data unit (PDU), or message as described in or related to any of examples 1-25, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples 1-25, or portions thereof. Example Z11 may include a computer program comprising instructions, wherein execution of the program by a processing element is to cause the processing element to carry out the method, techniques, or process as described in or related to any of examples 1-25, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

6. Terminology

The terminology used herein is for the purpose of describing particular embodiments only and is not intended to be limiting of the disclosure. The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S", "ego lane", and/or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Interoperability" refers to the ability of vehicle ITS-Ss (V-ITS-Ss) (also referred to as vehicle UEs (vUEs)) and roadside ITS-Ss (R-ITS-Ss) (also referred to as roadside equipment or Road Side Units (RSUs)) utilizing one vehicular communication system to communicate with vUEs and roadside equipment utilizing the other vehicular communication system. The term "Coexistence" refers to sharing or allocating radiofrequency resources among vUEs and roadside equipment using either vehicular communication system.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure.

This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to provide Maneuver Coordination Service (MCS) by an Intelligent Transport System Station (ITS-S), the apparatus comprising:
memory circuitry to store an MCS facility within a facilities layer of the ITS-S; and
processor circuitry connected to the memory circuitry, the processor circuitry is to operate the MCS facility to:
generate a Maneuver Coordination Message (MCM) to indicate a detected event for maneuver coordination;
cause transmission or broadcast of the MCM to one or more other ITS-Ss proximate to the ITS-S;
cause execution of one or more actions of an individual maneuver change based on the detected event when the individual maneuver change without coordination is determined to be sufficient for the detected event; and
initiate group coordination for the detected event when the individual maneuver change is determined not to be sufficient for the detected event, wherein the group coordination involves a group of two or more other vehicles or ITS-Ss separate from the ITS-S, and wherein to initiate the group coordination, the processor circuitry is to operate the MCS facility to:
determine whether a consensus is reached within the group coordination for acceptance or rejection of a set of candidate maneuver coordination strategies;
select a maneuver coordination strategy from the set of candidate maneuver coordination strategies based on whether the consensus is reached within the group coordination, wherein:
when the consensus is reached, the selected maneuver coordination strategy is a first candidate maneuver coordination strategy selected by the group, and
when the consensus is not reached, the selected maneuver coordination strategy is another candidate maneuver coordination strategy that is selected by a leader of the group; and
cause transmission or broadcast of another MCM to the one or more other ITS-Ss indicating the selected maneuver coordination strategy, to cause performance of one or more maneuver tasks of the selected maneuver coordination strategy.

2. The apparatus of claim 1, wherein the MCM is a first MCM, and to initiate the group coordination, the processor circuitry is to operate the MCS facility to:
calculate an amount of time for execution of one or more maneuver coordination strategies;
determine a set of the one or more other ITS-Ss to be included in a maneuver coordination group (MCG); and
cause transmission or broadcast of a second MCM to the determined ITS-Ss in the MCG, the second MCM including MCG information and indicating the detected event.

3. The apparatus of claim 2, wherein the processor circuitry is to operate the MCS facility to:
determine the set of candidate maneuver coordination strategies, each maneuver coordination strategy of the set of candidate maneuver coordination strategies including one or more coordinated and sequential maneuver tasks for some or all ITS-Ss in the MCG;
calculate a cost for each maneuver coordination strategy; and
cause transmission or broadcast of a third MCM to the ITS-Ss in the MCG, the third MCM including a first candidate maneuver coordination strategy based on the calculated costs.

4. The apparatus of claim 3, further comprising:
receiving, from one or more ITS-Ss in the MCG, respective fourth MCMs indicating acceptance or rejection of the first candidate maneuver coordination strategy;
declaring that a consensus is reached based on a number of the respective fourth MCMs received within the calculated amount of time; and
cause transmission or broadcast of another third MCM to the ITS-Ss in the MCG when a consensus is determined to not be reached, the another third MCM including a second candidate maneuver coordination strategy ranked lower than the first candidate maneuver coordination strategy.

5. The apparatus of claim 4, wherein the processor circuitry is to operate the MCS facility to:
select the maneuver coordination strategy from the set of candidate maneuver coordination strategies, as indicated by one or more of the respective fourth MCMs, based on whether the consensus is reached; and
cause transmission or broadcast of a fifth MCM to the ITS-Ss in the MCG indicating the selected maneuver coordination strategy.

6. The apparatus of claim 5, wherein the processor circuitry is to operate the MCS facility to:
receive a sixth MCM from at least one of the ITS-Ss in the MCG, the sixth MCM indicating confirmation of execution of the selected maneuver coordination strategy.

7. The apparatus of claim 6, wherein the processor circuitry is to operate the MCS facility to:
cause transmission or broadcast of a seventh MCM to the ITS-Ss in the MCG based on the sixth MCM, the seventh MCM including a disbanding MCG indication.

8. The apparatus of claim 7, wherein each of the first, second, third, fourth, fifth, sixth, and seventh MCMs include an ITS Protocol Data Unit (PDU) Header and one or more containers, the ITS PDU Header including information regarding protocol version, Radio Access Technology (RAT) type, message type, or a node identifier (ID) of the MCS or an originating station, the originating station being a station including the MCS, and wherein the one or more containers include:
an MCM Management Container, the MCM Management Container including information about the MCM, the information about the MCM including one or more of a station type of the originating station, a message ID, a message type indicator, an MCM generation and transmission scheme, and segmentation information; and at least one container selected from a group of containers including:
- a Station Data Container, the Station Data Container including additional information about the originating station;
- a Maneuver Sharing Container, the Maneuver Sharing Container including a Maneuver Intention Container and a Planned Trajectory Container, the Maneuver Intention Container including information related to one or more intended maneuvers of the originating station given a current arrangement of other stations neighboring or proximate to the originating station, and the Planned Trajectory Container including trajectory information indicating a planned or predicted trajectory of the ITS-S;
- a Detected Situations/Maneuvers Container, the Detected Situations/Maneuvers Container including information regarding driving/traffic situations and the neighbors' maneuvers detected by the originating station or determined from one or more received MCMs;
- a Maneuver Coordination Container, the Maneuver Coordination Container including information about maneuver coordination requests or responses sent or received by the originating station; and
- a Layered Cost Map Container, the Layered Cost Map Container including information for one or more layers of a layered cost map, the one or more layers including a master layer and one or more supporting layers.

9. The apparatus of claim 8, wherein one or more of the first, second, third, fourth, fifth, sixth, and seventh MCMs are a combined MCM-Cooperative Perception Message (CPM) further including one or more CPM containers, and the one or more CPM containers include:
- a Sensor Information Container, the Sensor Information Container including sensor capabilities of the originating station, wherein the sensor capabilities include one or more of a sensor ID of each sensor operated by or accessible to the originating station, sensor type of each sensor, a position of each sensor, an orientation of each sensor, or a field-of-view (FoV) of each sensor;
- a Sensing Data Container, the Sensing Data Container including shared (raw) sensor data and a description of the shared (raw) sensor data; and
- a Perceived Object Container for each perceived object, the Perceived Object Container for each perceived object including information about the corresponding perceived object with respect to a disseminating station.

10. The apparatus of claim 8, wherein the processor circuitry is to operate the MCS facility to:
- obtain the trajectory information from an application in an application layer of the originating station;
- determine one or more points per trajectory based on one or more driving conditions, wherein the one or more driving conditions include one or more of a current speed of the ITS-S, a detected speed of the one or more other ITS-Ss, a situation intensity indicating a probability of a collision, a station type of the ITS-S, and a station type of the one or more other ITS-Ss, and wherein the determination of the one or more points per trajectory includes:
  - determining the one or more points per trajectory such that a larger number of points per trajectory are selected as the current speed or the detected speed of the one or more neighboring stations increases, or
  - determining the one or more points per trajectory comprises determining the one or more points per trajectory such that, for higher probabilities of a collision, a larger number of points per trajectory are selected; and
- generate the trajectory information based on the one or more points per trajectory.

11. The apparatus of claim 8, wherein the trajectory information includes a plurality of waypoints smoothed by a spline linking each of the plurality of waypoints or a parametric representation including one or more Frenet frames.

12. The apparatus of claim 1, wherein, to cause transmission or broadcast of the MCM, the processor circuitry is to operate the MCS facility to:
- cause transmission or broadcast of the MCM with a periodicity ($T_{MCM}$), wherein the $T_{MCM}$ is selected between a minimum periodicity parameter ($T_{MCM\_Min}$) and a maximum periodicity parameter ($T_{MCM\_Max}$).

13. The apparatus of claim 12, wherein the processor circuitry is to operate the MCS facility to:
- determine the $T_{MCM}$ based on one or more of network congestion levels, channel congestion levels, signal strength measurements, signal quality measurements, quality (confidence) levels of perceived object(s), safety levels of the perceived object(s), geolocation, a node or traffic density, current or predicted communication resources, and a communication resource selection scheme.

14. The apparatus of claim 13, wherein the detected event is a periodic MCM generation event.

15. The apparatus of claim 1, wherein the ITS-S is one of a vehicle ITS-S or a Roadside ITS-S, and the one or more other ITS-Ss are vehicle ITS-Ss.

16. One or more non-transitory computer-readable media comprising instructions of a Maneuver Coordination Service (MCS) facility, wherein execution of the instructions by one or more processors of an Intelligent Transport System Station (ITS-S) is to cause the ITS-S to:
- generate a Maneuver Coordination Message (MCM) to indicate a detected event for maneuver coordination;
- cause transmission or broadcast of the MCM to one or more other ITS-Ss proximate to the ITS-S;
- execute one or more actions of an individual maneuver change based on the detected event when the individual maneuver change without coordination is determined to be sufficient for the detected event; and
- initiate group coordination for the detected event when the individual maneuver change is determined not to be sufficient for the detected event, wherein the group coordination involves a group of two or more other vehicles or ITS-Ss separate from the ITS-S, and wherein to initiate the group coordination, the processor circuitry is to operate the MCS facility to:
  - determine whether a consensus is reached within the group coordination for acceptance or rejection of a set of candidate maneuver coordination strategies;
  - select a maneuver coordination strategy from the set of candidate maneuver coordination strategies based on whether the consensus is reached within the group coordination, wherein:

when the consensus is reached, the selected maneuver coordination strategy is a first candidate maneuver coordination strategy selected by the group, and when the consensus is not reached, the selected maneuver coordination strategy is another candidate maneuver coordination strategy that is selected by a leader of the group; and cause transmission or broadcast of another MCM to the one or more other ITS-Ss indicating the selected maneuver coordination strategy, to cause performance of one or more maneuver tasks of the selected maneuver coordination strategy.

17. The one or more non-transitory computer-readable media of claim 16, wherein the MCM is a first MCM, and initiating group coordination comprises:

calculate an amount of time for execution of one or more maneuver coordination strategies;

determine a set of the one or more other ITS-Ss to be included in a maneuver coordination group (MCG); and cause transmission or broadcast of a second MCM to the determined ITS-Ss in the MCG, the second MCM including MCG information and indicating the detected event.

18. The one or more non-transitory computer-readable media of claim 17, wherein execution of the instructions is to cause the ITS-S to:

determine the set of candidate maneuver coordination strategies, each maneuver coordination strategy of the set of candidate maneuver coordination strategies including one or more coordinated and sequential maneuver tasks for some or all ITS-Ss in the MCG;

calculate a cost for each maneuver coordination strategy; and cause transmission or broadcast of a third MCM to the ITS-Ss in the MCG, the third MCM including a first candidate maneuver coordination strategy based on the calculated costs.

19. The one or more non-transitory computer-readable media of claim 18, wherein execution of the instructions is to cause the ITS-S to:

receive, from one or more ITS-Ss in the MCG, respective fourth MCMs indicating acceptance or rejection of the first candidate maneuver coordination strategy;

declare that a consensus is reached based on a number of the respective fourth MCMs received within the calculated amount of time; and cause transmission or broadcast of another third MCM to the ITS-Ss in the MCG when a consensus is determined to not be reached, the another third MCM including a second candidate maneuver coordination strategy ranked lower than the first candidate maneuver coordination strategy.

20. The one or more non-transitory computer-readable media of claim 19, wherein execution of the instructions is to cause the ITS-S to:

select the maneuver coordination strategy from the set of candidate maneuver coordination strategies, as indicated by one or more of the respective fourth MCMs, based on whether the consensus is reached; and cause transmission or broadcast of a fifth MCM to the ITS-Ss in the MCG indicating the selected maneuver coordination strategy.

21. The one or more non-transitory computer-readable media of claim 20, wherein execution of the instructions is to cause the ITS-S to:

receive a sixth MCM from at least one of the ITS-Ss in the MCG, the sixth MCM indicating confirmation of execution of the selected maneuver coordination strategy; and cause transmission or broadcast of a seventh MCM to the ITS-Ss in the MCG based on the sixth MCM, the seventh MCM including a disbanding MCG indication.

22. The one or more non-transitory computer-readable media of claim 21, wherein each of the first, second, third, fourth, fifth, sixth, and seventh MCMs include an ITS Protocol Data Unit (PDU) Header and one or more containers, the ITS PDU Header including information regarding protocol version, Radio Access Technology (RAT) type, message type, or a node identifier (ID) of the MCS or an originating station, the originating station being a station including the MCS, and wherein the one or more containers include:

an MCM Management Container, the MCM Management Container including information about the MCM, the information about the MCM including one or more of a station type of the originating station, a message ID, a message type indicator, an MCM generation and transmission scheme, and segmentation information; and at least one container selected from a group of containers including:

a Station Data Container, the Station Data Container including additional information about the originating station;

a Maneuver Sharing Container, the Maneuver Sharing Container including a Maneuver Intention Container and a Planned Trajectory Container, the Maneuver Intention Container including information related to one or more intended maneuvers of the originating station given a current arrangement of other stations neighboring or proximate to the originating station, and the Planned Trajectory Container including trajectory information indicating a planned or predicted trajectory of the ITS-S;

a Detected Situations/Maneuvers Container, the Detected Situations/Maneuvers Container including information regarding driving/traffic situations and the neighbors' maneuvers detected by the originating station or determined from one or more received MCMs;

a Maneuver Coordination Container, the Maneuver Coordination Container including information about maneuver coordination requests or responses sent or received by the originating station; and a Layered Cost Map Container, the Layered Cost Map Container including information for one or more layers of a layered cost map, the one or more layers including a master layer and one or more supporting layers.

23. The one or more non-transitory computer-readable media of claim 22, wherein execution of the instructions is to cause the ITS-S to:

obtain the trajectory information from an application in an application layer of the originating station;

determine one or more points per trajectory based on one or more driving conditions, wherein the one or more driving conditions include one or more of a current speed of the ITS-S, a detected speed of the one or more other ITS-Ss, a situation intensity indicating a probability of a collision, a station type of the ITS-S, and a station type of the one or more other ITS-Ss, and wherein the determination of the one or more points per trajectory includes:

determining the one or more points per trajectory such that a larger number of points per trajectory are selected as the current speed or the detected speed of the one or more neighboring stations increases, or determining the one or more points per trajectory comprises determining the one or more points per trajectory such that, for higher probabilities of a collision, a larger number of points per trajectory are selected; and generate the trajectory information based on the one or more points per trajectory.

24. The one or more non-transitory computer-readable media of claim 22, wherein the trajectory information includes a plurality of waypoints smoothed by a spline linking each of the plurality of waypoints or a parametric representation including one or more Frenet frames.

25. The one or more non-transitory computer-readable media of claim 22, wherein one or more of the first, second, third, fourth, fifth, sixth, and seventh MCMs are a combined MCM-Cooperative Perception Message (CPM) further including one or more CPM containers, and the one or more CPM containers include:

a Sensor Information Container, the Sensor Information Container including sensor capabilities of the originating station, wherein the sensor capabilities include one or more of a sensor ID of each sensor operated by or accessible to the originating station, sensor type of each sensor, a position of each sensor, an orientation of each sensor, or a field-of-view (FoV) of each sensor;

a Sensing Data Container, the Sensing Data Container including shared (raw) sensor data and a description of the shared (raw) sensor data; and a Perceived Object Container for each perceived object, the Perceived Object Container for each perceived object including information about the corresponding perceived object with respect to a disseminating station.

26. The one or more non-transitory computer-readable media of claim 16, wherein the transmission or broadcast of the MCM includes cause transmission or broadcast of the MCM with a periodicity ($T_{MCM}$), wherein the $T_{MCM}$ is selected between a minimum periodicity parameter ($T_{MCM\_Min}$) and a maximum periodicity parameter ($T_{MCM\_Max}$), and execution of the instructions is to cause the ITS-S to:

determine the $T_{MCM}$ based on one or more of network congestion levels, channel congestion levels, signal strength measurements, signal quality measurements, quality (confidence) levels of perceived object(s), safety levels of the perceived object(s), geolocation, a node or traffic density, current or predicted communication resources, and a communication resource selection scheme.

* * * * *